United States Patent
Nishioki et al.

(10) Patent No.: US 9,995,644 B2
(45) Date of Patent: Jun. 12, 2018

(54) FORCE SENSOR AND STRUCTURE BODY USED THEREIN

(71) Applicant: WACOH CORPORATION, Saitama (JP)

(72) Inventors: Nobuhisa Nishioki, Saitama (JP); Kazuhiro Okada, Saitama (JP)

(73) Assignee: WACOH CORPORATION, Saitama (JP)

(*) Notice: Subject to any disclaimer, the term of this patent is extended or adjusted under 35 U.S.C. 154(b) by 143 days.

(21) Appl. No.: 14/904,559

(22) PCT Filed: Apr. 7, 2015

(86) PCT No.: PCT/JP2015/061300
§ 371 (c)(1),
(2) Date: Jan. 12, 2016

(87) PCT Pub. No.: WO2016/163033
PCT Pub. Date: Oct. 13, 2016

(65) Prior Publication Data
US 2017/0248482 A1    Aug. 31, 2017

(51) Int. Cl.
*G01L 5/16* (2006.01)
*G01L 5/22* (2006.01)
*G01L 1/14* (2006.01)

(52) U.S. Cl.
CPC ............ *G01L 5/165* (2013.01); *G01L 5/161* (2013.01); *G01L 5/223* (2013.01); *G01L 1/14* (2013.01); *G01L 1/142* (2013.01)

(58) Field of Classification Search
CPC ......... G01L 5/161; G01L 5/165; G01L 5/223; G01L 1/14; G01L 1/142
See application file for complete search history.

(56) References Cited

U.S. PATENT DOCUMENTS

| 4,905,523 A | 3/1990 | Okada |
| 4,967,605 A | 11/1990 | Okada |

(Continued)

FOREIGN PATENT DOCUMENTS

| EP | 1 283 538 A2 | 2/2003 |
| EP | 1 327 870 B1 | 5/2013 |
| JP | 3970640 B2 | 6/2007 |

OTHER PUBLICATIONS

International Preliminary Report on Patentability (IPRP) dated Oct. 10, 2017 for International Application No. PCT/JP2015/061300.
(Continued)

*Primary Examiner* — Manish S Shah
*Assistant Examiner* — Timothy Graves
(74) *Attorney, Agent, or Firm* — Ladas & Parry LLP

(57) ABSTRACT

A plate-like supporting body (200) is arranged below a plate-like force receiving body (100) and a deformation body (300) is connected between them. The deformation body (300) is provided with an elastically deformed portion (310) arranged along a connection channel (R1) which connects a first force receiving point (P1) with a second force receiving point (P2), a first base portion (320) and a second base portion (330) which support the elastically deformed portion (310) from below. The upper end of the first base portion (320) supports the vicinity of a first relay point (m1) on the connection channel (R1) so as to sway freely, and the upper end of the second base portion (330) supports the vicinity of a second relay point (m2) on the connection channel (R1) so as to sway freely. An arm-like member (312) which couples a pair of relay points (m1, m2) is used to lower the detection sensitivity of moment around an origin (O) which is exerted on the force receiving body (100), thereby easily adjusting the balance of detection sensitivity between moment and force.

47 Claims, 24 Drawing Sheets

(56) References Cited

U.S. PATENT DOCUMENTS

| | | |
|---|---|---|
| 4,969,366 A | 11/1990 | Okada |
| 5,014,415 A | 5/1991 | Okada |
| 5,035,148 A | 7/1991 | Okada |
| 5,092,645 A | 3/1992 | Okada |
| 5,182,515 A | 1/1993 | Okada |
| 5,263,375 A | 11/1993 | Okada |
| 5,295,386 A | 3/1994 | Okada |
| 5,343,765 A | 9/1994 | Okada |
| 5,365,799 A | 11/1994 | Okada |
| 5,392,658 A | 2/1995 | Okada |
| 5,406,848 A | 4/1995 | Okada |
| 5,421,213 A | 6/1995 | Okada |
| 5,437,196 A | 8/1995 | Okada |
| 5,492,020 A | 2/1996 | Okada |
| 5,497,668 A | 3/1996 | Okada |
| 5,531,002 A | 7/1996 | Okada |
| 5,531,092 A | 7/1996 | Okada |
| 5,571,972 A | 11/1996 | Okada |
| 5,639,973 A | 6/1997 | Okada |
| 5,646,346 A | 7/1997 | Okada |
| 5,668,318 A | 9/1997 | Okada |
| 5,682,000 A | 10/1997 | Okada |
| 5,744,718 A | 4/1998 | Okada |
| 5,780,749 A | 7/1998 | Okada |
| 5,811,693 A | 9/1998 | Okada |
| 5,831,163 A | 11/1998 | Okada |
| 5,850,040 A | 12/1998 | Okada |
| 5,856,620 A | 1/1999 | Okada |
| 5,962,787 A | 10/1999 | Okada et al. |
| 5,987,985 A | 11/1999 | Okada |
| 6,003,371 A | 12/1999 | Okada |
| 6,053,057 A | 4/2000 | Okada |
| 6,076,401 A | 6/2000 | Okada |
| 6,098,461 A | 8/2000 | Okada |
| 6,158,291 A | 12/2000 | Okada |
| 6,159,761 A | 12/2000 | Okada |
| 6,185,814 B1 | 2/2001 | Okada |
| 6,205,856 B1 | 3/2001 | Okada |
| 6,269,697 B1 | 8/2001 | Okada |
| 6,282,956 B1 | 9/2001 | Okada |
| 6,314,823 B1 | 11/2001 | Okada |
| 6,367,326 B1 | 4/2002 | Okada |
| 6,378,381 B1 | 4/2002 | Okada et al. |
| 6,474,133 B1 | 11/2002 | Okada |
| 6,477,903 B2 | 11/2002 | Okada |
| 6,512,364 B1 | 1/2003 | Okada |
| 6,530,283 B2 | 3/2003 | Okada et al. |
| 6,716,253 B2 | 4/2004 | Okada |
| 6,772,632 B2 | 8/2004 | Okada |
| 6,779,408 B2 | 8/2004 | Okada |
| 6,809,529 B2 | 10/2004 | Okada et al. |
| 6,823,744 B2 | 11/2004 | Ohsato et al. |
| 6,859,048 B2 | 2/2005 | Okada et al. |
| 6,864,677 B1 | 3/2005 | Okada |
| 6,865,943 B2 | 3/2005 | Okada |
| 6,894,482 B2 | 5/2005 | Okada |
| 6,915,709 B2 | 7/2005 | Okada |
| 6,920,788 B2 | 7/2005 | Okada |
| 6,941,810 B2 | 9/2005 | Okada |
| 6,990,867 B2 | 1/2006 | Okada |
| 7,059,188 B2 | 6/2006 | Okada |
| 7,075,527 B2 | 7/2006 | Takagi et al. |
| 7,121,147 B2 | 10/2006 | Okada |
| 7,123,028 B2 | 10/2006 | Okada et al. |
| 7,152,485 B2 | 12/2006 | Okada |
| 7,219,561 B2 | 5/2007 | Okada |
| 7,231,802 B2 | 6/2007 | Okada |
| 7,360,455 B2 | 4/2008 | Okada |
| 7,363,814 B2 | 4/2008 | Okada |
| 7,533,582 B2 | 5/2009 | Okada |
| 7,578,162 B2 | 8/2009 | Okada |
| 7,882,740 B2 | 2/2011 | Okada |
| 7,900,513 B2 | 3/2011 | Okada |
| 8,408,075 B2 | 4/2013 | Okada |
| 8,667,854 B2 | 3/2014 | Nishioki et al. |
| 8,966,996 B2 | 3/2015 | Okada et al. |
| 2003/0030452 A1* | 2/2003 | Okada ................ G01L 1/142 324/681 |
| 2003/0222660 A1 | 12/2003 | Morimoto |
| 2011/0005338 A1* | 1/2011 | Okada ............... G01L 5/0061 73/862.043 |

OTHER PUBLICATIONS

International Search Report (ISR) dated Apr. 7, 2015 for International Application No. PCT/JP2015/061300.

Supplementary European Search Report (SESR) dated Feb. 1, 2018 for Application No. EP 5 84 3091.

* cited by examiner

| | BENDING OF CONSTRICTED PORTION ( ■ ) | COLLAPSE OF CONSTRICTED PORTION ( ■ ) | DISTORTION OF CONSTRICTED PORTION ( ■ ) | EXPANSION AND CONTRACTION OF ARM-LIKE PORTION ( ▨ ) |
|---|---|---|---|---|
| Fx(Fy) | ○ | ○ | ✗ | ✗ |
| Fz | ○ | ✗ | ✗ | ✗ |
| My(Mx) | ○ | ✗ | ✗ | ○ |
| Mz | ○ | ✗ | ○ | ✗ |

FIG. 36

|  |  | CONVENTIONAL FORCE SENSOR (FIG. 24) | FORCE SENSOR OF PRESENT INVENTION (FIG. 25) |
|---|---|---|---|
| Fx | F = 200N | 22 | 14 |
| Fy |  | 22 | 14 |
| Fz |  | 210 | 36 |
| Mx | M = 20N·m | 460 | 32 |
| My |  | 460 | 32 |
| Mz |  | 108 | 16 |

FORCE SENSOR AND STRUCTURE BODY USED THEREIN

RELATED APPLICATION

This application is an application under 35 U.S.C. 371 of International Application No. PCT/JP2015/061300 filed on Apr. 7, 2015, the entire contents of which are incorporated herein by reference.

FIELD OF THE INVENTION

The present invention relates to a force sensor and in particular to a sensor which is suitable for detecting force in the direction of a specific coordinate axis and moment around a specific coordinate axis in a three-dimensional orthogonal coordinate system.

BACKGROUND ART

Various types of force sensors have been used to control motions of robots and industrial machines. Also, a downsized force sensor has been incorporated as a man-machine interface of an input device for electronics. In order to reduce dimensions and cost, a force sensor to be used in the above-described applications is required to be as simple as possible in structure and also to independently detect force for each coordinate axis in a three-dimensional space.

In view of the above description, at present, a generally used multi-axis force sensor has adopted a basic structure body which includes, as a mechanical structure portion, a force receiving body which receives force to be detected, a supporting body which supports the force receiving body, and a deformation body which is installed between the force receiving body and the supporting body to yield elastic deformation. Any desired force sensor can be constituted by adding to the basic structure body a detection element which electrically detects a deformed state of the deformation body and a detection circuit which outputs electric signals that indicate force in the direction of a predetermined coordinate axis and moment around a predetermined coordinate axis which have been exerted on the force receiving body on the basis of the obtained detection results.

As the detection element which detects a deformed state of the deformation body, there are used an element which takes out a mechanical strain occurring at a specific site of the deformation body as an electric signal and an element which takes out displacement occurring at a specific site of the deformation body as an electric signal. A representative detection element which is of a strain detection type of the former is a strain gauge which is attached to a specific site of a deformation body in which a mechanical strain resulting from exerted force is electrically detected as change in electrical resistance of the strain gauge. On the other hand, a representative detection element which is of a displacement detection type in the latter is a capacitive element which is constituted with a displacement electrode fixed at a specific site of a deformation body and a fixed electrode fixed at a part opposite to a supporting body. When displacement occurs on the deformation body upon exerted force, a distance between the displacement electrode and the fixed electrode is changed, by which the displacement is electrically detected as change in capacitance value of the capacitive element.

For example, in Patent Documents 1 and 2 given below, as a deformation body which connects between a force receiving body and a supporting body, there is disclosed a force sensor in which a plurality of columnar members and a plurality of diaphragms are used. Each of the columnar members is such that an upper end thereof is fixed to the force receiving body via a diaphragm and a lower end thereof is fixed to the supporting body via a diaphragm. Therefore, when force is exerted on the force receiving body in a state that the supporting body is fixed, each of the columnar members undergoes displacement due to elastic deformation of the diaphragm. A displaced state thereof is detected by using a capacitive element, thus making it possible to detect force in the direction of each coordinate axis and moment around each coordinate axis in an XYZ three-dimensional orthogonal coordinate system. Further, Patent Documents 3 given below discloses a variation of the force sensor disclosed in Patent Documents 1 and 2, which is a force sensor that uses, as a deformation body, a group of pairs of columnar members, each of which is arranged in an inclined manner so as to form a V-letter shape.

PRIOR ART DOCUMENTS

Patent Documents

Patent Document 1: U.S. Pat. No. 6,915,709
Patent Document 2: U.S. Pat. No. 7,219,561
Patent Document 3: U.S. Pat. No. 8,408,075

SUMMARY OF THE INVENTION

Problems to be Solved by the Invention

In general, where an object is arranged in an XYZ three-dimensional orthogonal coordinate system, an external force acting on the object includes force in the direction of each coordinate axis (translational force which pushes the object in the direction of a specific coordinate axis) and moment around each coordinate axis (rotational force which rotates the object around a specific coordinate axis). Specifically, the former includes three axis components which are force Fx in the direction of the X-axis, force Fy in the direction of the Y-axis and force Fz in the direction of the Z-axis, and the latter includes three axis components which are moment Mx around the X-axis, moment My around the Y-axis and moment Mz around the Z-axis, that is, a total of six axis components are to be taken into account.

The conventional force sensors which have been disclosed in Patent Documents 1 to 3 described above are able to detect these six axis components individually and independently, raising the utility value of in such an application that requires handling each of the axis components in a distinct manner. However, in practice, it is preferable to balance each of the axis components so as to make equal the detection range of each axis component in designing the sensor.

For example, where a capacitive element is used as a detection element, a detection value of an applied external force is obtained as variance in capacitance value of a specific capacitive element. In this case, a large difference in variance in capacitance value for each axis to which the force is applied will result in a large difference in detection range of each axis component. Of course, an individual detection value is obtained as an electric signal. Therefore, an axis component low in sensitivity can be corrected by analog amplification treatment or digital amplification treatment. However, the above-described amplification treatment will amplify errors such as noises as well, which poses a problem of reduction in detection accuracy, resulting in limiting the potential performance of the force sensor.

In particular, the detection sensitivity of moment has a problem unique to moment. This is because a value of moment is not defined as magnitude in itself of an external force which is applied to an exertion point but defined as a value obtained by multiplying the magnitude of an applied external force by a distance from the center of rotation.

For example, consideration is given to a case that a circle with a radius of 100 mm (0.1 m) is drawn around the center of gravity of an object and an external force of 1N is exerted on the object at an exertion point on a circumference thereof in a tangent direction of the circle. In this case, a value of moment which is exerted at the center of gravity as rotational force is 1N×0.1 m=0.1N·m. In contrast, where the same external force of 1N is exerted along a straight line passing through the center of gravity, a value of force which is exerted at the center of gravity as translational force is 1N. As described above, even where the same external force of 1N is exerted on the same object, a detection value to be obtained will differ depending on whether it is detected as force in the direction of a predetermined axis (translational force) or it is detected as moment around a predetermined axis (rotational force).

Therefore, in designing a force sensor, consideration is required for appropriately balancing the detection range of each axis component, with a specific use environment taken into account. For example, in a force sensor on the basis of such use environment that an exertion point of external force detected as moment is set at a position away from the center point of rotation by 100 mm, the sensor is designed so that a ratio of detection sensitivity of moment (rotational force) to detection sensitivity of force (translational force) is 10:1, thus making it possible to appropriately balance a detection value (detection range) between the moment and the force. Similarly, in the case of use environment that a distance between the center point and the exertion point is 200 mm, it is preferable that a ratio of the detection sensitivity is set to be 5:1. In the case of use environment that a distance between the center point and the exertion point is 50 mm, it is preferable that a ratio of the detection sensitivity is set to be 20:1.

However, as described above, force sensors are used in various applications from industrial machines such as a robot hand and a manipulator to input devices such as a joystick and may vary in distance between a center point and an exertion point. In particular, in the case of an input device such as a joystick, an external force is applied to an operation component which is directly touched by a user and, accordingly, a distance between the center point and the exertion point depends on the dimensions of the operation component. Therefore, in practice, it is necessary to design a sensor so as to attain an optimal ratio of detection sensitivity of moment to detection sensitivity of force for each specific application. However, a conventional force sensor is structurally difficult in design so as to attain an optimal ratio of the detection sensitivity. In a product on which the sensor is actually mounted, it is difficult to set appropriately the detection sensitivity of moment and the detection sensitivity of force in a well-balanced manner.

For example, in a force sensor which has the structure disclosed in any of Patent Documents 1 to 3 described above, a ratio of detection sensitivity of moment to detection sensitivity of force is actually about 100:1. Therefore, in general applications in which a distance between the center point and the exertion point is approximately 100 mm, there is posed such a problem that a detection value (output electric signal) of moment is much greater than a detection value (output electric signal) of force.

Therefore, an object of the present invention is to provide a force sensor which is able to easily adjust the balance of detection sensitivity between moment and force in designing the sensor, and another object thereof is to provide an auxiliary structure body which can be used in the above-described force sensor.

Means for Solving the Problems

Hereinafter, a description will be given of essential characteristics of the present invention on the basis of several modes. In the following description, for the purpose of facilitating understanding, a symbol which indicates a corresponding constituent in a representative example shown in a drawing is to be cited in parentheses. Of course, the symbol in parentheses indicates one example of the corresponding constituent in the example. Each of the constituents shall not be restricted only to a specific constituent in the example cited in the symbol concerned. This is also applicable to a symbol in parentheses described in the scope of claims.

(1) The first feature of the present invention resides in a force sensor which detects at least force Fz in a direction of a Z-axis and moment My around a Y-axis, of force in respective directions of each coordinate axis and moment around each coordinate axis in an XYZ three-dimensional orthogonal coordinate system, the force sensor comprising:

a basic structure body (1000) which includes a force receiving body (100) arranged on the Z-axis when the coordinate system is defined so that the Z-axis is a perpendicular axis, a supporting body (200) which is arranged below the force receiving body, and a deformation body (300) which connects the force receiving body with the supporting body to yield at least partially elastic deformation by exertion of force or moment;

detection elements (C1 to C4) which detect deformation or displacement of the deformation body or displacement of the force receiving body or the supporting body; and a detection circuit (900) which outputs electric signals indicating force Fz in the direction of the Z-axis and moment My around the Y-axis which have been exerted on one of the force receiving body and the supporting body in a state that loads are applied to the other on the basis of detection results of the detection elements; wherein the deformation body (300) includes an elastically deformed portion (310) which is connected at a predetermined site to the force receiving body (100) to yield elastic deformation, a first base portion (320) and a second base portion (330) fixing a predetermined site of the elastically deformed portion to the supporting body (200), when the basic structure body (1000) is cut along an XZ plane or a plane parallel to the XZ plane and when a geometric figure appearing on a cross section of the force receiving body is referred to as a force receiving body figure (100f), a geometric figure appearing on a cross section of the supporting body is referred to as a supporting body figure (200f) and a geometric figure appearing on a cross section of the deformation body is referred to as a deformation body figure (300f), the deformation body figure includes an elastically deformed portion figure (310f) which is a cross section of the elastically deformed portion (310), a first base portion figure (320f) which is a cross section of the first base portion (320) and a second base portion figure (330f) which is a cross section of the second base portion (330), the elastically deformed portion figure (310*f*) is arranged along a predetermined connection channel (R1) which connects a first force receiving point (P1) with a second force receiving point (P2) which are defined on a contour of the force receiving body figure (100*f*), the elastically deformed portion figure couples the first force receiving point (P1) to the second force receiving point (P2), the first base portion figure (320*f*) is connected to the elastically deformed portion figure (310*f*) in a vicinity of a first relay point (m1) defined on the connection channel (R1), and the second base portion figure (330*f*) is connected to the elastically deformed portion figure (310*f*) in a vicinity of a second relay point (m2) defined on the connection channel (R1), the elastically deformed portion (310) couples the first force receiving point (P1) to the second force receiving point (P2), the first base portion (320) couples the vicinity of the first relay point (m1) at the elastically deformed portion (310) to a first supporting point (Q1) defined on the supporting body (200), and the second base portion (330) couples the vicinity of the second relay point (m2) at the elastically deformed portion (310) to a second supporting point (Q2) defined on the supporting body (200), the first force receiving point (P1) is arranged at a position having a negative coordinate value of an X-axis and the second force receiving point (P2) is arranged at a positive coordinate value of the X-axis, and when force Fz is exerted on the force receiving body (100) in a state that the supporting body (200) is fixed and when moment My is exerted on the force receiving body (100) in a state that the supporting body (200) is fixed, the vicinity of the first relay point (m1) at the elastically deformed portion (310) sways in the direction of the X-axis in relation to the first base portion (320), with a connection point (m1') with the first base portion (320) given as a supporting point, and the vicinity of the second relay point (m2) at the elastically deformed portion (310) sways in the direction of the X-axis in relation to the second base portion (330), with a connection point with the second base portion (330) given as a supporting point.

(2) The second feature of the present invention resides in a force sensor having the first feature, wherein the elastically deformed portion figure (310*f*) includes a first external arm-like portion figure (311*f*) which is arranged along a zone from the first force receiving point (P1) to the first relay point (m1) on the connection channel (R1), an internal arm-like portion figure (312*f*) which is arranged along a zone from the first relay point (m1) to the second relay point (m2) on the connection channel (R1) and a second external arm-like portion figure (313*f*) which is arranged along a zone from the second relay point (m2) to the second force receiving point (P2) on the connection channel (R1).

(3) The third feature of the present invention resides in a force sensor having the second feature, wherein a connection end of the first base portion figure (320*f*) is connected below in the vicinity of the first relay point (m1) at the elastically deformed portion figure (310*f*) and a connection end of the second base portion figure (330*f*) is connected below in the vicinity of the second relay point (m2) at the elastically deformed portion figure (310*f*).

(4) The fourth feature of the present invention resides in a force sensor having the third feature, wherein the first base portion figure (320*f*) is arranged along a first supporting channel (R2) which connects the first relay point (m1) defined on the connection channel (R1) with the first supporting point (Q1) defined on a contour of the supporting body figure (200*f*) so that the first base portion figure couples the elastically deformed portion figure (310*f*) to the supporting body figure (200*f*), and the second base portion figure (330*f*) is arranged along a second supporting channel (R3) which connects the second relay point (m2) defined on the connection channel (R1) with the second supporting point (Q2) defined on a contour of the supporting body figure (200*f*) so that the second base portion figure couples the elastically deformed portion figure (310*f*) to the supporting body figure (200*f*).

(5) The fifth feature of the present invention resides in a force sensor having the fourth feature, wherein when force Fz is exerted on the force receiving body (100) in a state that the supporting body (200) is fixed and when moment My is exerted on the force receiving body (100) in a state that the supporting body (200) is fixed, the vicinity of the first relay point (m1) at the elastically deformed portion figure (310*f*) sways in relation to the first base portion figure (320*f*), with an intersection point (m1') of the first supporting channel (R2) and the contour of the elastically deformed portion figure (310*f*) given as a supporting point, and the vicinity of the second relay point (m2) at the elastically deformed portion figure (310*f*) sways in relation to the second base portion figure (330*f*), with an intersection point (m2') of the second supporting channel (R3) and the contour of the elastically deformed portion figure (310*f*) given as a supporting point.

(6) The sixth feature of the present invention resides in a force sensor having any one of the third to fifth features, wherein a connection channel (R1, R4, R5, R7) which is traced from the first relay point (m1) to the second relay point (m2) includes a descending channel running downward along a first longitudinal direction axis (L1, L2, L4) intersecting with an XY plane and an ascending channel running upward along a second longitudinal direction axis (Z, L3, L5) intersecting with the XY plane, and the internal arm-like portion figure (312*f*, 342*f*, 352*f*) includes a descending arm-like portion along the descending channel and an ascending arm-like portion along the ascending channel.

(7) The seventh feature of the present invention resides in a force sensor having the sixth feature, wherein the first longitudinal direction axis (L1, L2) and the second longitudinal direction axis (Z, L3) are parallel to the Z-axis.

(8) The eighth feature of the present invention resides in a force sensor having the seventh feature, wherein the first longitudinal direction axis or the second longitudinal direction axis (Z) is an axis included in the YZ plane.

(9) The ninth feature of the present invention resides in a force sensor having the seventh or eighth feature, wherein the connection channel (R1, R4, R5, R7) includes a lengthwise direction channel which is parallel to the Z-axis and a crosswise direction channel which is parallel to the X-axis, and the lengthwise-direction channel expands from the first force receiving point (P1) or the second force receiving point (P2), and the first relay point (m1) and the second relay point (m2) are defined on the crosswise direction channel.

(10) The tenth feature of the present invention resides in a force sensor having the third feature, wherein a curved channel which is curved below and then curved above is installed at a zone between the first relay point (m1) and the second relay point (m2) on the connection channel (R6), and the internal arm-like portion figure (362*f*) includes a curved portion along the curved channel.

(11) The eleventh feature of the present invention resides in a force sensor having the second feature, wherein a connection end of the first base portion figure (425*f*) is connected below in the vicinity of the first relay point (m1) at the elastically deformed portion figure (470*f*) and a connection end of the second base portion figure (435*f*) is connected above in the vicinity of the second relay point (m2) at the elastically deformed portion figure (470*f*).

(12) The twelfth feature of the present invention resides in a force sensor having the eleventh feature, wherein the connection channel (R8) which is traced from the first relay point (m1) to the second relay point (m2) includes a descending channel which runs downward along a longitudinal direction axis (L6) intersecting with the XY plane, and the internal arm-like portion figure (472*f*) includes a descending arm-like portion along the descending channel.

(13) The thirteenth feature of the present invention resides in a force sensor having the twelfth feature, wherein the longitudinal direction axis (L6) is parallel to the Z-axis.

(14) The fourteenth feature of the present invention resides in a force sensor having the second feature, wherein a connection end of the first base portion figure is connected above in the vicinity of the first relay point (m1) at the elastically deformed portion figure, and a connection end of the second base portion figure is connected above in the vicinity of the second relay point (m2) at the elastically deformed portion figure.

(15) The fifteenth feature of the present invention resides in a force sensor having the first feature, wherein a third relay point (m3) is further defined between the second relay point (m2) and the second force receiving point (P2) on the connection channel (R9), the deformation body includes a third base portion, in addition to the elastically deformed portion, the first base portion and the second base portion, the third base portion couples a vicinity of the third relay point (m3) at the elastically deformed portion to a third supporting point (Q3) defined on the supporting body (250), and the elastically deformed portion figure (480*f*) includes a first external arm-like portion figure (481*f*) which is arranged along a zone from the first force receiving point (P1) to the first relay point (m1) on the connection channel (R9), a first internal arm-like portion figure (482*f*) which is arranged along a zone from the first relay point (m1) to the second relay point (m2) on the connection channel (R9), a second internal arm-like portion figure (483*f*) which is arranged along a zone from the second relay point (m2) to the third relay point (m3) on the connection channel (R9) and a second external arm-like portion figure (484*f*) which is arranged along a zone from the third relay point (m3) to the second force receiving point (P2) on the connection channel (R9).

(16) The sixteenth feature of the present invention resides in a force sensor having the fifteenth feature, wherein a connection end of the first base portion figure (426*f*) is connected below in the vicinity of the first relay point (m1) at the elastically deformed portion figure (480*f*), a connection end of the second base portion figure (436*f*) is connected below in the vicinity of the second relay point (m2) at the elastically deformed portion figure (480*f*), and a connection end of a third base portion figure (496*f*) which is a cross section of the third base portion is connected above in the vicinity of the third relay point (m3) at the elastically deformed portion figure (480*f*).

(17) The seventeenth feature of the present invention resides in a force sensor having the second feature, wherein a first U-letter shaped by-pass (U1) having a U-letter shape is formed at a zone between the first force receiving point (P1) and the first relay point (m1) on the connection channel (R7), and the first external arm-like portion figure (411*f*) includes a first U-letter shaped by-pass portion along the first U-letter shaped by-pass, and a second U-letter shaped by-pass (U2) having a U-letter shape is formed at a zone between the second relay point (m2) and the second force receiving point (P2) on the connection channel (R7), and the second external arm-like portion figure (413*f*) includes a second U-letter shaped by-pass portion along the second U-letter shaped by-pass.

(18) The eighteenth feature of the present invention resides in a force sensor having the seventeenth feature, wherein the first U-letter shaped by-pass (U1) and the second U-letter shaped by-pass (U2) are constituted in combination with a pair of lengthwise direction by-passes parallel to the Z-axis and a crosswise direction by-pass parallel to the X-axis which connects the pair of lengthwise direction by-passes.

(19) The nineteenth feature of the present invention resides in a force sensor having any one of the second to eighteenth features, wherein a constricted portion (41-43; 51*a*, 51*b*, 52*a*, 52*b*, 53*a*, 53*b*) which is narrow in width in a direction orthogonal to the connection channel, is installed at all or some of the first external arm-like portion figure (441*f*; 451*f*), the internal arm-like portion figure (442*f*; 452*f*) and the second external arm-like portion figure (443*f*; 453*f*).

(20) The twentieth feature of the present invention resides in a force sensor having any one of the second to nineteenth features, wherein a weight adjusting portion figure (62*f*) which projects in a direction orthogonal to the connection channel is installed at all or some of the first external arm-like portion figure (461*f*), the internal arm-like portion figure (462*f*) and the second external arm-like portion figure (463*f*).

(21) The twenty-first feature of the present invention resides in a force sensor having any one of the second to twentieth features, wherein a flange portion figure (61*f*, 63*f*) which projects in a direction orthogonal to the connection channel is installed at a connection portion of the first external arm-like portion figure (461*f*) with the force receiving body figure (150*f*) and a connection portion of the second external arm-like portion figure (463*f*) with the force receiving body figure (150*f*).

(22) The twenty-second feature of the present invention resides in a force sensor having any one of the first to twenty-first features, wherein a connection end of the first base portion figure (320*f*) with the elastically deformed portion figure (310*f*) and a connection end of the second base portion figure (330*f*) therewith each constitute a constricted figure which is narrower in width than the other portion.

(23) The twenty-third feature of the present invention resides in a force sensor having any one of the first to twenty-second features, wherein the force receiving body (100) and the supporting body (200) are constituted with a plate member which has an upper face and a lower face, each of which is parallel to the XY plane.

(24) The twenty-fourth feature of the present invention resides in a force sensor having any one of the first to twenty-third features, wherein the elastically deformed portion (310) is constituted with a structure body formed by bending an elongated arm-like member.

(25) The twenty-fifth feature of the present invention resides in a force sensor having any one of the first to twenty-fourth features, wherein the detection element electrically detects an expansion/contraction state at a predetermined site of the elastically deformed portion, thereby detecting a deformed state of the deformation body.

(26) The twenty-sixth feature of the present invention resides in a force sensor having any one of the first to twenty-fourth features, wherein the detection element electrically detects a distance between a predetermined site of the elastically deformed portion and a predetermined site of the supporting body, thereby detecting a displaced state of the deformation body.

(27) The twenty-seventh feature of the present invention resides in a force sensor having the twenty-sixth feature, wherein the detection element is constituted with a plurality of capacitive elements, each of which has a displacement electrode formed at a predetermined site of the elastically deformed portion and a fixed electrode formed at a position of the supporting body opposite to the displacement electrode, and the detection circuit performs arithmetic processing on the basis of capacitance values of the plurality of capacitive elements, thereby outputting electric signals indicating force Fz in the direction of the Z-axis and moment My around the Y-axis.

(28) The twenty-eighth feature of the present invention resides in a force sensor having any one of the first to twenty-third features, wherein the deformation body (500) includes an elastically deformed portion (510) with regard to the X-axis which is connected at a predetermined site thereof to the force receiving body (150) to yield elastic deformation, a first base portion (520) with regard to the X-axis and a second base portion (530) with regard to the X-axis, each of which fixes the predetermined site of the elastically deformed portion with regard to the X-axis to the supporting body (250), an elastically deformed portion (540) with regard to the Y-axis which is connected at a predetermined site thereof to the force receiving body (150) to yield elastic deformation, and a first base portion (550) with regard to the Y-axis and a second base portion (560) with regard to the Y-axis, each of which fixes the predetermined site of the elastically deformed portion with regard to the Y-axis to the supporting body (250), when the basic structure body is cut along an XZ plane or a plane parallel to the XZ plane and when a geometric figure appearing on a cross section of the force receiving body is referred to as a force receiving body figure (150*fx*) with regard to the X-axis, a geometric figure appearing on a cross section of the supporting body is referred to as a supporting body figure (250*fx*) with regard to the X-axis, and a geometric figure appearing on a cross section of the deformation body is referred to as a deformation body figure (500*fx*) with regard to the X-axis, and at this time, the deformation body figure with regard to the X-axis includes an elastically deformed portion figure (510*f*) with regard to the X-axis which is a cross section of the elastically deformed portion (510) with regard to the X-axis, a first base portion figure (520*f*) with regard to the X-axis which is a cross section of the first base portion (520) with regard to the X-axis, and a second base portion figure (530*f*) with regard to the X-axis which is a cross section of the second base portion (530) with regard to the X-axis, when the basic structure body is cut along a YZ plane or a plane parallel to the YZ plane and when a geometric figure appearing on a cross section of the force receiving body is referred to as a force receiving body figure (150*fy*) with regard to the Y-axis, a geometric figure appearing on a cross section of the supporting body is referred to as a supporting body figure (250*fy*) with regard to the Y-axis, and a geometric figure appearing on a cross section of the deformation body is referred to as a deformation body figure (500*fy*) with regard to the Y-axis, and at this time, the deformation body figure with regard to the Y-axis includes an elastically deformed portion figure (540*f*) with regard to the Y-axis which is a cross section of the elastically deformed portion (540) with regard to the Y-axis, a first base portion figure (550*f*) with regard to the Y-axis which is a cross section of the first base portion (550) with regard to the Y-axis, and a second base portion figure (560*f*) with regard to the Y-axis which is a cross section of the second base portion (560) with regard to the Y-axis, the elastically deformed portion figure (510*f*) with regard to the X-axis is arranged along a predetermined connection channel (R10) with regard to the X-axis which connects a first force receiving point (P11) with regard to the X-axis with a second force receiving point (P12) with regard to the X-axis defined on a contour of the force receiving body figure (150*fx*) with regard to the X-axis, and is a figure which couples the first force receiving point (P11) with regard to the X-axis to the second force receiving point (P12) with regard to the X-axis, the first base portion figure (520*f*) with regard to the X-axis is connected to the elastically deformed portion figure (510*f*) with regard to the X-axis in a vicinity of a first relay point (m11) with regard to the X-axis defined on the connection channel (R10) with regard to the X-axis, and the second base portion figure (530*f*) with regard to the X-axis is connected to the elastically deformed portion figure (510*f*) with regard to the X-axis in a vicinity of a second relay point (m12) with regard to the X-axis defined on the connection channel (R10) with regard to the X-axis, the elastically deformed portion figure (540*f*) with regard to the Y-axis is arranged along a predetermined connection channel (R11) with regard to the Y-axis which connects a first force receiving point (P21) with regard to the Y-axis with a second force receiving point (P22) with regard to the Y-axis defined on a contour of the force receiving body figure (150*fy*) with regard to the Y-axis, and is a figure which couples the first force receiving point (P21) with regard to the Y-axis to the second force receiving point (P22) with regard to the Y-axis, the first base portion figure (550*f*) with regard to the Y-axis is connected to the elastically deformed portion figure (540*f*) with regard to the Y-axis in a vicinity of a first relay point (m21) with regard to the Y-axis defined on the connection channel (R11) with regard to the Y-axis, and the second base portion figure (560*f*) with regard to the Y-axis is connected to the elastically deformed portion figure (5400 with regard to the Y-axis in a vicinity of a second relay point (m22) with regard to the Y-axis defined on the connection channel (R11) with regard to the Y-axis, the elastically deformed portion (510) with regard to the X-axis couples the first force receiving point (P11) with regard to the X-axis to the second force receiving point (P12) with regard to the X-axis, the first base portion (520) with regard to the X-axis couples the vicinity of the first relay point (m11) with regard to the X-axis at the elastically deformed portion (510) with regard to the X-axis to the first supporting point (Q11) with regard to the X-axis defined on the supporting body (250), and the second base portion (530) with regard to the X-axis couples the vicinity of the second relay point (m12) with regard to the X-axis at the elastically deformed portion (510) with regard to the X-axis to the second supporting point (Q12) with regard to the X-axis defined on the supporting body (250), the elastically deformed portion (540) with regard to the Y-axis couples the first force receiving point (P21) with regard to the Y-axis to the second force receiving point (P22) with regard to the Y-axis, the first base portion (550) with regard to the Y-axis couples the vicinity of the first relay point (m21) with regard to the Y-axis at the elastically deformed portion (540) with regard to the Y-axis to a first supporting point (Q21) with regard to the Y-axis defined on the supporting body (250), and the second base portion (560) with regard to the Y-axis couples the vicinity of the second relay point (m22) with regard to the Y-axis at the elastically deformed portion (540) with regard to the Y-axis to a second supporting point (Q22) with regard to the Y-axis defined on the supporting body (250), the first force receiving point (P11) with regard to the X-axis is arranged at a position having a negative coordinate value of the X-axis, the second force receiving point (P12) with regard to the X-axis is arranged at a position having a positive coordinate value of the X-axis, the first force receiving point (P21) with regard to the Y-axis is arranged at a position having a negative coordinate value of the Y-axis, and the second force receiving point (P22) with regard to the Y-axis is arranged at a position having a positive coordinate value of the Y-axis, when force Fz is exerted on the force receiving body (150) in a state that the supporting body (250) is fixed and when moment My is exerted on the force receiving body (150) in a state that the supporting body (250) is fixed, the vicinity of the first relay point (m11) with regard to the X-axis at the elastically deformed portion (510) with regard to the X-axis sways in the direction of the X-axis in relation to the first base portion (520) with regard to the X-axis, with a connection point with the first base portion (520) with regard to the X-axis given as a supporting point, and the vicinity of the second relay point (m12) with regard to the X-axis at the elastically deformed portion (510) with regard to the X-axis sways in the direction of the X-axis in relation to the second base portion (530) with regard to the X-axis, with a connection point with the second base portion (530) with regard to the X-axis given as a supporting point, when force Fz is exerted on the force receiving body (150) in a state that the supporting body (250) is fixed and when moment Mx is exerted on the force receiving body (150) in a state that the supporting body (250) is fixed, the vicinity of the first relay point (m21) with regard to the Y-axis at the elastically deformed portion (540) with regard to the Y-axis sways in the direction of the Y-axis in relation to the first base portion (550) with regard to the Y-axis, with a connection point with the first base portion (550) with regard to the Y-axis given as a supporting point, and the vicinity of the second relay point (m22) with regard to the Y-axis at the elastically deformed portion (540) with regard to the Y-axis sways in the direction of the Y-axis in relation to the second base portion (560) with regard to the Y-axis, with a connection point with the second base portion (560) with regard to the Y-axis given as a supporting point, and the detection circuit (900) outputs not only electric signals indicating force Fz in the direction of the Z-axis and moment My around the Y-axis, but also an electric signal indicating moment Mx around the X-axis which have been exerted on one of the force receiving body and the supporting body in a state that loads are applied to the other, on the basis of detection results of the detection element.

(29) The twenty-ninth feature of the present invention resides in a force sensor having the twenty-eighth feature, wherein the elastically deformed portion (510) with regard to the X-axis is constituted with a structure body formed by bending an elongated arm-like member arranged on the XZ plane, the elastically deformed portion (540) with regard to the Y-axis is constituted with a structure body formed by bending an elongated arm-like member arranged on the YZ plane, and the elastically deformed portion (510) with regard to the X-axis is integrated with the elastically deformed portion (540) with regard to the Y-axis at a position intersecting with the Z-axis.

(30) The thirtieth feature of the present invention resides in a force sensor having the twenty-eighth feature, wherein the deformation body figure (500$fx$) with regard to the X-axis is a cross section figure obtained when the deformation body (500) is cut along the XZ plane, and the deformation body figure (500$fy$) with regard to the Y-axis is a cross section figure obtained when the deformation body (500) is cut along the YZ plane, each of the elastically deformed portion figure (510$f$) with regard to the X-axis and the elastically deformed portion figure (540$f$) with regard to the Y-axis is formed to be symmetrical with the Z-axis, the elastically deformed portion figure (510$f$) with regard to the X-axis and the elastically deformed portion figure (540$f$) with regard to the Y-axis are geometrically congruent figures, and the elastically deformed portion (510) with regard to the X-axis and the elastically deformed portion (540) with regard to the Y-axis are constituted with a part of an elastically deformed integrated portion (570) composed of a rotation body obtained by rotating the congruent figure, with the Z-axis given as the central axis.

(31) The thirty-first feature of the present invention resides in a force sensor having the thirtieth feature, wherein each of a base portion figure group with regard to the X-axis constituted with the first base portion figure (520$f$) with regard to the X-axis and the second base portion figure (530$f$) with regard to the X-axis and a base portion figure group with regard to the Y-axis constituted with the first base portion figure (550$f$) with regard to the Y-axis and the second base portion figure (560$f$) with regard to the Y-axis is formed to be symmetrical with the Z-axis, the base portion figure group with regard to the X-axis and the base portion figure group with regard to the Y-axis are geometrically congruent figures, and the first base portion (520) with regard to the X-axis, the second base portion (530) with regard to the X-axis, the first base portion (550) with regard to the Y-axis, and the second base portion (560) with regard to the Y-axis are constituted with a part of an integrated base portion (580) composed of a rotation body obtained by rotating the congruent figure, with the Z-axis given as the central axis.

(32) The thirty-second feature of the present invention resides in a force sensor having any one of the twenty-eighth to thirty-first features, wherein a first U-letter shaped by-pass (U11) with regard to the X-axis having a U-letter shape is installed at a zone between the first force receiving point (P11) with regard to the X-axis and the first relay point (m11) with regard to the X-axis on the connection channel (R10) with regard to the X-axis, and a second U-letter shaped by-pass (U12) with regard to the X-axis having a U-letter shape is installed at a zone between the second relay point (m12) with regard to the X-axis and the second force receiving point (P12) with regard to the X-axis on the connection channel (R10) with regard to the X-axis, a first U-letter shaped by-pass (U21) with regard to the Y-axis having a U-letter shape is installed at a zone between the first force receiving point (P21) with regard to the Y-axis and the first relay point (m21) with regard to the Y-axis on the connection channel (R11) on the Y-axis, and a second U-letter shaped by-pass (U22) with regard to the Y-axis having a U-letter shape is installed at a zone between the second relay point (m22) with regard to the Y-axis and the second force receiving point (P22) with regard to the Y-axis on the connection channel (R11) with regard to the Y-axis, the detection element comprises;

a first capacitive element (C1) which is constituted with a first displacement electrode (E11) fixed on a bottom of a part of the elastically deformed portion (510) with regard to the X-axis which is arranged along the first U-letter shaped by-pass (U11) with regard to the X-axis and a first fixed electrode (E21) fixed at a part opposite to the first displacement electrode on an upper face of the supporting body (250), a second capacitive element (C2) which is constituted with a second displacement electrode (E12) fixed on a bottom of a part of the elastically deformed portion (510) with regard to the X-axis which is arranged along the second U-letter shaped by-pass (U12) with regard to the X-axis and a second fixed electrode (E22) fixed at a part opposite to the second displacement electrode on the upper face of the supporting body (250), a third capacitive element (C3) which is constituted with a third displacement electrode (E13) fixed on a bottom of a part of the elastically deformed portion (540) with regard to the Y-axis which is arranged along the first U-letter shaped by-pass (U21) with regard to the Y-axis and a third fixed electrode (E23) fixed at a part opposite to the third displacement electrode on the upper face of the supporting body (250), and a fourth capacitive element (C4) which is constituted with a fourth displacement electrode (E14) fixed on a bottom of a part of the elastically deformed portion (540) with regard to the Y-axis which is arranged along the second U-letter shaped by-pass (U22) with regard to the Y-axis and a fourth fixed electrode (E24) fixed at a part opposite to the fourth displacement electrode on the upper face of the supporting body (250), the detection circuit (900) outputs a difference in capacitance value between the first capacitive element (C1) and the second capacitive element (C2) as an electric signal indicating moment My around the Y-axis, a difference in capacitance value between the third capacitive element (C3) and the fourth capacitive element (C4) as an electric signal indicating moment Mx around the X-axis, and a sum of capacitance values of the first capacitive element (C1), the second capacitive element (C2), the third capacitive element (C3) and the fourth capacitive element (C4) as an electric signal indicating force Fz in a direction of the Z-axis.

(33) The thirty-third feature of the present invention resides in an auxiliary structure body for a force sensor which is identical in structure with the deformation body of the force sensor having any one of the first to twenty-second features.

(34) The thirty-fourth feature of the present invention resides in a force sensor (5000) into which the auxiliary structure body according to the thirty-third feature is incorporated, the force sensor which has a function to detect at least force Fz in a direction of the Z-axis and moment My around the Y-axis, of force in respective directions of each coordinate axis and moment around each coordinate axis in an XYZ three-dimensional orthogonal coordinate system, and when the coordinate system is defined so that the Z-axis is given as a perpendicular axis, the force sensor includes a force receiving body (5100) arranged on the Z-axis, a supporting body (5200) arranged below the force receiving body, a detection-use deformation body (5300) which connects the force receiving body with the supporting body to yield at least partially elastic deformation upon exertion of force or moment, the auxiliary structure body (5401 to 5404) connected between the force receiving body and the supporting body, a detection element which detects deformation or displacement of the detection-use deformation body or displacement of the force receiving body or the supporting body, and a detection circuit which outputs electric signals indicating force Fz in the direction of the Z-axis and moment My around the Y-axis which have been exerted on the other in a state that loads are applied to one of the force receiving body and the supporting body on the basis of detection results of the detection element.

(35) The thirty-fifth feature of the present invention resides in an auxiliary structure body (5400) which is used as a part of components by being incorporated into a force sensor which includes a force receiving body (5100), a supporting body (5200) and a detection-use deformation body (5300) connecting the force receiving body with the supporting body, said force censor detects elastic deformation of the detection-use deformation body occurring upon exertion of force or moment, thereby detecting the force or moment which has been exerted, the auxiliary structure body for a force sensor providing an elastically deformed portion (5410), a first base portion (5420) and a second base portion (5430), wherein the elastically deformed portion (5410) is a structure body which yields at least partially elastic deformation and provided at one end thereof with a first force receiving point (P1) for fixing it to a first site of the force receiving body (5100) and at the other end thereof with a second force receiving point (P2) for fixing it to a second site of the force receiving body (5100), thereby forming an arm-like structure body along a predetermined connection channel (R12) which connects the first force receiving point with the second force receiving point, the first base portion (5420) is connected at one end thereof to the elastically deformed portion (5410) in a vicinity of a first relay point (m1) defined on the connection channel (R12) and provided at the other end thereof with a first supporting point (Q1) for fixing it to a first site of the supporting body (5200), the second base portion (5430) is connected at one end thereof to the elastically deformed portion (5410) in a vicinity of a second relay point (m2) defined on the connection channel (R12) and provided at the other end thereof with a second supporting point (Q2) for fixing it to a second site of the supporting body (5200), and when force is exerted on the first force receiving point (P1) and the second force receiving point (P2) at the elastically deformed portion (5410) in a state that the first supporting point (Q1) of the first base portion (5420) and the second supporting point (Q2) of the second base portion (5430) are fixed, the vicinity of the first relay point (m1) at the elastically deformed portion (5410) sways in relation to the first base portion (5420), with a connection point with the first base portion (5420) given as a supporting point, and the vicinity of the second relay point (m2) at the elastically deformed portion (5410) sways in relation to the second base portion (5430), with a connection point with the second base portion (5430) given as a supporting point.

(36) The thirty-sixth feature of the present invention resides in an auxiliary structure body for a force sensor having the thirty-fifth feature, wherein the connection channel (R12) is installed on a VW plane of a VW two-dimensional orthogonal coordinate system and the elastically deformed portion (5410) is formed in an arm-like structure body expanding along the VW plane, and when an origin (G) of the VW two-dimensional orthogonal coordinate system is defined at a position of the center of gravity, the first force receiving point (P1) is positioned at a second quadrant of the VW two-dimensional orthogonal coordinate system, the second force receiving point (P2) is positioned at a first quadrant of the VW two-dimensional orthogonal coordinate system, the first supporting point (Q1) is positioned at a third quadrant of the VW two-dimensional orthogonal coordinate system, and the second supporting point (Q2) is positioned at a fourth quadrant of the VW two-dimensional orthogonal coordinate system.

(37) The thirty-seventh feature of the present invention resides in an auxiliary structure body for a force sensor having the thirty-sixth feature, wherein the auxiliary structure body is constituted with a plate member having an upper face composed of a plane parallel to the VW plane and a lower face composed of a plane parallel to the VW plane.

(38) The thirty-eighth feature of the present invention resides in an auxiliary structure body for a force sensor having the thirty-sixth or the thirty-seventh feature, wherein when the connection channel (R12) is traced so as to move from the first relay point (m1) to the second relay point (m2), the connection channel (R12) is provided with a first advancing channel (r1) which advances in the negative direction of the W-axis and a second advancing channel (r2) which advances in the positive direction of the W-axis.

(39) The thirty-ninth feature of the present invention resides in an auxiliary structure body for a force sensor having the thirty-eighth feature, wherein the first advancing channel (r1) or the second advancing channel (r2) is a channel which passes through the origin (G) of the VW two-dimensional orthogonal coordinate system.

(40) The fortieth feature of the present invention resides in an auxiliary structure body for a force sensor having any one of the thirty-sixth to thirty-ninth features, wherein the connection channel (R12) is provided with a lengthwise direction channel which is parallel to the W-axis and a crosswise direction channel which is parallel to the V-axis, and the lengthwise direction channel expands from the first force receiving point (P1) or the second force receiving point (P2), and the first relay point (m1) and the second relay point (m2) are defined on the crosswise direction channel.

(41) The forty-first feature of the present invention resides in an auxiliary structure body for a force sensor having any one of the thirty-sixth to fortieth features, wherein a first U-letter shaped by-pass (U1) which is formed in a U-letter shape is installed at a zone between the first force receiving point (P1) and the first relay point (m1) on the connection channel (R12), and a second U-letter shaped by-pass (U2) which is formed in a U-letter shape is installed at a zone between the second relay point (m2) and the second force receiving point (P2) on the connection channel (R12).

(42) The forty-second feature of the present invention resides in an auxiliary structure body for a force sensor having the forty-first feature, wherein each of the first U-letter shaped by-pass (U1) and the second U-letter shaped by-pass (U2) is constituted in combination with a pair of lengthwise direction by-passes parallel to the W-axis and a crosswise direction by-pass parallel to the V-axis which connects the pair of lengthwise direction by-passes.

(43) The forty-third feature of the present invention resides in an auxiliary structure body for a force sensor having any one of the thirty-sixth to forty-second features, wherein a constricted portion (54; 55) narrow in width in a direction orthogonal to the connection channel (R12) is installed at a part of the arm-like structure body which constitutes the elastically deformed portion (5410; 5510).

(44) The forty-fourth feature of the present invention resides in an auxiliary structure body for a force sensor having any one of the thirty-sixth to forty-third features, wherein a weight adjusting portion (62) which projects in a direction orthogonal to the connection channel (R12) is installed at a specific site of the arm-like structure body which constitutes the elastically deformed portion (5410; 5510).

(45) The forty-fifth feature of the present invention resides in an auxiliary structure body for a force sensor having any one of the thirty-sixth to forty-fourth features, wherein a connection end of the first base portion (5420; 5520) and the second base portion (5430; 5530) with the elastically deformed portion (5410; 5510) constitutes a constricted leading end (5421, 5431; 5521, 5531) narrower in width than the other part.

(46) The forty-sixth feature of the present invention resides in a force sensor (5000) into which an auxiliary structure body having any one of the thirty-sixth to forty-fifth features is incorporated as a part of components, the force sensor providing a force receiving body (5100), a supporting body (5200), a detection-use deformation body (5300) connecting the force receiving body with the supporting body, a detection element (D) which detects elastic deformation of the detection-use deformation body, a detection circuit (5900) which outputs a detection signal of force or moment which has been exerted on the basis of detection results of the detection element, and the auxiliary structure body (5400; 5500), wherein the first force receiving point (P1) and the second force receiving point (P2) at the auxiliary structure body are joined to a lower face of the force receiving body (5100), and the first supporting point (Q1) and the second supporting point (Q2) at the auxiliary structure body are joined to an upper face of the supporting body (5200).

(47) The forty-seventh feature of the present invention resides in a force sensor having the forty-six feature, wherein the force receiving body (5100) and the supporting body (5200) are constituted with a plate member which has an upper face and a lower face, each of which is parallel to the XY plane, and the Z-axis penetrates through the force receiving body (5100) and the supporting body (5200), four sets of auxiliary structure bodies are incorporated so as to surround a periphery of the detection-use deformation body (5300) which connects the force receiving body (5100) with the supporting body (5200), a first auxiliary structure body (5401) is arranged so that the V-axis is parallel to the Y-axis and the W-axis is parallel to the Z-axis at a position at which the VW plane intersects with the positive X-axis, a second auxiliary structure body (5402) is arranged so that the V-axis is parallel to the X-axis and the W-axis is parallel to the Z-axis at a position at which the VW plane intersects with the positive Y-axis, a third auxiliary structure body (5403) is arranged so that the V-axis is parallel to the Y-axis and the W-axis is parallel to the Z-axis at a position at which the VW plane intersects with the negative X-axis, a fourth auxiliary structure body (5404) is arranged so that the V-axis is parallel to the X-axis and the W-axis is parallel to the Z-axis at a position at which the VW plane intersects with the negative Y-axis, and the first force receiving point (P1) and the second force receiving point (P2) at each of the auxiliary structure bodies are joined on a lower face of the force receiving body (5100), and the first supporting point (Q1) and the second supporting point (Q2) at each of the auxiliary structure bodies are joined on an upper face of the supporting body (5200).

Effects of the Invention

The force sensor according to the present invention adopts a structure in which a relay point at two sites of an elastically deformed portion, the both ends of which are connected to a force receiving body, is fixed to a supporting body by using a base portion. Therefore, a drag force which prevents deformation of the elastically deformed portion can be selectively exerted depending on a type of external force exerted on the force receiving body. As a result, it is possible to provide a force sensor which is able to easily adjust the balance of detection sensitivity between moment and force when the sensor is designed.

Further, the auxiliary structure body which is used in the force sensor of the present invention adopts such a structure that has an elastically deformed portion for connecting the both ends thereof with the force receiving body and a base portion for fixing the relay point at two sites thereof to the supporting body. Therefore, a force sensor in which the auxiliary structure body has been incorporated is able to selectively exert a drag force which prevents deformation of the elastically deformed portion depending on a type of external force exerted on the force receiving body. It is, therefore, possible to provide a force sensor which easily adjusts the balance of detection sensitivity between moment and force when the sensor is designed.

BRIEF DESCRIPTION OF THE DRAWINGS

FIG. 6 is a partially enlarged front sectional view in which FIG. 5 is partially enlarged.

FIG. 36 is a table which compares the conventional force sensor shown in FIG. 24 with the force sensor shown in FIG. 25 according to the present invention in terms of detection values obtained upon exertion of force in the direction of each axis and moment around each axis.

BEST MODE FOR CARRYING OUT THE INVENTION

Hereinafter, a description will be given of the present invention by referring to the illustrated embodiments. Here, a plurality of embodiments have been described by being separated into individual chapters. Thus, a list of contents in each of the chapters is given at the beginning.

<<<List of Contents>>>

Figure 1:
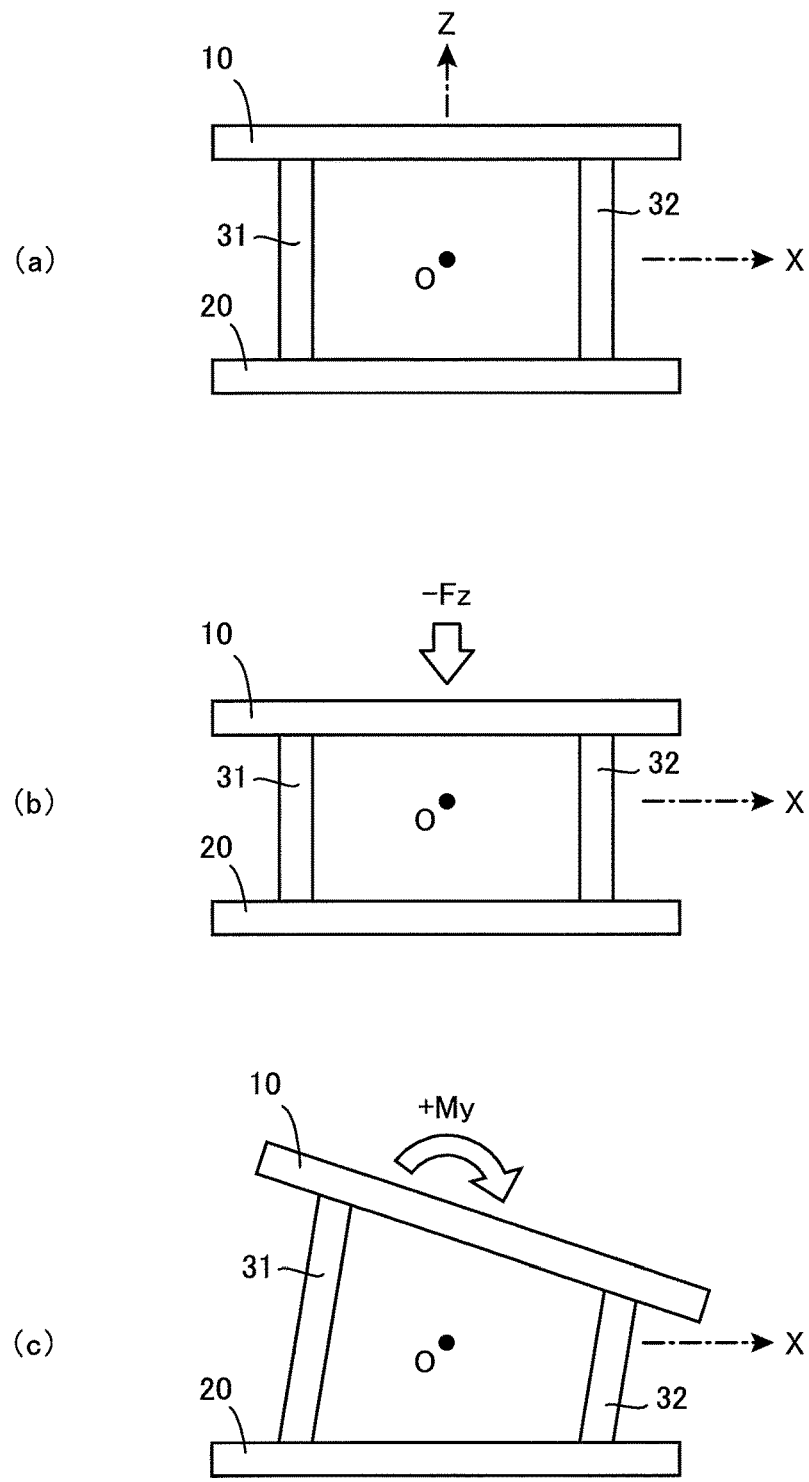
FIG. 1 is a front view which shows a principle of detecting force and moment by a conventional force sensor by using a pair of columnar members.
Figure 2:
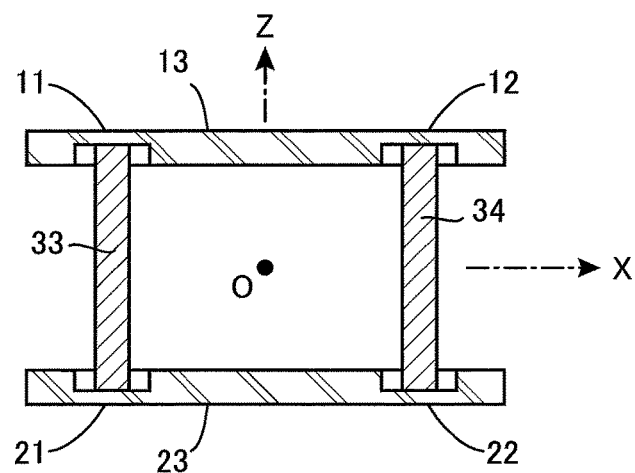
FIG. 2 is a front sectional view which shows a structure of a conventional force sensor which adopts a structure for supporting upper and lower parts of a columnar member by using a diaphragm.
Figure 3:
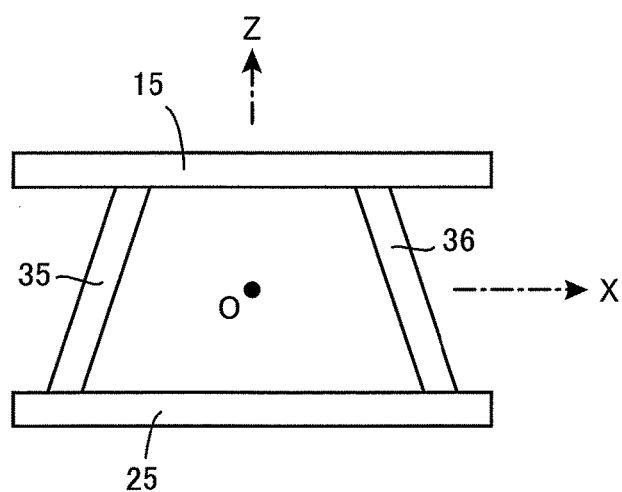
FIG. 3 is a front view which shows a structure of a force sensor in which a pair of columnar members are arranged in an inclined state.

Chapter 1. Basic structure of conventional force sensor and problems thereof (FIG. 1 to FIG. 3)

Chapter 2. Structure of basic structure body in the present invention (FIG. 4 to FIG. 7)

Figure 8:
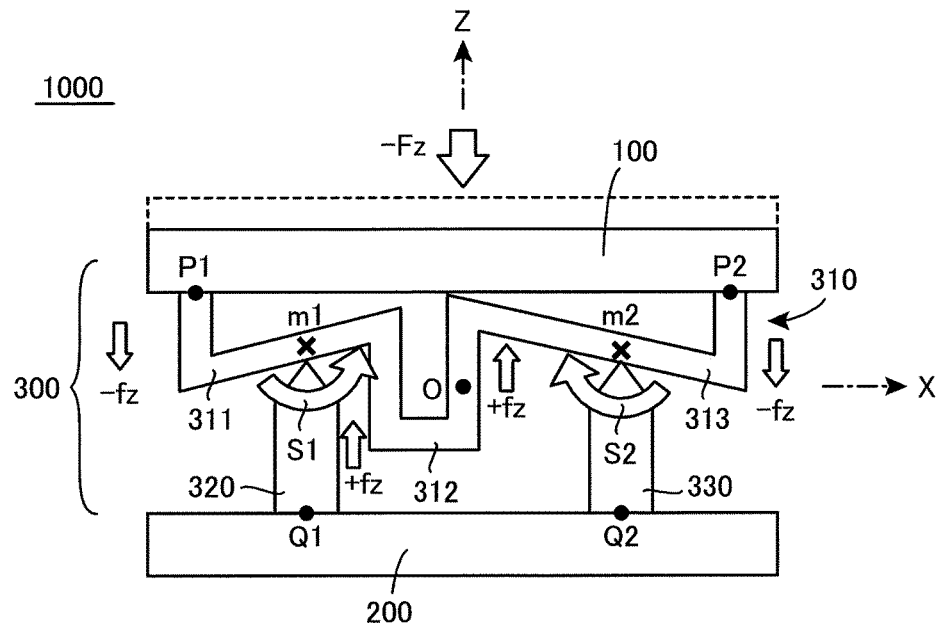
FIG. 8 is a front view which shows a deformed state of each portion when downward force −Fz is exerted on a force receiving body 100 in the basic structure body shown in FIG. 4.
Figure 9:
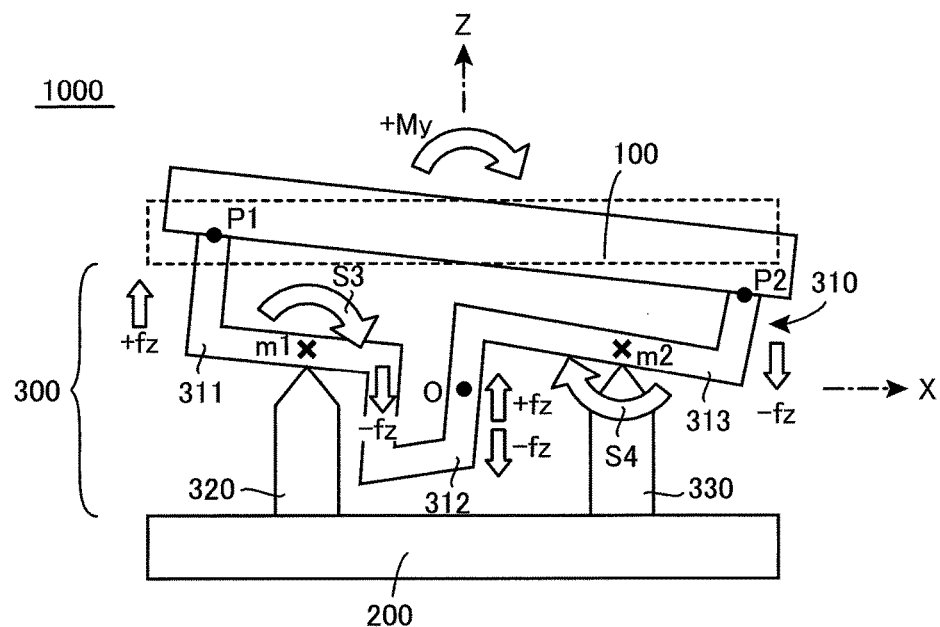
FIG. 9 is a front view which shows a deformed state of each portion when clockwise moment +My is exerted on the force receiving body 100 in the basic structure body shown in FIG. 4.

Chapter 3. Essential functions of basic structure body in the present invention (FIG. 8, FIG. 9)

Chapter 4. Modification examples of basic structure body in the present invention
    4-0. Characteristics of basic structure body 1000 (FIG. 10)
    4-1. First modification example (FIG. 11)
    4-2. Second modification example (FIG. 12)
    4-3. Third modification example (FIG. 13)
    4-4. Fourth modification example (FIG. 14)
    4-5. Fifth modification example (FIG. 15)
    4-6. Sixth modification example (FIG. 16)
    4-7. Seventh modification example (FIG. 17)
    4-8. Eighth modification example (FIG. 18)
    4-9. Ninth modification example (FIG. 19)
    4-10. Combination of individual modification examples
    4-11. Three dimensional structure of basic structure body
    4-12. Adjustment of detection sensitivity of moment Mx Chapter 5. Basic embodiment of force sensor in the present invention
    5-1. Basic constituents of force sensor in the present invention
    5-2. Cross-section structure of force sensor 3000 (FIG. 20, FIG. 21)
    5-3. Detection motions of force sensor 3000
    5-4. First example of three-dimensional structure of force sensor 3000 (FIG. 22)
    5-5. Second example of three-dimensional structure of force sensor 3000 (FIG. 23)
    5-6. Other examples of force sensor 3000

Chapter 6. Auxiliary structure body of the present invention and force sensor into which the auxiliary structure body is incorporated
    6-1. Concept of auxiliary structure body (FIG. 24)
    6-2. Force sensor into which the auxiliary structure body is incorporated (FIG. 25)
    6-3. Embodiment of practical auxiliary structure body (FIG. 26, FIG. 27)
    6-4. Specific deformation mode of auxiliary structure body (FIG. 28 to FIG. 36)

<<<Chapter 1. Basic Structure of Conventional Force Sensor and Problems Thereof>>>

First, for convenience of description, the conventional multi-axis force sensors disclosed in Patent Documents 1 to 3 will be described for a basic structure and problems thereof. FIG. 1 is a front view which shows a principle of detecting force and moment by the force sensor disclosed in Patent Document 1.

As shown in FIG. 1(a), a basic structure body which constitutes a mechanical structure portion of the force sensor is composed of a force receiving body 10, a supporting body 20, and deformation bodies 31, 32. Here, for convenience of description, as shown in the drawing, an origin O is placed at the center position of the basic structure body, an X-axis is placed on the right-hand side in the drawing, a Z-axis is placed upward in the drawing, and a Y-axis is placed in a depth direction which is perpendicular to the sheet surface of the drawing, thereby defining an XYZ three-dimensional orthogonal coordinate system. In the example shown in the drawing, each of the force receiving body 10 and the supporting body 20 is constituted with a plate member having both upper and lower faces in parallel to an XY plane. The deformation bodies 31, 32 are constituted with a pair of columnar members.

The deformation bodies 31, 32 are columnar members which connect the force receiving body 10 with the supporting body 20 and constituted with a material which will yield elastic deformation (for example, metal). Therefore, when an external force is exerted on the force receiving body 10 in a state that the supporting body 20 is fixed (a loaded state), the deformation bodies 31, 32 will yield elastic deformation in accordance with the exerted external force and the basic structure body will be deformed as a whole.

FIG. 1(b) is a front view which shows a deformed state of the basic structure body when force −Fz in the negative direction of the Z-axis (downward force in the drawing) is exerted on the force receiving body 10. The deformation bodies 31, 32 yield contraction deformation in a lengthwise direction in the drawing, and the force receiving body 10 is displaced downward. On the other hand, FIG. 1(c) is a front view which shows a deformed state of the basic structure body when moment around the Y-axis (clockwise rotational force in the drawing) is exerted on the force receiving body 10. The deformation body 31 yields expansion deformation in the lengthwise direction in the drawing, while the deformation body 32 yields contraction deformation in the lengthwise direction in the drawing. And, the force receiving body 10 inclines in a state of descending to the right-hand side. In FIG. 1(b) and FIG. 1(c), the deformed state is depicted in a substantially exaggerated manner. Actually, detection can be performed for deformation even if it is not large as depicted in the above drawings.

In the present application, a rotation direction which allows a right-hand thread to move forward in the positive direction of a specific coordinate axis is defined as the positive rotation direction around the specific coordinate axis. Therefore, the moment indicated by a white arrow in FIG. 1(c) is positive moment +My around the Y-axis. Here, the origin O in an XYZ three-dimensional orthogonal coordinate system is a point which is to be defined so as to be positioned at the center of rotation of moment exerted on the force receiving body 10, and an accurate position thereof is actually determined by a whole structure of a system into which the basic structure body is incorporated. For example, in a system where the moment +My is exerted with a predetermined point inside the force receiving body 10 given as a center of rotation, strictly speaking, the moment is required to be handled by giving the predetermined point as the origin O. However, in practice, no large difference is found in detection accuracy of the moment, even if the position of the origin O slightly deviates. Therefore, in the present application, for convenience of description, there is shown an example where the origin O is placed at the center position of the basic structure body.

FIG. 1 shows a state in which force −Fz and moment +My are exerted. Upon exertion of force +Fz, the force receiving body 10 is displaced upward, and upon exertion of moment −My, the force receiving body 10 inclines in a state of descending to the left-hand side. Although not illustrated, also upon exertion of force Fx in the direction of the X-axis, force Fy in the direction of the Y-axis, moment Mx around the X-axis and moment Mz around the Z-axis, the basic structure body is individually deformed in a state unique to each case. Further, individual deformation amount depends on the magnitude of exerted force. Thus, a detection element is installed for detecting the uniquely deformed state and the deformation amount, thus making it possible to detect forces Fx, Fy, Fz in the direction of each coordinate axis and moments Mx, My, Mz around each coordinate axis in the XYZ three-dimensional orthogonal coordinate system. In practice, there is added a detection circuit which outputs an electric signal indicating each axis component by computation on the basis of detection results of the detection element.

The detection element includes any given element which detects deformation or displacement of the deformation bodies 31, 32 (for example, displacement in relation to the supporting body 20), displacement of the force receiving body 10 in relation to the supporting body 20 and displacement of the supporting body 20 in relation to the force receiving body 10.

For example, a strain gauge attached to specific sites of the deformation bodies 31, 32 can be used as an element which detects deformation. Where the deformation bodies 31, 32 made of columnar members are deformed as illustrated in the drawing, mechanical strain will occur at each portion. It is, therefore, possible to electrically detect the strain as change in electrical resistance of the strain gauge. On the other hand, as an element for detecting displacement, there can be used a capacitive element which is constituted with a displacement electrode fixed to a displacement occurring side and a fixed electrode fixed to a side at which no displacement occurs. For example, a capacitive element is constituted by allowing a displacement electrode which is fixed to a specific site of each of the deformation bodies 31, 32 to oppose a fixed electrode which is fixed to the supporting body 20, thus making it possible to electrically detect displacement of the displacement electrode as change in capacitance value of the capacitive element.

In Patent Document 2 given above, there is disclosed the force sensor which is constituted with a deformation body having four columnar members and provided with a capacitive element as a detection element, thus making it possible to independently detect six axis components, Fx, Fy, Fz, Mx, My, Mz, in an XYZ three-dimensional orthogonal coordinate system. For facilitating deformation of the deformation body, the above-described document has also disclosed an example which adopts a structure for supporting upper and lower parts of the columnar member by using a diaphragm as shown in the front sectional view of FIG. 2. In this example, a columnar member 33 is such that an upper end thereof is connected to a force receiving body 13 via a diaphragm 11 and a lower end thereof is connected to a supporting body 23 via a diaphragm 21. On the other hand, a columnar member 34 is such that an upper end thereof is connected to the force receiving body 13 via a diaphragm 12 and a lower end thereof is connected to the supporting body 23 via a diaphragm 22.

In the case of the example shown in FIG. 2, the deformation body is constituted with the columnar members 33, 34 and the diaphragms 11, 12, 21, 22. The deformation body is deformed mainly by deformation of the diaphragms 11, 12, 21, 22. Therefore, it is possible to adjust detection sensitivity by setting the thickness of each of the diaphragms 11, 12, 21, 22. Further, a capacitive element is formed with displacement electrodes formed on the diaphragms 11, 12, 21, 22 and a fixed electrode fixed to the supporting body 23, thus making it possible to detect displacement of the diaphragms as change in capacitance value of the capacitive element.

In Patent Document 3 given above, as shown in the front view of FIG. 3, there is also disclosed the force sensor in which a pair of columnar members 35, 36 that constitute a deformation body are arranged in an inclined manner so as to give a reverse V-letter shape between a force receiving body 15 and a supporting body 25, Thus, a basic structure body in which the columnar members 35, 36 are arranged in an inclined manner can be used to constitute a detection element more simply.

As described above, the basic structure bodies used in a conventional general force sensor are illustrated in FIG. 1 to FIG. 3. Each of these basic structure bodies is provided with such a structure that has the deformation body between the force receiving body and the supporting body and is able to detect exertion of force and moment by detecting a mode of elastic deformation occurring on the deformation body by means of a detection element. In particular, each of the force sensors disclosed in Patent Documents 1 to 3 given above is able to independently detect six axis components, Fx, Fy, Fz, Mx, My, Mz in an XYZ three-dimensional orthogonal coordinate system.

However, the six axis components are not necessarily uniform in detection sensitivity. Direct use of detection values obtained by the detection element will result in a difference in detection range of each of the axis components. Therefore, in practice, it is necessary that an axis component low in sensitivity is subjected to analog amplification or digital amplification to correct the sensitivity. However, the amplification also amplifies errors such as noises as well, which poses a problem of lowering in detection accuracy as described above.

The difference in detection sensitivity tends to become apparent between force and moment in particular. This is due to the fact that, as described above, the magnitude of moment is a value which is obtained by multiplying the magnitude of an exerted external force by a distance between an exertion point and a center of rotation (origin O).

For example, FIG. 1(c) shows a state that moment +My is directly exerted on the force receiving body 10. Where the force sensor is used by being incorporated into an input device such as a joystick, an operating rod is attached to the illustrated force receiving body 10 so as to project upward, and a user operates the operating rod. Therefore, the longer the operating rod becomes, the larger, the value of exerted moment (rotational force around the origin O) becomes, thus resulting in higher detection sensitivity when operation is performed for turning down the operating rod (operation for generating moment My). In contrast, the detection sensitivity when the operating rod is pressed downward in the drawing (operation for generating force −Fz) is kept constant, regardless of the length of the operating rod.

The inventor of the present invention has manufactured on a trial basis a joystick-type input device into which the force sensor disclosed in any of Patent Documents 1 to 3 is incorporated, and the inventor found that, when a distance between an origin O and an exertion point (leading end of the operating rod) is set to be about 100 mm (0.1 m), the detection sensitivity when operation is performed for turning down the operating rod (operation for generating moment My) is several times higher than the detection sensitivity when operation is performed for pressing the operating rod (operation for generating force −Fz). Therefore, commercialization of the input device will require correction treatment which amplifies a detection value of force −Fz on use.

Of course, a difference in detection sensitivity between force and moment can be adjusted to some extent by changing a structure of each portion of the deformation body or dimensions thereof. It is, however, impossible to flexibly adjust the balance in a proposed structure of the conventional deformation body. In particular, in the basic structure bodies shown in FIG. 1 to FIG. 3, it is difficult to adjust the balance of detection sensitivity between force Fz and moment My. The present invention is to provide a new basic structure body which is suitable for adjusting the balance.

<<<Chapter 2. Structure of Basic Structure Body in the Present Invention>>>

Figure 4:
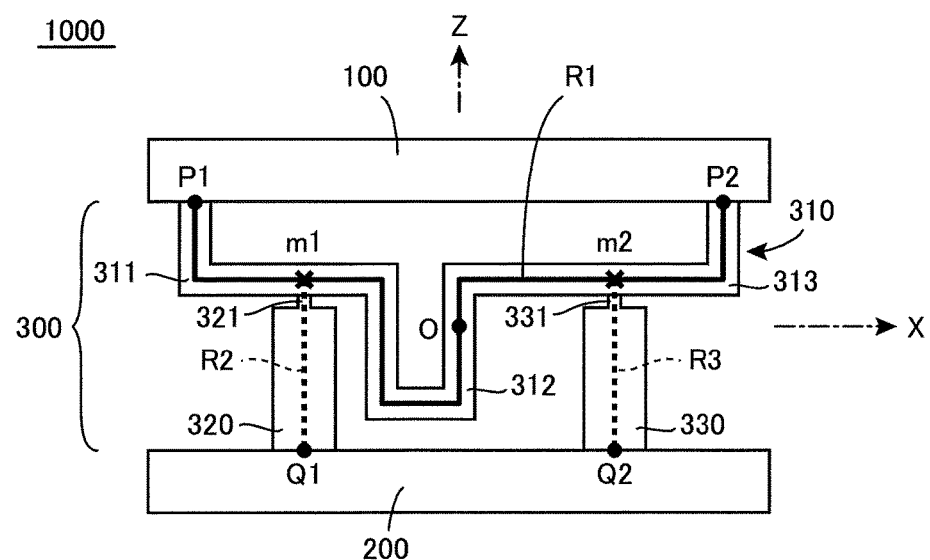
FIG. 4 is a front view which shows a basic structure body of a force sensor according to a basic embodiment of the present invention.

FIG. 4 is a front view which shows a basic structure body 1000 for a force sensor according to a basic embodiment of the present invention. The basic structure body 1000 is, as with the conventional basic structure body described in Chapter 1, constituted with a force receiving body 100, a supporting body 200 and a deformation body 300. In this case as well, an origin O is placed at the center position of the basic structure body 1000, the X-axis is placed on the right-hand side in the drawing, the Z-axis is placed above in the drawing, and the Y-axis is placed in a depth direction which is perpendicular to the sheet surface of the drawing, thereby defining an XYZ three-dimensional orthogonal coordinate system. Here, the basic structure body is similar to the conventional basic structure body described in Chapter 1 in that each of the force receiving body 100 and supporting body 200 is constituted with a plate member having an upper face and a lower face, each of which is parallel to the XY plane but the deformation body 300 differs significantly from the conventional one.

As illustrated in the drawing, the deformation body 300 is provided with an elastically deformed portion 310 which is connected to the force receiving body 100 at predetermined sites to yield elastic deformation, a first base portion 320 and a second base portion 330, each of which fixes the predetermined sites of the elastically deformed portion 310 to the supporting body 200. The elastically deformed portion 310 is constituted with a structure body which is obtained by bending an elongated arm-like member, and a left end thereof is connected to a first force receiving point P1 installed on the left-hand side of a lower face of the force receiving body 100, while a right end thereof is connected to a second force receiving point P2 installed on the right-hand side of the lower face of the force receiving body 100. Therefore, the elastically deformed portion 310 is a member which couples the first force receiving point P1 to the second force receiving point P2.

On the other hand, the first base portion 320 is such that an upper end thereof is connected to the vicinity of a first relay point m1 at the elastically deformed portion 310 and a lower end thereof is connected to a first supporting point Q1 installed on the left-hand side of an upper face of the supporting body 200. Thus, the first base portion is a member which couples the vicinity of the first relay point m1 at the elastically deformed portion 310 to the first supporting point Q1 defined on the supporting body 200. Further, the second base portion 330 is such that an upper end thereof is connected to the vicinity of a second relay point m2 at the elastically deformed portion 310 and a lower end thereof is connected to a second supporting point Q2 installed on the right-hand side of the upper face of the supporting body 200. Thus, the second base portion is a member which couples the vicinity of the second relay point m2 at the elastically deformed portion 310 to the second supporting point Q2 defined on the supporting body 200.

Here, in order to describe a structure of the elastically deformed portion 310, consideration is given to a connection channel R1 which connects the first force receiving point P1 with the second force receiving point P2 (indicated by the thick solid line in the drawing). The connection channel R1 includes any channel, as long as it is a channel connecting two points, P1 and P2. In the case of the example illustrated here, it is constituted with a bent channel which is included on the XZ plane. Further, in the example illustrated in the drawing, the connection channel R1 is given as a channel which passes through the origin O of the XYZ three-dimensional orthogonal coordinate system. For convenience of description, the points P1, P2, Q1, Q2, m1, m2 and O are illustrated in FIG. 4. However, these points are actually points on the XZ plane.

The connection channel R1 performs a function as the central axis of the elastically deformed portion 310. The elastically deformed portion 310 is constituted with an elongated arm-like member expanding along the connection channel R1. The transverse cross section of the elastically deformed portion 310 (a cross section cut along a plane orthogonal to the connection channel R1) may be rectangular or circular in shape or may assume any given other shape. It may be constituted with a pipe which is hollow inside, if necessary. The elastically deformed portion 310 may be made with any material, as long as the material will yield elastic deformation upon exertion of an external force to be detected. However, in view of commercialization, it is preferably constituted with metal or resin which can be easily machined.

Each of the first relay point m1 and the second relay point m2 which is indicated by the cross mark in FIG. 4 is a point defined on the connection channel R1. Here, for convenience of description, of the elastically deformed portion 310, a portion which is arranged at a section from the first force receiving point P1 to the first relay point m1 is referred to as a first external arm-like portion 311, a portion which is arranged at a section from the first relay point m1 to the second relay point m2 is referred to as an internal arm-like portion 312, and a portion which is arranged at a section from the second relay point m2 to the second force receiving point P2 is referred to as a second external arm-like portion 313.

The first base portion 320 is a connection member which is arranged along a first supporting channel R2 (indicated by the thick dashed line in the drawing) that connects the first relay point m1 with the first supporting point Q1. The second base portion 330 is a connection member which is arranged along a second supporting channel R3 (indicated by the thick dashed line in the drawing) that connects the second relay point m2 with the second supporting point Q2. In the case of the illustrated example, the first supporting point Q1 is defined directly below the first relay point m1, and the second supporting point Q2 is defined directly below the second relay point m2. Therefore, the first supporting channel R2 and the second supporting channel R3 are given as a straight line in parallel with the Z-axis.

The first base portion 320 and the second base portion 330 may be constituted with a material of any shape, as long as the material can perform a function to support the elastically deformed portion 310 above the supporting body 200 in the vicinity of the first relay point m1 and in the vicinity of the second relay point m2. In the case of the illustrated example, the first base portion 320 is constituted with a cylindrical structure body in which the first supporting channel R2 is given as the central axis, and at an upper end thereof, a first base-narrowed portion 321 small in radius is formed. The vicinity of the first relay point m1 at the elastically deformed portion 310 is connected to an upper face of the first base-narrowed portion 321. Similarly, the second base portion 330 is constituted with a cylindrical structure body in which the second supporting channel R3 is given as the central axis, and at an upper end thereof, a second base-narrowed portion 331 small in radius is formed. The vicinity of the second relay point m2 at the elastically deformed portion 310 is connected to the upper face of the second base-narrowed portion 331.

The first base portion 320 and the second base portion 330 may or may not undergo elastic deformation and, therefore, may be constituted with any given material. However, in view of commercialization, as with the elastically deformed portion 310, they are preferably constituted with metal or resin which can be easily machined. In this case, upon exertion of an external force on the force receiving body 100, the first base portion 320 and the second base portion 330 will undergo elastic deformation, together with the elastically deformed portion 310. The force receiving body 100 and the supporting body 200 may also be constituted with metal or resin.

Figure 5:
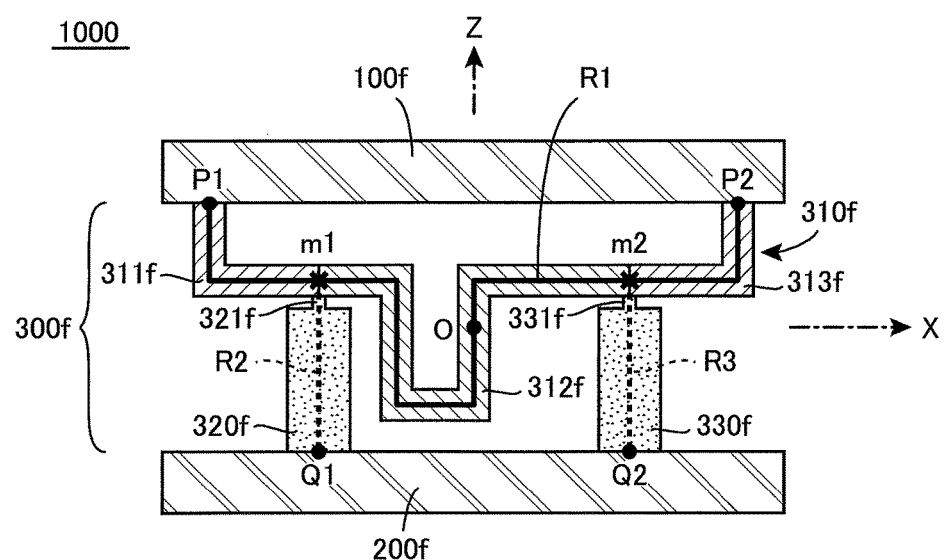
FIG. 5 is a front sectional view which shows a cross section obtained by cutting the basic structure body shown in FIG. 4 along an XZ plane.

FIG. 5 is a front sectional view which shows a cross section obtained by cutting the basic structure body 1000 in FIG. 4 along the XZ plane. In the present application, each of the geometric figures appearing on a cross section when each portion constituting the basic structure body is cut along a predetermined plane is given a name having a word of "figure" added to the end of a name of each of the original portions and indicated by adding a symbol of "f" (meaning "figure") to the end of a symbol of each of the original portions.

Therefore, in the case of the front sectional view shown in FIG. 5, a figure appearing on a cross section of the force receiving body 100 is given a force receiving body figure 100f, a figure appearing on a cross section of the supporting body 200 is termed a supporting body figure 200f, a figure appearing on a cross section of the deformation body 300 is termed a deformation body figure 300f. In the case of the example illustrated here, each of the force receiving body 100 and the supporting body 200 is a plate member having an upper face and a lower face, each of which is parallel to the XY plane. Therefore, each of the force receiving body figure 100f and the supporting body figure 200f is rectangular, as illustrated in the drawing. Further, the deformation body figure 300f which is held between the force receiving body figure 100f and the supporting body figure 200f is a figure which includes an elastically deformed portion figure 310f which is a cross section of the elastically deformed portion 310, a first base portion figure 320f which is a cross section of the first base portion 320, and a second base portion figure 330f which is a cross section of the second base portion 330. Here, the elastically deformed portion figure 310f is constituted with a first external arm-like portion figure 311f, an internal arm-like portion figure 312f and a second external arm-like portion figure 313f. On the other hand, the upper end of the first base portion figure 320f is constituted with a first base-narrowed portion figure 321f, and the upper end of the second base portion figure 330f is constituted with a second base-narrowed portion figure 331f.

In the front sectional view of FIG. 5 as well, a connection channel R1 is indicated by the thick line. The connection channel R1 is a polygonal line channel which connects a first force receiving point P1 with a second force receiving point P2 defined on a contour of the force receiving body figure 100*f* and also given as a channel included on the XZ plane. The elastically deformed portion figure 310*f* is arranged along the polygonal line connection channel R1 and given as an arm-like figure which couples the first force receiving point P1 to the second force receiving point P2. Then, the first base portion figure 320*f* assumes a figure which is connected to the elastically deformed portion figure 310*f* in the vicinity of a first relay point m1 defined on the connection channel R1. The second base portion figure 330*f* assumes a figure which is connected to the elastically deformed portion figure 310*f* in the vicinity of a second relay point m2 defined on the connection channel R1.

As shown in the front view of FIG. 4, each of the first base portion 320 and the second base portion 330 is a member for supporting the elastically deformed portion 310 from below. Therefore, in the front sectional view of FIG. 5, the first base-narrowed portion figure 321*f* which is a connection end above the first base portion figure 320*f* is connected below in the vicinity of the first relay point m1 at the elastically deformed portion figure 310*f*. The second base-narrowed portion figure 331*f* which is a connection end above the second base portion figure 330*f* is connected below in the vicinity of the second relay point m2 at the elastically deformed portion figure 310*f*. Further, as shown in the front sectional view of FIG. 5, the first base portion figure 320*f* is arranged along a first supporting channel R2 (indicated by the thick dashed line in the drawing) which connects the first relay point m1 defined on the connection channel R1 with the first supporting point Q1 defined on a contour of the supporting body figure 200*f*, assuming a figure which couples the elastically deformed portion figure 310*f* to the supporting body figure 200*f*. Similarly, the second base portion figure 330*f* is arranged along a second supporting channel R3 (indicated by the thick dashed line in the drawing) which connects a second relay point m2 defined on the connection channel R1 with a second supporting point Q2 defined on a contour of the supporting body figure 200*f*, assuming a figure which couples the elastically deformed portion figure 310*f* to the supporting body figure 200*f*.

Here, it is important that a first base-narrowed portion 321 is formed at the upper end of the first base portion 320 and a second base-narrowed portion 331 is formed at the upper end of the second base portion 330. This means that, in the front sectional view of FIG. 5, the vicinity of the first relay point m1 at the elastically deformed portion figure 310*f* is supported by a first base-narrowed portion figure 321*f* narrow in width and the vicinity of the second relay point m2 is supported by a second base-narrowed portion figure 331*f* narrow in width. Each of the base portions is made narrow at the leading end thereof to support the elastically deformed portion 310. This is because upon exertion of an external force on the force receiving body 100, the vicinity of the first relay point m1 and the vicinity of the second relay point m2 at the elastically deformed portion 310 are to sway in relation to the first base portion 320 and the second base portion 330. Hereinafter, a detailed description will be given of this point.

Figure 6:
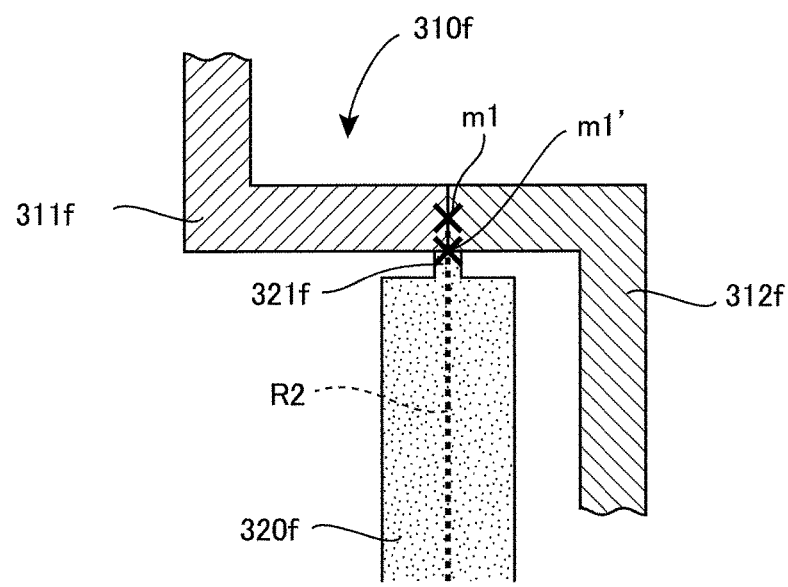

FIG. 6 is a partially enlarged front sectional view in which a part of FIG. 5 (the vicinity of the first relay point m1) is enlarged. Here, with reference to the sectional view, consideration is given to a deformation mode of each portion when an external force is exerted on the force receiving body 100. As illustrated in the drawing, the elastically deformed portion figure 310*f* is divided into the first arm-like portion figure 311*f* positioned on the left-hand side and the internal arm-like portion figure 312*f* positioned on the right-hand side, with the position of the first relay point m1 given as a border line. Then, as described above, the first base portion figure 320*f* is arranged along the first supporting channel R2 which connects the first relay point m1 with the first supporting point Q1 defined on a contour of the supporting body figure 200*f*.

The upper end of the first base portion figure 320*f* is a part which functions as a connection end with the elastically deformed portion figure 310*f* and constitutes a narrowed figure which is narrower in width than other parts. Therefore, here, it is termed a first base narrowed portion figure 321*f*. Similarly, the upper end of the second base portion figure 330*f* is a part which functions as a connection end with the elastically deformed portion figure 310*f* and constitutes a narrowed figure which is narrower in width than other parts. Therefore, here, it is termed a second base narrowed portion figure 331*f*.

As described above, the upper end of the first base portion figure 320*f* forms the first base-narrowed portion figure 321*f*. Therefore, the first base portion figure 320*f* is connected to the elastically deformed portion figure 310*f* substantially in a point contact state. Similarly, the upper end of the second base portion figure 330*f* forms the second base-narrowed portion figure 331*f*. Therefore, the second base portion figure 330*f* is connected to the elastically deformed portion figure 310*f* substantially in a point contact state. In other words, in FIG. 4, the upper end of the first base portion 320 (first base narrowed portion 321) is connected to the lower face of the elastically deformed portion 310 substantially in a point contact state which is small in contact area. And, the upper end of the second base portion 330 (second base-narrowed portion 331) is connected to the lower face of the elastically deformed portion 310 substantially in a point contact state which is small in contact area.

As shown in the cross sectional view of FIG. 6, the first base narrowed portion figure 321*f* is connected to a position of point m1' on a contour of the elastically deformed portion figure 310*f* (an intersection point of the first supporting channel R2 and the contour of the elastically deformed portion figure (310*f*). However, as described above, this connection mode is substantially in a point contact state. Therefore, here, for convenience of description, consideration is given to a deformation mode of each portion upon exertion of an external force which is approximate to a state that both the figures are in a point contact state.

Figure 7:
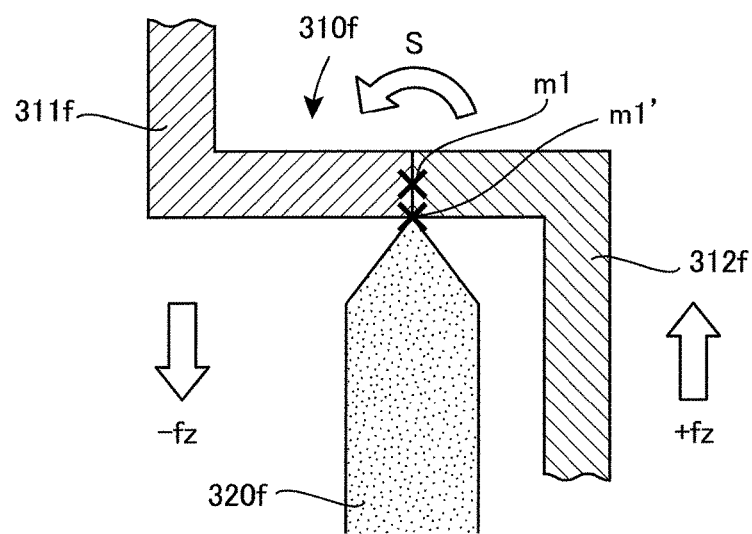
FIG. 7 is an approximate sectional view which describes swaying displacement of a part shown in FIG. 6.

FIG. 7 is an approximate sectional view which shows a state that portions given in FIG. 6 are subjected to the approximation. With reference to the approximate sectional view, it will be easily understood that the elastically deformed portion figure 310*f* undergoes swaying displacement upon exertion of an external force. As shown in FIG. 7, on the assumption that the first base portion figure 320*f* and the elastically deformed portion figure 310*f* are in point contact with each other at a connection point m1', the connection point m1' functions as a supporting point.

With reference to an overall structure of the basic structure body 1000 shown in FIG. 4, it is found that when an external force is exerted on the force receiving body 100, in a state that the supporting body 200 is fixed, the external force is transmitted from the first force receiving point P1 to the first external arm-like portion 311 and also transmitted from the second force receiving point P2 to the second external arm-like portion 313.

Thus, consideration is given to a case where, as shown in FIG. 7, downward force −fz is exerted on the first external arm-like portion figure 311*f* from the first force receiving point P1. In this case, the first external arm-like portion figure (311*f* is displaced downward. However, since the supporting point m1' is supported by the first base portion figure 320f, the internal arm-like portion figure 312f is, in contrast, displaced upward. In other words, upward force +fz is exerted on the internal arm-like portion figure 312f. As a result, the elastically deformed portion figure 310f sways counterclockwise, with the point m1' given as a supporting point, as indicated by the white arrow S.

In contrast, when upward force +fz is exerted on the first external arm-like portion figure 311f from the first force receiving point P1, the first external arm-like portion figure 311f is displaced upward, and the internal arm-like portion figure 312f is displaced downward. And, the elastically deformed portion figure 310f sways clockwise in a direction opposite to the direction indicated by the white arrow S, with the point m1' given as a supporting point. Of course, the vicinity of the second relay point m2 which is supported by the second base portion 330 also sways similarly, with the point m2' given as a supporting point.

Consequently, in the basic structure body 1000 shown in FIG. 4, when an external force is exerted on the force receiving body 100 in a state that the supporting body 200 is fixed (as described in Chapter 3, when at least force Fz in the direction of the Z-axis or moment My around the Y-axis is exerted), the vicinity of the first relay point m1 at the elastically deformed portion 310 sways in the direction of the X-axis in relation to the first base portion 320, with the connection point m1' with the first base portion 320 given as a supporting point, and the vicinity of the second relay point m2 at the elastically deformed portion 310 sways in the direction of the X-axis in relation to the second base portion 330, with the connection point m2' with the second base portion 330 given as a supporting point.

A description will be given of the above-described sway phenomena by referring to the sectional view of FIG. 5. The vicinity of the first relay point m1 at the elastically deformed portion figure 310f sways in relation to the first base portion figure 320f, with the intersection point m1' of the first supporting channel R2 and the contour of the elastically deformed portion figure 310f given as a supporting point, and the vicinity of the second relay point m2 at the elastically deformed portion figure 310f sways in relation to the second base portion figure 330f, with the intersection point m2' of the second supporting channel R3 and the contour of the elastically deformed portion figure 310f given as a supporting point.

<<<Chapter 3. Essential Functions of Basic Structure Body in the Present Invention>>>

In the above-described Chapter 2, a description has been given of the basic structure body 1000 shown in FIG. 4 in which the vicinity of the first relay point m1 and the vicinity of the second relay point m2 at the elastically deformed portion 310 undergo swaying displacement upon exertion of an external force. Here, on the assumption that the swaying displacement will occur, consideration is given to an overall deformation mode of the basic structure body 1000 when force Fz in the direction of the Z-axis or moment My around the Y-axis is exerted on the force receiving body 100 in a state that the supporting body 200 is fixed.

When consideration is given to the deformation mode, the fact that the first force receiving point P1 is arranged at a position having a negative coordinate value of the X-axis and the second force receiving point P2 is arranged at a position having a positive coordinate value of the X-axis is also taken as one assumption. This assumption is to indicate that in FIG. 4, the first force receiving point P1 is positioned on the left-hand side of the Z-axis and the second force receiving point P2 is positioned on the right-hand side of the Z-axis. And, as will be described below, this is an important condition in ensuring that force exerted on the first force receiving point P1 is reverse in direction to force exerted on the second force receiving point P2, when consideration is given to a deformation mode upon exertion of moment My around the Y-axis.

FIG. 8 is a front view of the basic structure body 1000 shown in FIG. 4 which shows a deformed state of each portion when downward force −Fz is exerted on the force receiving body 100 in a state that the supporting body 200 is fixed (an approximate drawing in which the base portion supports with a point). As illustrated in the drawing, downward force −fz (component force of force −Fz) is exerted on the first external arm-like portion 311 on the left-hand side from the force receiving body 100, and downward force −fz (component force of force −Fz) is exerted on the second external arm-like portion 313 on the right-hand side. This is because force Fz exerted on the force receiving body 100 is a translational force moving in the negative direction of the Z-axis.

Here, consideration is given to the fact that the above-described swaying displacement occurs at the elastically deformed portion 310. When downward force −fz is exerted on the first external arm-like portion 311, counterclockwise swaying displacement indicated by the white arrow S1 in the drawing will occur in the vicinity of the first relay point m1. Similarly, when downward force −fz is exerted on the second external arm-like portion 313, clockwise swaying displacement indicated by the white arrow S2 in the drawing will occur in the vicinity of the second relay point m2. As a result, upward force +fz is exerted on the left-hand side of the internal arm-like portion 312 (the vicinity of the first relay point m1), and the upward force +fz is exerted also on the right-hand side of the internal arm-like portion 312 (the vicinity of the second relay point m2). Therefore, the internal arm-like portion 312 is displaced upward as a whole. The force receiving body 100 is displaced downward by the above-described displacement. FIG. 8 shows the deformed state of the basic structure body 1000.

On the other hand, when upward force +Fz is exerted on the force receiving body 100, there will occur displacement which is reverse to the above description. That is, the upward force +fz is exerted on the first external arm-like portion 311 and the second external arm-like portion 313. Therefore, downward force −fz is exerted on the internal arm-like portion 312, causing downward displacement as a whole. A point to be noted here is that where translational force −Fz or +Fz in the direction of the Z-axis is exerted on the force receiving body 100, force in the same direction (+fz or −fz) is exerted on the left-hand side and the right-hand side of the internal arm-like portion 312. As described above, where force in the same direction is exerted from the left-hand side and from the right-hand side to cause displacement, a function of the internal arm-like portion 312 as a resistance element to the displacement is quite small (such energy will suffice that causes some elastic deformation to the internal arm-like portion 312).

In contrast, such a phenomenon will occur that force exerted on the left-hand side of the internal arm-like portion 312 is reverse in direction to force exerted on the right-hand side thereof, when moment My is exerted. FIG. 9 is the front view of the basic structure body 1000 shown in FIG. 4 which shows a deformed state of each portion when moment +My around the Y-axis is exerted on the force receiving body 100, in a state that the supporting body 200 is fixed (an approximate figure in which support by the base portion is performed in point contact).

The first force receiving point P1 is arranged at a position having a negative coordinate value of the X-axis by the above-described assumption. Therefore, when moment +My is exerted, upward force +fz (a component force of moment +My) is exerted on the first external arm-like portion 311 on the left-hand side from the force receiving body 100. However, the second force receiving point P2 is arranged at a position having a positive coordinate value of the X-axis, and, therefore, upon exertion of moment +My, downward force −fz (a component force of moment +My) is exerted on the second external arm-like portion 313 on the right-hand side from the force receiving body 100. This is because moment +My exerted on the force receiving body 100 is given as a clockwise rotational force at the center of the origin O.

In this case as well, consideration is given to the above-described swaying displacement occurring on the elastically deformed portion 310. Then, when upward force +fz is exerted on the first external arm-like portion 311, clockwise swaying displacement indicated by the white arrow S3 in the drawing occurs in the vicinity of the first relay point m1. On the other hand, when downward force −fz is exerted on the second external arm-like portion 313, clockwise swaying displacement indicated by the white arrow S4 in the drawing occurs in the vicinity of the second relay point m2. As a result, downward force −fz is exerted on the left-hand side of the internal arm-like portion 312 (the vicinity of the first relay point m1) and upward force +fz is exerted on the right-hand side of the internal arm-like portion 312 (the vicinity of the second relay point m2). However, since the left-hand side of the internal arm-like portion 312 is coupled to the right-hand side thereof, there is consequently found at the internal arm-like portion 312 such a phenomenon that upward force +fz and downward force −fz are incompatible with each other.

For example, as illustrated in the drawing, when a position of the origin O is noted, downward force −fz on the basis of swaying displacement (the white arrow S3) occurring in the vicinity of the first relay point m1 is in a state of being balanced with upward force +fz on the basis of swaying displacement (the white arrow S4) occurring in the vicinity of the second relay point m2. Of course, the balanced state is derived from elastic deformation of the internal arm-like portion 312. Specifically, force which will cause extension vertically in the drawing is exerted in the vicinity of the origin O at the internal arm-like portion 312, thereby causing elastic deformation in the vertical direction of the drawing. FIG. 9 shows the above-described deformed state of the basic structure body 1000. In other words, in order to give the deformed state shown in FIG. 9 to the basic structure body 1000, it is necessary to cause appropriately elastic deformation at the internal arm-like portion 312.

On the other hand, when reverse moment −My (counterclockwise rotation in FIG. 9) is exerted on the force receiving body 100, downward force −fz is exerted on the first external arm-like portion 311 on the left-hand side from the force receiving body 100, while upward force +fz is exerted on the second external arm-like portion 313 on the right-hand side. Therefore, force which is exerted on the internal arm-like portion 312 is reverse in direction to force indicated by the white arrow in the figure. However, the force exerted from the left-hand side to the internal arm-like portion 312 is reverse in direction to the force exerted from the right-hand side, which remains unchanged. For example, when a position of the origin O is noted, there is found a state that forces reverse in direction are balanced, and force which causes contraction vertically in the drawing is exerted in the vicinity of the origin O at the internal arm-like portion 312, thereby causing elastic deformation in the direction of contraction.

As described above, it is important that when moment around the Y-axis (rotational force) is exerted on the force receiving body 100, force reverse in direction (+fz or −fz) is exerted from the left-hand side or the right-hand side of the internal arm-like portion 312. Therefore, where forces from the left-hand side and the right-hand side which are mutually reverse in direction are exerted to cause displacement, the internal arm-like portion 312 functions as a large resistance element for displacement. That is, energy is needed for expanding or contracting the internal arm-like portion 312 to yield elastic deformation.

As described above, the basic structure body 1000 shown in FIG. 4 exhibits entirely different behavior depending on a case where force Fz in the direction of the Z-axis (translational force) is exerted on the force receiving body 100 or depending on a case where moment My around the Y-axis (rotational force) is exerted thereon. This is because the elastically deformed portion 310 included in the deformation body 300 which constitutes the basic structure body 1000 is arranged along the connection channel R1 which couples the first force receiving point P1 arranged at a position having a negative coordinate value of the X-axis to the second force receiving point P2 arranged at a position having a positive coordinate value of the X-axis. And, also the vicinity of the first relay point m1 and the vicinity of the second relay point m2 on the connection channel R1 are supported by the first base portion 320 and the second base portion 330 in a state that they can sway in the direction of the X-axis.

Due to adoption of the above-described structure, such a phenomenon will take place that where force Fz in the direction of the Z-axis (translational force) is exerted on the force receiving body 100, forces in the same direction are exerted from both the left end and the right end of the internal arm-like portion 312 which couples the first relay point m1 to the second relay point m2, however, where moment My around the Y-axis (rotational force) is exerted on the force receiving body 100, forces mutually reverse in direction are exerted from both the left end and the right end of the internal arm-like portion 312. In the former case, the internal arm-like portion 312 hardly functions as a resistance element for preventing deformation. However, in the latter case, the internal arm-like portion 312 functions as a large resistance element for preventing deformation, which is an essential function of the basic structure body 1000 according to the present invention.

Resultantly, the basic structure body 1000 illustrated in the drawing has unique characteristics that a larger resistance element for restricting deformation is to function where moment My around the Y-axis (rotational force) is exerted than the case where force Fz in the direction of the Z-axis (translational force) is exerted. Therefore, the above-described basic structure body 1000 is used to design a force sensor, thus making it possible to easily adjust the balance of detection sensitivity between moment and force. In particular, in the case of the conventional force sensor described before, there is found a tendency that the detection sensitivity of moment My is higher than the detection sensitivity of force Fz. However, in the case of a sensor of the present invention using the above-described basic structure body 1000, it is possible to reduce the detection sensitivity of moment My, since the resistance element functions for restricting deformation upon exertion of moment My.

<<<Chapter 4. Modification Examples of Basic Structure Body in the Present Invention>>>

Then, a description will be given of some modification examples of the basic structure body 1000 given in Chapter 2 and Chapter 3.

<4-0. Characteristics of Basic Structure Body 1000>

Figure 10:
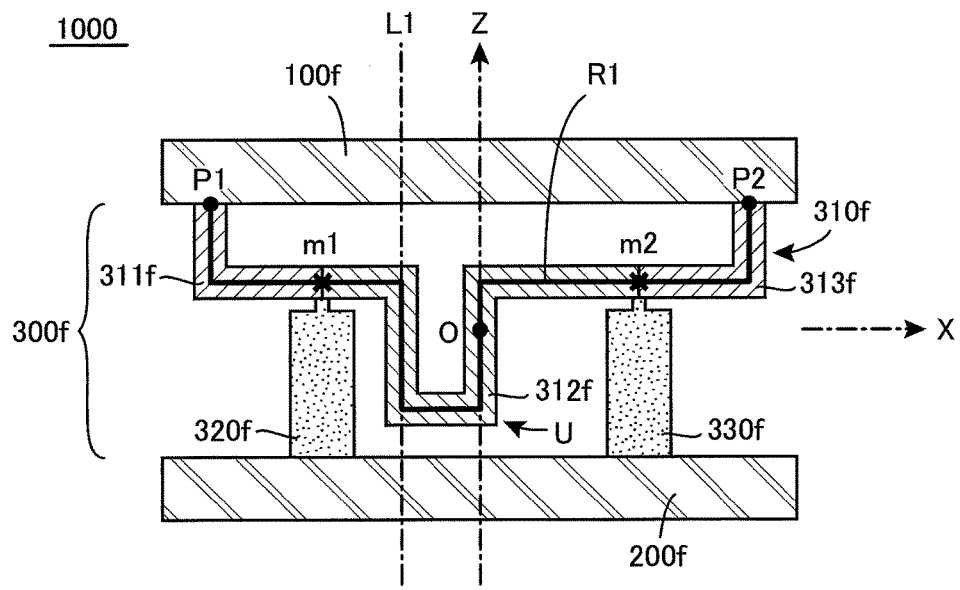
FIG. 10 is a front sectional view which describes a structure of an internal arm-like portion 312 in the basic structure body shown in FIG. 4 (showing a cross section cut along the XZ plane).

Before description of the modification examples, first, a description will be given of characteristics of the basic structure body 1000 shown in FIG. 4. FIG. 10 is a front sectional view which describes a structure of the internal arm-like portion 312 in the basic structure body 1000 shown in FIG. 4, and substantive contents are identical with those shown in FIG. 5. However, for convenience of description, the Z-axis and the longitudinal direction axis L1 are indicated by the single dot & dash line.

As illustrated in the drawing, the connection channel R1 is a channel which is included on the XZ plane which connects the first force receiving point P1 with the second force receiving point P2, and the elastically deformed portion 310 is an arm-like member which is arranged along the connection channel R1.

The internal arm-like portion 312 is an arm-like member which is arranged along a zone between the first relay point m1 and the second relay point m2, of the connection channel R1. An internal arm-like portion figure 312f appearing in the cross sectional view of FIG. 10 is an arm-like figure which is folded at four sites, with the connection channel R1 which connects the first relay point m1 with the second relay point m2 given as the central axis. Here, when traced from the first relay point m1 to the second relay point m2, the connection channel R1 is to be divided into a first horizontal channel which expands from the first relay point m1 to the right-hand side, a descending channel which moves downward along the longitudinal direction axis L1, a second horizontal channel which again expands to the right-hand side, an ascending channel which moves upward along the Z-axis, and a third horizontal channel which expands again to the right-hand side and reaches the second relay point m2.

The internal arm-like portion figure 312f which has been arranged along the connection channel R1 is provided with a U-letter shaped portion U which has a descending arm-like portion along the descending channel (a portion along the longitudinal direction axis L1) and an ascending arm-like portion along the ascending channel (a portion along the Z-axis). It is noted that in this application, the word "U-letter shape" is used to cover not only a curved figure but also a figure which is bent like a crank as shown in the drawing. Adoption of a figure having the above-described U-letter shaped portion U as the internal arm-like portion figure 312f preferably improves the effect of preventing deformation derived from moment My around the Y-axis.

This is because, as shown in FIG. 9, when consideration is given to a case that upward force +fz is balanced with downward force −fz at a certain point to be noted, a portion in which the longitudinal direction thereof faces the vertical direction (the direction of the Z-axis) is included partially in the internal arm-like portion 312, by which forces +fz/−fz which are mutually reverse in direction can be used to contract and expand the internal arm-like portion in the longitudinal direction. In general, force necessary for contracting or expanding an elongated arm-like member in the longitudinal direction is greater than force necessary for bending an elongated arm-like member. Therefore, a descending arm-like portion or an ascending arm-like portion which faces in the direction of the Z-axis is partially provided at the internal arm-like portion 312, by which a resistance force for preventing deformation can be exhibited to a maximum extent where moment My around the Y-axis is exerted.

Another characteristic of the internal arm-like portion 312 in the basic structure body 1000 shown in FIG. 10 is that the connection channel R1 is given as a channel which crosses the origin O in a perpendicular direction (direction in parallel with the Z-axis). FIG. 9 shows such a case that, upon exertion of moment My around the Y-axis, upward force +fz is balanced with downward force −fz when the origin O is noted. This shows a state that forces +fz/−fz which are reverse in direction are balanced at the above-described ascending arm-like portion (in the vicinity of the origin O). In the case of the example shown in FIG. 9, downward force −fz exerted in the vicinity of the origin O is force which is transmitted from the left-hand side starting from the force +fz which is exerted on the first force receiving point P1, and upward force +fz exerted in the vicinity of the origin O is force which is transmitted from the right-hand side starting from the force −fz which is exerted on the second force receiving point P2.

As described in the illustrated example, if the connection channel R1 is provided as a channel passing through the origin O, the ascending arm-like portion at which forces +fz/−fz reverse in direction are balanced is arranged at a position of the origin O. Therefore, the force transmitted from the left-hand side is well-balanced with the force transmitted from the right-hand side in the vicinity of the center of the basic structure body 1000, which is preferable in stabilizing a deformation mode of the basic structure body 1000.

4-1 First Modification Example

Figure 11:
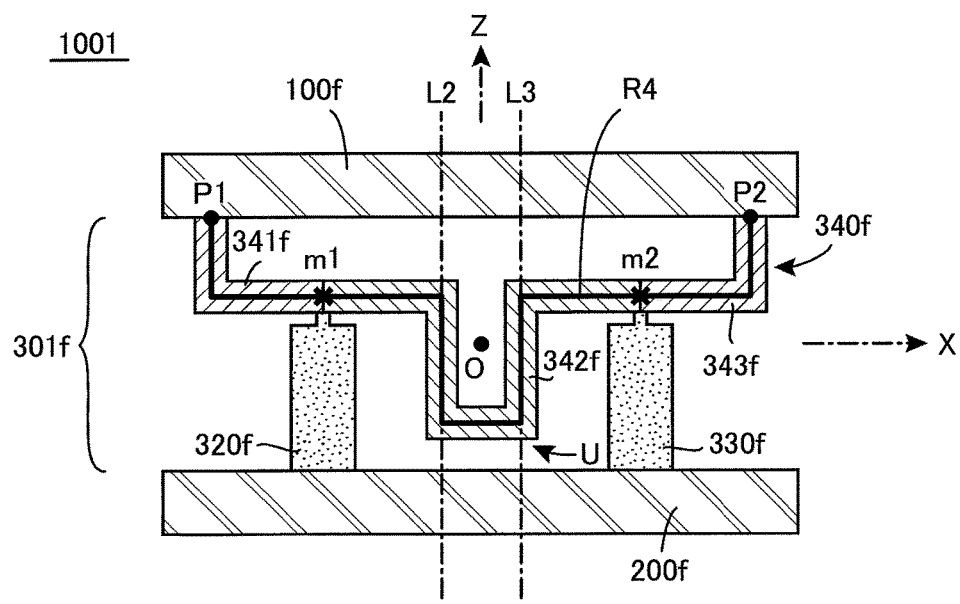
FIG. 11 is a front sectional view which describes a first modification example of the basic structure body shown in FIG. 10 (showing a cross section cut along the XZ plane).

FIG. 11 is a front sectional view which describes a first modification example of the basic structure body 1000 shown in FIG. 10. The basic structure body 1000 shown in FIG. 10 is different from a basic structure body 1001 shown in FIG. 11 only in that the deformation body figure 300f of the former is replaced by a deformation body figure 301f in the latter. More specifically, no change is made for a first base portion figure 320f or a second base portion figure 330f. Therefore, a difference between them is only that the elastically deformed portion figure 310f of the former is replaced by an elastically deformed portion figure 340f in the latter.

As shown in FIG. 11, the elastically deformed portion figure 340f is an elongated arm-like figure arranged along a connection channel R4 and constituted with a first external arm-like portion figure 341f, an internal arm-like portion figure 342f and a second external arm-like portion figure 343f. Here, the first external arm-like portion figure 341f and the second external arm-like portion figure 343f are figures identical with the first external arm-like portion figure 311f and the second external arm-like portion figure 313f shown in FIG. 10. Accordingly, a difference between the basic structure body 1000 shown in FIG. 10 and the basic structure body 1001 shown in FIG. 11 is only in that the internal arm-like portion figure 312f of the former is replaced by the internal arm-like portion figure 342f in the latter.

Further, each of the internal arm-like portion figure 312f of FIG. 10 and the internal arm-like portion figure 342f in FIG. 11 is formed in a similar shape having a U-letter shaped portion U, and a basic difference is only arrangement of a descending arm-like portion and an ascending arm-like portion, each of which constitutes the U-letter shaped portion U. That is, in the internal arm-like portion figure 312f in FIG. 10, the descending arm-like portion is arranged along the longitudinal direction axis L1 and the ascending arm-like portion is arranged along the Z-axis. In contrast, in the internal arm-like portion figure 342f in FIG. 11, the descending arm-like portion is arranged along a longitudinal direction axis L2 and the ascending arm-like portion is arranged along a longitudinal direction axis L3.

As described for the internal arm-like portion figure 312f in FIG. 10, where the ascending arm-like portion is arranged along the Z-axis (also similar is a case where the descending arm-like portion is arranged along the Z-axis), as described above, forces transmitted from the left-hand side and the right-hand side can be well-balanced at the arm-like portion arranged at the center position. Thereby, it is possible to obtain the effect of stabilizing a deformation mode of the basic structure body 1000.

In contrast, in the case of the internal arm-like portion figure 342f in FIG. 11, the descending arm-like portion is arranged at a position along the longitudinal direction axis L2 slightly deviating to the left from the Z-axis, and the ascending arm-like portion is arranged at a position along the longitudinal direction axis L3 slightly deviating to the right from the Z-axis. Here, each of the longitudinal direction axes L2, L3, is an axis on the XZ plane which is parallel to the Z-axis. In the case of the internal arm-like portion figure 342f, since no arm-like portion expanding in the perpendicular direction is present at the center position (a position along the Z-axis), it is impossible to balance forces transmitted from the left-hand side and the right-hand side at a perpendicular arm-like portion at the center position. However, if the longitudinal direction axes L2, L3 are arranged at a position symmetrical in relation to the Z-axis, the basic structure body 1001 can be structurally symmetrical with the YZ plane. It is, thereby, possible to obtain the effect of balancing the forces transmitted from the left-hand side and the right-hand side by means of symmetry on both sides.

Further, as illustrated in the drawing, where a cross section view cut along the XZ plane is given as a bisymmetrical figure, as will be described in Chapter 4-11, it is possible to constitute the basic structure body 1001 by a rotation body which is obtained by rotating the cross section figure, with the Z-axis given as the central axis.

4-2. Second Modification Example

Figure 12:
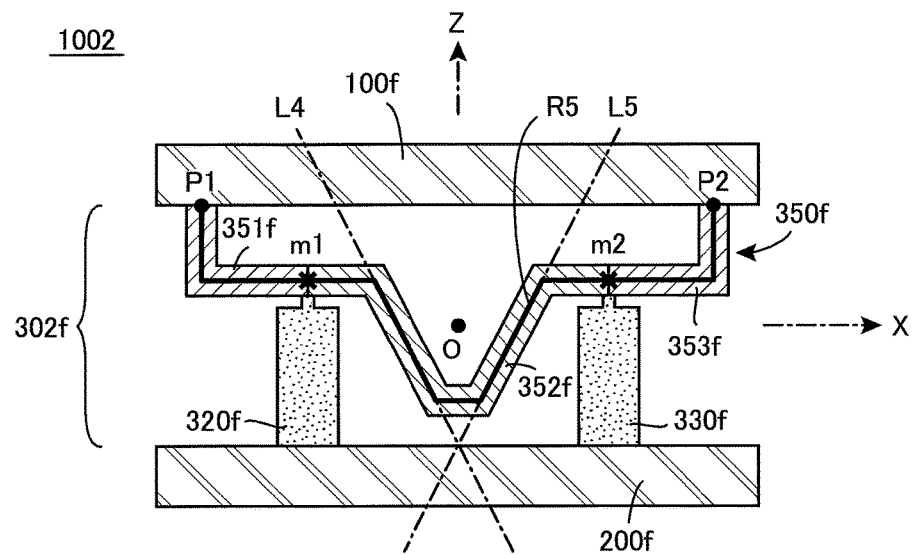
FIG. 12 is a front sectional view which describes a second modification example of the basic structure body shown in FIG. 10 (showing a cross section cut along the XZ plane).

FIG. 12 is a front sectional view which describes a second modification example of the basic structure body 1000 shown in FIG. 10. The basic structure body 1000 shown in FIG. 10 is different from a basic structure body 1002 shown in FIG. 12 only in that the deformation body figure 300f of the former is replaced by a deformation body figure 302f in the latter. More specifically, no change is made for a first base portion figure 320f or a second base portion figure 330f. Therefore, a difference between them is only in that the elastically deformed portion figure 310f of the former is replaced by an elastically deformed portion figure 350f in the latter.

As shown in FIG. 12, the elastically deformed portion figure 350f is an elongated arm-like figure arranged along a connection channel R5 and constituted with a first external arm-like portion figure 351f, an internal arm-like portion figure 352f, and a second external arm-like portion figure 353f. Here, the first external arm-like portion figure 351f and the second external arm-like portion figure 353f are identical figures with the first external arm-like portion figure 311f and the second external arm-like portion figure 313f shown in FIG. 10. As a result, a difference between the basic structure body 1000 shown in FIG. 10 and the basic structure body 1002 shown in FIG. 12 is only in that the internal arm-like portion figure 312f of the former is replaced by the internal arm-like portion figure 352f in the latter.

The internal arm-like portion figure 352f in FIG. 12 is a figure symmetrical with the Z-axis, as with the internal arm-like portion figure 342f in FIG. 11 described in the first modification example. However, in the internal arm-like portion figure 342f in FIG. 11, the descending arm-like portion is arranged along the longitudinal direction axis L2, and the ascending arm-like portion is arranged along the longitudinal direction axis L3. In contrast, in the internal arm-like portion figure 352f in FIG. 12, a descending arm-like portion is arranged along a longitudinal direction axis L4 and an ascending arm-like portion is arranged along a longitudinal direction axis L5. A basic difference between them is only an inclination angle of the longitudinal direction axis.

That is, in the internal arm-like portion figure 342f in FIG. 11, the two longitudinal direction axes, L2, L3 are defined as axes which are parallel to the Z-axis. In contrast, in the internal arm-like portion figure 352f in FIG. 12, the two longitudinal direction axes, L4, L5 are defined as axes which are slightly inclined to the Z-axis. The longitudinal direction axes, L2, L3 and the longitudinal direction axes, L4, L5 are common in that each of them is an axis intersecting with the XY plane. The former has an intersection angle of 90°, while the latter has an intersection angle which is set to be less than 90°. Nevertheless, on the illustrated cross sectional view, the longitudinal direction axis L4 and the longitudinal direction axis L5 are given as axes which are symmetrical with the Z-axis. Therefore, the internal arm-like portion figure 352f is given as a figure which is symmetrical with the Z-axis.

Also, in the case of the modification example shown in FIG. 12, forces +fz/−fz reverse in direction which are transmitted from the left-hand side and the right-hand side are exerted at the same time on the internal arm-like portion 352, and this remains unchanged. Therefore, the internal arm-like portion 352 is able to function as a resistance element for preventing deformation upon exertion of moment My. However, the descending arm-like portion which is arranged along the longitudinal direction axis L4 and the ascending arm-like portion which is arranged along the longitudinal direction axis L5 are arranged in a direction of inclination in relation to the Z-axis. Thus, it is not possible to exhibit a resistance force for preventing deformation to a maximum extent upon exertion of moment My around the Y-axis.

As described above, force necessary for contracting or expanding an elongated arm-like member in the longitudinal direction is greater than force necessary for bending the elongated arm-like member. Therefore, where a maximum resistance force for preventing deformation is needed, as shown in the example of FIG. 11, it is preferable that the descending arm-like portion and the ascending arm-like portion are set so as to be parallel to the Z-axis in the longitudinal direction. From this perspective, the second modification example shown in FIG. 12 is an example which is to be adopted where the maximum of the resistance force is of little need as in the first modification example.

In short, the various examples described above are examples in which the descending channel which moves downward along the first longitudinal direction axes, L1, L2, L4, each of which intersects with the XY plane, and the ascending channel which moves upward along the second longitudinal-direction axes, Z, L3, L5, each of which intersects with the XY plane, are installed on the connection channel which is traced from the first relay point m1 to the second relay point m2. In these examples, each of the internal arm-like portion FIGS. 312*f*, 342*f*, 352*f* appearing on a cross section along the XZ plane is to have the descending arm-like portion along the descending channel and the ascending arm-like portion along the ascending channel. Therefore, upon exertion of moment My around the Y-axis, there is exerted a resistance force for preventing deformation.

The example shown in FIG. 12 is an example in which the first longitudinal direction axis and the second longitudinal-direction axis are inclined in relation to the Z-axis. In contrast, the examples shown in FIG. 10 and FIG. 11 are examples in which the first longitudinal-direction axis and the second longitudinal-direction axis are set as axes which are parallel to the Z-axis. In view of exhibiting a maximum resistance force for preventing deformation upon exertion of moment My around the Y-axis, it is preferable that the first longitudinal direction axis and the second longitudinal-direction axis are set as axes which are parallel to the Z-axis.

4-3. Third Modification Example

Figure 13:
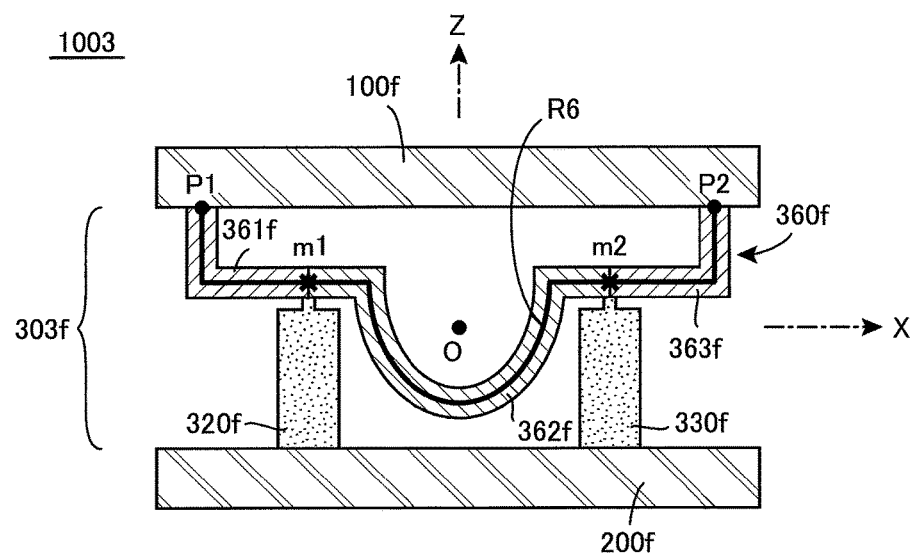
FIG. 13 is a front sectional view which describes a third modification example of the basic structure body shown in FIG. 10 (showing a cross section cut along the XZ plane).

FIG. 13 is a front sectional view which describes a third modification example of the basic structure body 1000 shown in FIG. 10. The basic structure body 1000 shown in FIG. 10 is different from a basic structure body 1003 shown in FIG. 13 only in that the deformation body figure 300*f* of the former is replaced by a deformation body figure 303*f* in the latter. More specifically, no change is made for a first base portion figure 320*f* or a second base portion figure 330*f*. Therefore, a difference between them is only in that the elastically deformed portion figure 310*f* of the former is replaced by an elastically deformed portion figure 360*f* in the latter.

As shown in FIG. 13, the elastically deformed portion figure 360*f* is an elongated arm-like figure arranged along a connection channel R6 and constituted with a first external arm-like portion figure 361*f*, an internal arm-like portion figure 362*f*, and a second external arm-like portion figure 363*f*. Here, the first external arm-like portion figure 361*f* and the second external arm-like portion figure 363*f* are identical figures with the first external arm-like portion figure 311*f* and the second external arm-like portion figure 313*f* shown in FIG. 10. As a result, a difference between the basic structure body 1000 shown in FIG. 10 and the basic structure body 1003 shown in FIG. 13 is only in that the internal arm-like portion figure 312*f* of the former is replaced by the internal arm-like portion figure 362*f* in the latter.

The internal arm-like portion figure 362*f* in FIG. 13 is a figure which is symmetrical with the Z-axis, as with the internal arm-like portion figure 342*f* in FIG. 11 which is described as the first modification example. However, the internal arm-like portion figure 342*f* in FIG. 11 is constituted with an elongated figure which is bent in a crank shape and surrounded with a contour made exclusively with a straight line. In contrast, the internal arm-like portion figure 362*f* in FIG. 13 is constituted with an elongated figure which is slightly curved and surrounded with a contour which contains a curve. As described above, the term "U-letter shape" in the present application includes a figure which is bent in a crank shape as descried for the internal arm-like portion figure 342*f* in FIG. 11. A portion of "U-letter shape" which is included in the internal arm-like portion figure 362*f* in FIG. 13 is a curved figure which is curved exactly in the shape of the letter of "U."

In short, in the example shown in FIG. 13, a curved channel which is curved downward and then curved upward is installed at a zone between the first relay point m1 and the second relay point m2 on the connection channel R6. The internal arm-like portion figure 362*f* has a curved portion along the curved channel. As described above, also in the example in which the curved portion is installed at the internal arm-like portion 362, forces +fz/−fz reverse in direction which are transmitted from the left-hand side and the right-hand side are exerted at the same time on the internal arm-like portion 362, and this remains unchanged. Therefore, the internal arm-like portion 362 is able to perform a function as a resistance element for preventing deformation upon exertion of moment My. However, the function as the resistance element is weaker than that of the examples shown in FIG. 10 or in FIG. 11.

4-4. Fourth Modification Example

A description has been given above of the internal arm-like portion 312, a structure of which is changed, as a modification example of the basic structure body 1000 shown in FIG. 10. Here, a description will be given of an example in which the first external arm-like portion 311 and the second external arm-like portion 313 are changed in structure.

Figure 14:
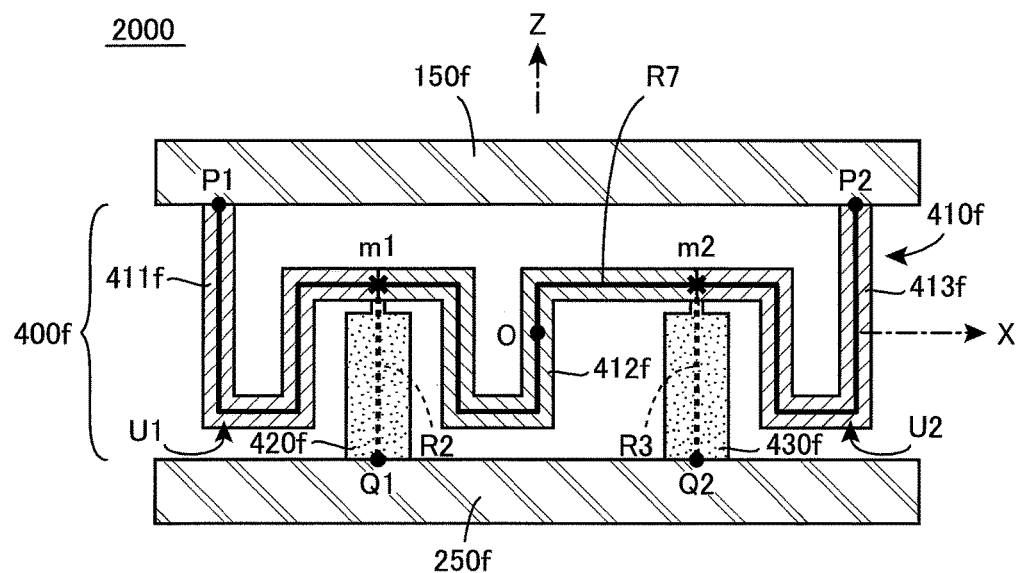
FIG. 14 is a front sectional view which describes a fourth modification example of the basic structure body shown in FIG. 10 (showing a cross section cut along the XZ plane).

FIG. 14 is a front sectional view which describes a fourth modification example of the basic structure body 1000 shown in FIG. 10. The basic structure body 1000 shown in FIG. 10 is primarily different from a basic structure body 2000 shown in FIG. 14 in overall breadth width. The basic structure body 2000 shown in FIG. 14 is made greater in breadth width as a whole due to change in structure of an external arm-like portion, as described above. Therefore, the force receiving body figure 100*f* shown in FIG. 10 is replaced by a force receiving body figure 150*f* greater in width in FIG. 14. The supporting body figure 200*f* shown in FIG. 10 is replaced by a supporting body figure 250*f* greater in width in FIG. 14. Nevertheless, each of a force receiving body 150 and a supporting body 250 in the modification example shown in FIG. 14 is a plate member having an upper face and a lower face, each of which is parallel to the XY plane and not essentially different from the force receiving body 100 and the supporting body 200 shown in FIG. 10.

The fourth modification example shown in FIG. 14 is characterized in that a deformation body 400 greater in breadth width is used in place of the deformation body 300 of the basic structure body 1000 shown in FIG. 10. The front sectional view of FIG. 14 indicates the shape of a deformation body figure 400*f* appearing when the deformation body 400 is cut along the XZ plane. That is, in the fourth modification example, the deformation body figure 300*f* shown in FIG. 10 is replaced by the deformation body figure 400*f* shown in FIG. 14.

The deformation body figure 400*f* is a figure which includes an elastically deformed portion figure 410*f*, a first base portion figure 420*f* and a second base portion figure 430*f*. Then, the elastically deformed portion figure 410*f* is an elongated arm-like figure which is arranged along a connection channel R7 which connects a first force receiving point P1 with a second force receiving point P2 and constituted with a first external arm-like portion figure 411*f*, an internal arm-like portion figure 412*f* and a second external arm-like portion figure 413*f*.

Here, the first base portion figure 420*f* is an identical figure with the first base portion figure 320*f* shown in FIG. 10, and the second base portion figure 430*f* is an identical figure with the second base portion figure 330*f* shown in FIG. 10. Therefore, the first base portion 420 performs a function to support the vicinity of a first relay point m1 at the elastically deformed portion 410 along a first supporting channel R2 moving to a supporting point Q1, and the second base portion 430 performs a function to support the vicinity of a second relay point m2 at the elastically deformed portion 410 along a second supporting channel R3 moving to a supporting point Q2. This is the same as the examples described above.

Further, the shape of a zone between the first relay point m1 and the second relay point m2 on a connection channel R7 shown in FIG. 14 is identical with the shape of the zone on the connection channel R1 shown in FIG. 10. The internal arm-like portion figure 412*f* is an identical figure with the internal arm-like portion figure 312*f* shown in FIG. 10. Resultantly, the elastically deformed portion 310 shown in FIG. 10 is different from the elastically deformed portion 410 shown in FIG. 14 only in the external arm-like portions. That is, the first external arm-like portion figure 311*f* shown in FIG. 10 is replaced by the first external arm-like portion figure 411*f* shown in FIG. 14, and the second external arm-like portion figure 313*f* shown in FIG. 10 is replaced by the second external arm-like portion figure 413*f* shown in FIG. 14.

Inherently, a primary function of the first external arm-like portion is to connect the first force receiving point P1 with the first relay point m1, and a primary function of the second external arm-like portion is to connect the second force receiving point P2 with the second relay point m2. Only for the purpose of meeting the primary functions, such a member that has a cross-sectional shape like the first external arm-like portion figure 311*f* or the second external arm-like portion figure 313*f* shown in FIG. 10 will be sufficient. It is, therefore, not necessary to provide a member which has a cross-sectional shape like the first external arm-like portion figure 411*f* or the second external arm-like portion figure 413*f* shown in FIG. 14.

In the case of the example shown in FIG. 14, a first U-letter shaped by-pass U1 and a second U-letter shaped by-pass U2 are installed on the connection channel R7. Each of the by-passes U1, U2 is a redundant channel which bypasses an essentially necessary channel and not required in performing the above-described original functions. However, the first external arm-like portion figure 411*f* and the second external arm-like portion figure 413*f* which expand along the by-passes U1, U2 are adopted as a cross section figure, by which the deformation body 400 can be provided in various deformation modes. It is, therefore, possible to change the deformation body 400 into various shapes.

In Chapter 3, there has been shown a deformed state when force Fz in the direction of the Z-axis and moment My around the Y-axis are exerted on the force receiving body 100 which constitutes the basic structure body 1000, with reference to FIG. 8 and FIG. 9. However, under an actual environment where the basic structure body 1000 is used, an external force which is exerted on the force receiving body 100 is not only force Fz or moment My, but other axis components such as forces Fx, Fy and moments Mx, Mz are also exerted. Then, as disclosed in Patent Documents 1 to 3, the six-axis detection-type force sensor is required to give predetermined deformation to a deformation body, thereby detecting individual axis components of the external force which has been exerted on the basis of the deformation mode, even upon exertion of any of six axis components, Fx, Fy, Fz, Mx, My, Mz of the external force.

From the above-described perspective, it is preferable that the deformation body is structured so as to have a wider variation of deformation modes to the extent possible. The fourth modification example shown in FIG. 14 has adopted a redundant structure in which the U-letter shaped by-passes U1, U2 are installed on the connection channel R7. That is, the first U-letter shaped by-pass U1 which is formed in the U-letter shape is installed at a zone between the first force receiving point P1 and the first relay point m1 on the connection channel R7, and the first external arm-like portion figure 411*f* is provided with a first U-letter shaped by-pass portion along the first U-letter shaped by-pass. Similarly, the second U-letter shaped by-pass U2 which is formed in the U-letter shape is installed at a zone between the second force receiving point P2 and the second relay point m2 on the connection channel R7, and the second external arm-like portion figure 413*f* is provided with a second U-letter shaped by-pass portion along the second U-letter shaped by-pass.

The above-described redundant structure allows the deformation body 400 to have a wider variation of deformation modes. In particular, in the case of the example shown in FIG. 14, the first U-letter shaped by-pass U1 and the second U-letter shaped by-pass U2 are constituted in combination with a pair of lengthwise direction by-passes parallel to the Z-axis and a crosswise direction by-pass parallel to the X-axis which connects the pair of lengthwise direction by-passes. The thus structured U-letter shaped by-passes U1, U2 are able to undergo deformation in various modes in a three-dimensional manner, by which it is possible to diversify an overall deformation mode of the deformation body 400. A force sensor to be described below in Chapter 5 and Chapter 6 also adopts a structure in which a U-letter shaped by-pass portion along a U-letter shaped by-pass is installed at an external arm-like portion, thereby diversifying a deformation mode of the deformation body.

4-5. Fifth Modification Example

Figure 15:
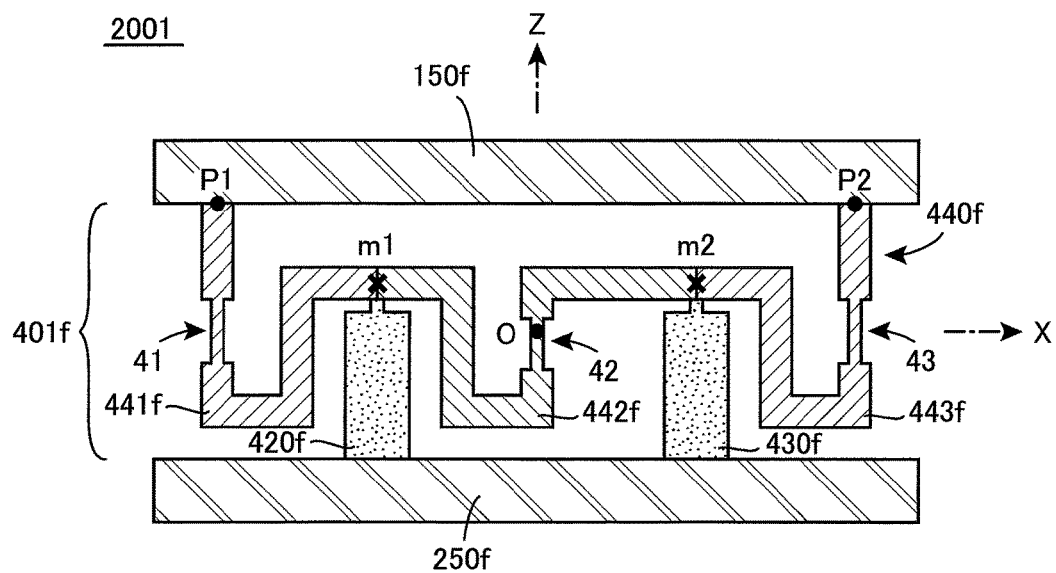
FIG. 15 is a front sectional view which describes a fifth modification example of the basic structure body shown in FIG. 10 (showing a cross section cut along the XZ plane).

FIG. 15 is a front sectional view which describes a fifth modification example of the basic structure body 1000 described in FIG. 10. Actually, a basic structure body 2001 shown in FIG. 15 is obtained by slightly modifying the basic structure body 2000 shown in FIG. 14. That is, the basic structure body 2000 shown in FIG. 14 is different from the basic structure body 2001 shown in FIG. 15 only in that the deformed portion figure 400*f* of the former is replaced by a deformed portion figure 401*f* in the latter.

More specifically, no change is made for a first base portion figure 420*f* or a second base portion figure 430*f*. Therefore, a difference between them is only in that the elastically deformed portion figure 410*f* of the former is replaced by an elastically deformed portion figure 440*f* in the latter. The elastically deformed portion figure 440*f* shown in FIG. 15 is, as illustrated in the drawing, constituted with a first external arm-like portion figure 441*f*, an internal arm-like portion figure 442*f* and a second external arm-like portion figure 443*f*. These figures respectively correspond to the first external arm-like portion figure 411*f*, the internal arm-like portion figure 412*f* and the second external arm-like portion figure 413*f* shown in FIG. 14.

These respective corresponding figures are different only in the presence or absence of a constricted portion. That is, the first external arm-like portion figure 441*f* (FIG. 15) is such that a constricted portion 41 is formed on the first external arm-like portion figure 411*f* (FIG. 14), the internal arm-like portion figure 442*f* is such that a constricted portion 42 is formed on the internal arm-like portion figure 412f, and the second external arm-like portion figure 443f is such that a constricted portion 43 is formed on the second external arm-like portion figure 413f. The constricted portions 41, 42, 43 are portions, each of which is made narrow in width in a direction orthogonal to the connection channel R7, and they are sites at which elastic deformation will occur more easily than at other portions.

In the example shown in FIG. 15, each of the first external arm-like portion figure 441f, the internal arm-like portion figure 442f and the second external arm-like portion figure 443f is provided at one site with the constricted portion. However, the constricted portion is not necessarily provided at all the arm-like portion FIGS. 441f, 442f, 443f, and the constricted portion may be provided only at some of them. Further, the constricted portion is not necessarily provided at one site but may be provided at several sites.

The above-described constricted portion is provided because each of the arm-like portions 441, 442, 443 is able to undergo elastic deformation easily to diversify a deformation mode of the deformation body 401. As described above, it is preferable that the six-axis detection-type force sensor is structured in such a manner that the deformation body can take various deformation modes upon exertion of six axis components of an external force. Each of the arm-like portions 441, 442, 443 is provided with the constricted portion, by which deflection and distortion will easily occur at the constricted portion, and the deformation body 401 can be provided with a wider variation of deformation modes.

4-6. Sixth Modification Example

Figure 16:
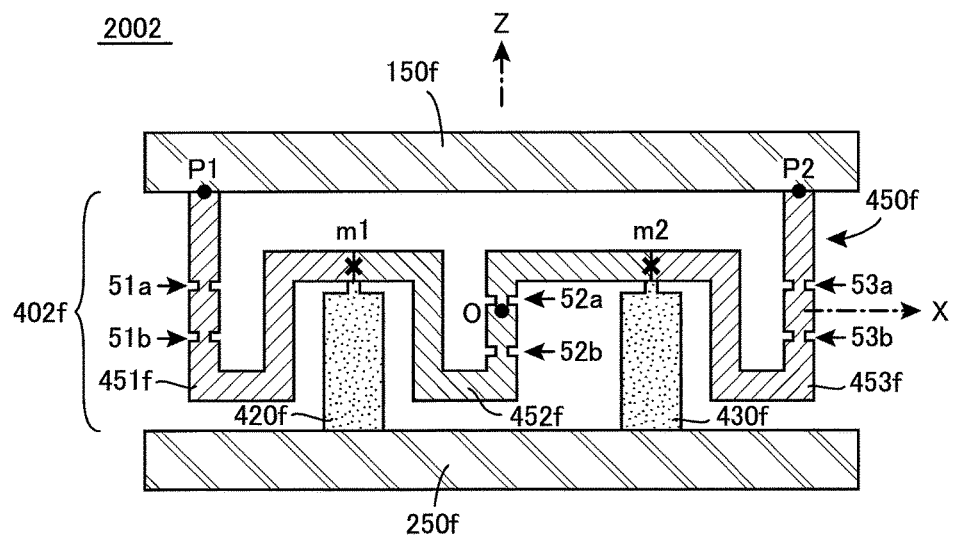
FIG. 16 is a front sectional view which describes a sixth modification example of the basic structure body shown in FIG. 10 (showing a cross section cut along the XZ plane).

FIG. 16 is a front sectional view which describes a sixth modification example of the basic structure body 1000 shown in FIG. 10. Actually, a basic structure body 2002 shown in FIG. 16 is obtained by slightly modifying a position and a shape of the constricted portion on the basic structure body 2001 shown in FIG. 15. That is, the basic structure body 2001 shown in FIG. 15 is different from the basic structure body 2002 shown in FIG. 16 only in that the deformed portion figure 401f of the former is replaced by a deformed portion figure 402f in the latter.

More specifically, no change is made for a first base portion figure 420f or a second base portion figure 430f. Therefore, a difference between them is only in that the elastically deformed portion figure 440f of the former is replaced by an elastically deformed portion figure 450f in the latter, and the constricted portion is slightly different only in position and shape. That is, the elastically deformed portion figure 450f shown in FIG. 16 is, as illustrated in the drawing, constituted with a first external arm-like portion figure 451f, an internal arm-like portion figure 452f and a second external arm-like portion figure 453f. Then, constricted portions 51a, 51b are formed at the first external arm-like portion figure 451f, constricted portions 52a, 52b are formed at the internal arm-like portion figure 452f, and constricted portions 53a, 53b are formed at the second external arm-like portion figure 453f.

In the example shown in FIG. 15, the arm-like portion FIGS. 441f, 442f, 443f are provided at one site each respectively with the relatively long constricted portions 41, 42, 43. In contrast, in the example shown in FIG. 16, the arm-like portion FIGS. 451f, 452f, 453f are provided at two sites each respectively with relatively short constricted portions 51a, 51b; 52a, 52b; 53a, 53b. These constricted portions are provided because, as described above, each of the arm-like portions 451, 452, 453 is allowed to easily undergo elastic deformation, by which the deformation body 402 is made available in a wider variation of deformation modes. Where the number of sites at which a constricted portion is formed is increased, processing steps are made complicated accordingly. It is, however, possible to cope with the deformation more flexibly and provide a wider variation of deformation modes in an improved manner.

4-7. Seventh Modification Example

Figure 17:
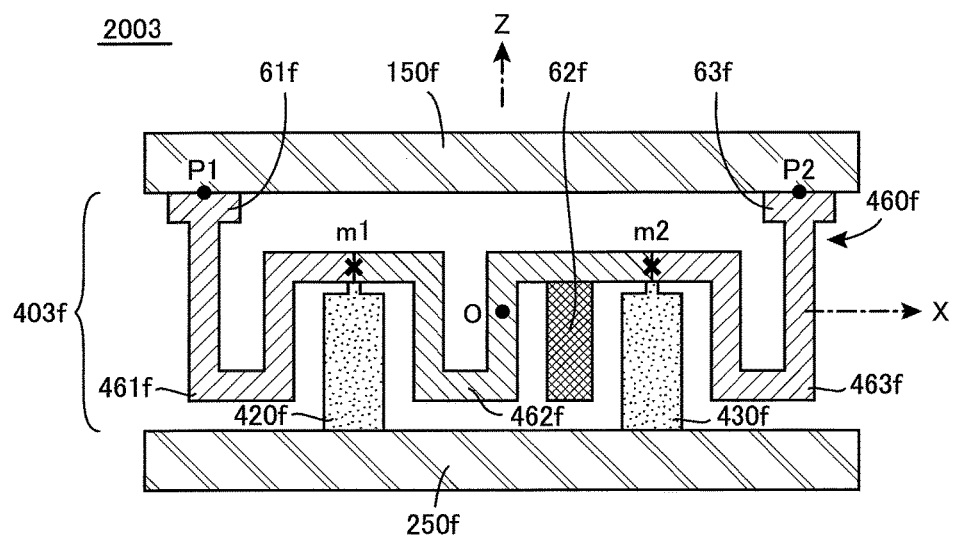
FIG. 17 is a front sectional view which describes a seventh modification example of the basic structure body shown in FIG. 10 (showing a cross section cut along the XZ plane).

FIG. 17 is a front sectional view which describes a seventh modification example of the basic structure body 1000 shown in FIG. 10. Actually, a basic structure body 2003 shown in FIG. 17 is obtained by slightly modifying the basic structure body 2000 shown in FIG. 14. That is, the basic structure body 2000 shown in FIG. 14 is different from the basic structure body 2003 shown in FIG. 17 only in that the deformed portion figure 400f of the former is replaced by a deformed portion figure 403f in the latter.

More specifically, no change is made for a first base portion figure 420f or a second base portion figure 430f. Therefore, a difference between them is only in that the elastically deformed portion figure 410f of the former is replaced by an elastically deformed portion figure 460f in the latter. The elastically deformed portion figure 460f shown in FIG. 17 is, as illustrated in the drawing, provided with a first external arm-like portion figure 461f, an internal arm-like portion figure 462f and a second external arm-like portion figure 463f. These figures respectively correspond to the first external arm-like portion figure 411f, the internal arm-like portion figure 412f and the second external arm-like portion figure 413f shown in FIG. 14.

However, two elements are newly added to the elastically deformed portion figure 460f shown in FIG. 17. A first added element is a weight adjusting portion figure 62f. The weight adjusting portion figure 62f is a figure (a mesh-like hatching is provided in the drawing) which projects below at a horizontal portion of the internal arm-like portion figure 462f on the right-hand side. Then, second added elements are flange portion figures 61f, 63f. The flange portion figure 61f is a figure installed at an upper end of the first external arm-like portion figure 461f (a connection portion with a first force receiving point P1). And, the flange portion figure 63f is a figure installed at an upper end of the second external arm-like portion figure 463f (a connection portion with a second force receiving point P2). Hereinafter, a description will be given of functions of the added elements.

First, the weight adjusting portion figure 62f is equivalent to a cross section figure of a portion which forms the weight adjusting portion 62 in the three-dimensional basic structure body 2003. The weight adjusting portion 62 is not directly involved in the inherent function of the elastically deformed portion 460, that is, a function to adjust the balance of detection sensitivity between moment and force, but performs a function to adjust the balance of weight of the deformation body 403. This function will be easily understood by comparing an overall configuration of the deformation body figure 400f shown in FIG. 14 with an overall configuration of the deformation body figure 403f shown in FIG. 17.

The deformation body figure 400f shown in FIG. 14 is a figure which is bilaterally asymmetrical with the Z-axis in the drawing. This is because, as described above, a part of the internal arm-like portion figure 412f is designed to pass through the origin O. Of course, the deformation body figure 403f shown in FIG. 17 is also a figure which is bilaterally asymmetrical with the Z-axis, which remains unchanged. However, the weight adjusting portion figure 62f is added to the deformation body figure 403f, by which area balance on a two-dimensional plane which is a cutting plane is close to bilateral symmetry in relation to the Z-axis. This means that in view of the three-dimensional basic structure body 2003, the weight adjusting portion 62 performs a function to balance the weights on both sides in relation to the XZ plane.

As described above, in the six axis detection-type force sensor, the deformation body is made available in a wider variation of deformation modes upon exertion of six axis components of an external force. It is, therefore, preferable that three-dimensional weight distribution of the basic structure body 2003 is symmetrical with a coordinate axis to the extent possible. Biased weight distribution of the basic structure body 2003 may make deformation motions unstable, thereby affecting detection results. The weight adjusting portion 62 performs a function to make adjustment so as not to bias weight distribution of the basic structure body 2003 and enable stable detection.

In the case of the example shown in FIG. 17, the weight adjusting portion figure 62f is installed at a space near the internal arm-like portion figure 462f. However, a place at which the weight adjusting portion figure is arranged may be any given place, as long as it is effective in making the weight distribution uniform. Therefore, actually, the weight adjusting portion figure may be added to each of the first external arm-like portion figure 461f, the internal arm-like portion figure 462f and the second external arm-like portion figure 463f, or the weight adjusting portion figure may be added to some of them. Further, the weight adjusting portion figure may be a figure of any shape, as long as it is a figure which projects in a direction orthogonal to the connection channel.

Next, a description will be given of functions of the flange portion FIGS. 61f, 63f. As illustrated in the drawing, the flange portion figure 61f is a figure which is installed at a connection portion with the force receiving body figure 150f of the first external arm-like portion figure 461f (the vicinity of the first force receiving point P1) and projects in a direction orthogonal to the connection channel, corresponding to a cross section figure of a portion which forms the flange portion 61 in the three-dimensional basic structure body 2003. Similarly, the flange portion figure 63f is a figure which is installed at a connection portion with the force receiving body figure 150f of the second external arm-like portion figure 463f (the vicinity of the second force receiving point P2) and projects in a direction orthogonal to the connection channel, corresponding to a cross section figure of a portion which forms the flange portion 63 in the three-dimensional basic structure body 2003.

As described above, the flange portions 61, 63 are installed at the connection portions with the force receiving body 150, thus making it possible to ensure connection with the force receiving body 150. Where the elastically deformed portion 460 is constituted with an elongated arm-like member, the transverse cross section thereof is limited in area, which may result in insufficient adhesion to the force receiving body 150. In this case, the flange portions 61, 63 are formed at ends of the elastically deformed portion 460, by which an adhered face can be increased in area to affect adhesion more firmly.

4-8. Eighth Modification Example

Figure 18:
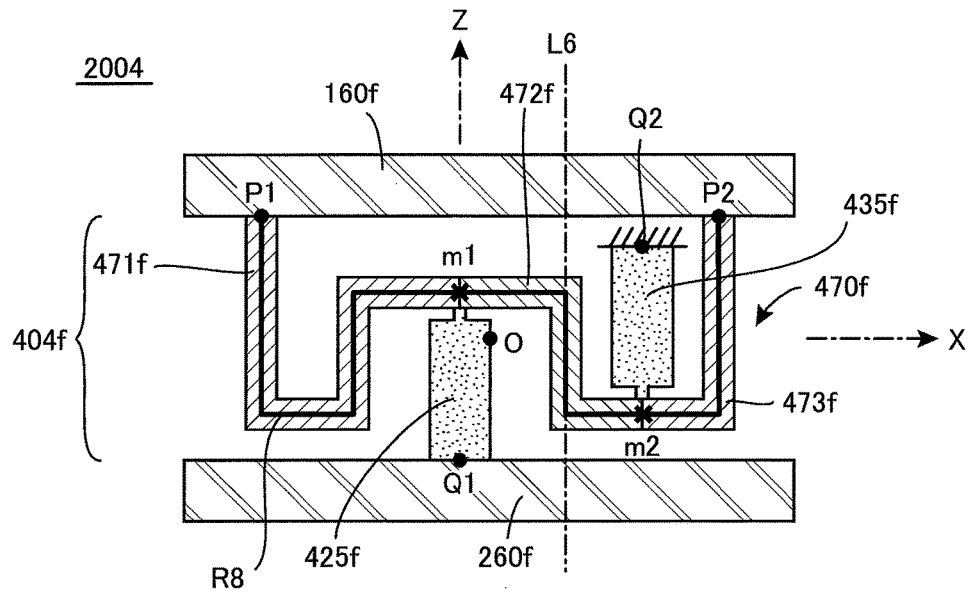
FIG. 18 is a front sectional view which describes an eighth modification example of the basic structure body shown in FIG. 10 (showing a cross section cut along the XZ plane).

FIG. 18 is a front sectional view which describes an eighth modification example of the basic structure body 1000 shown in FIG. 10. A basic structure body 2004 shown in FIG. 18 is also provided with a structure having a deformation body 404 between a force receiving body 160 and a supporting body 260. Then, as the force receiving body 160 and the supporting body 260, there is used a plate member having an upper face and a lower face, each of which is parallel with each other on the XY plane. This is also similar to the examples described above.

Therefore, a cross section obtained by cutting the basic structure body 2004 along the XZ plane is, as shown in FIG. 18, constituted with a rectangular force receiving body figure 160f, a rectangular supporting body figure 260f and a deformation body figure 404f which connects them. Then, the deformation body figure 404f is constituted with an elastically deformed portion figure 470f, a first base portion figure 425f and a second base portion figure 435f. The elastically deformed portion figure 470f is constituted with an elongated arm-like figure along a connection channel R8 on the XZ plane which connects a first force receiving point P1 with a second force receiving point P2.

The example shown in FIG. 18 is characterized by a mode supported by a first base portion 425 and a second base portion 435. As illustrated in the drawing, the upper end of the first base portion figure 425f (the connection end) is connected below in the vicinity of a first relay point m1 of the elastically deformed portion figure 470f. Therefore, the first base portion 425 is, as with the examples described above, a member which supports the elastically deformed portion 470 from below. However, in reverse to the examples described above, the second base portion 435 is a member which supports the elastically deformed portion 470 from above. As illustrated in the drawing, the second base portion figure 435f is a figure in which the first base portion figure 425f is turned upside down, and the lower end thereof (the connection end) is connected above in the vicinity of a second relay point m2 of the elastically deformed portion figure 470f.

For convenience of description, the drawing shows a state in which the upper end of the second base portion figure 435f is fixed to a second supporting point Q2 depicted on a space. However, actually, the second supporting point Q2 is a point installed on an upper face of the supporting body 260 (for example, a point positioned behind the XZ plane). And, the second base portion 435 is a member which connects the vicinity of the second relay point m2 at the elastically deformed portion 470 with the second supporting point Q2 installed on the upper face of the supporting body 260.

Therefore, the second base portion 435 is actually formed, for example, in the U-letter like curved shape, one end thereof is connected above in the vicinity of the second relay point m2 at the elastically deformed portion 470, as drawn in the cross sectional view of FIG. 18, while the other end thereof is connected to the second supporting point Q2 installed on the upper face of the supporting body 260. In the cross sectional view of FIG. 18, it is impossible to show an actual state that the other end of the second base portion 435 is connected to the second supporting point Q2 (because the second supporting point Q2 is not on a cutting plane). Therefore, for convenience of description, the second supporting point Q2 is drawn on a space, thereby indicating that the other end of the second base portion 435 is connected to the second supporting point Q2.

As described above, the example shown in FIG. 18 is slightly different in mode supported by the base portion, as compared with the examples described above, but an essential function thereof remains unchanged. That is, the elastically deformed portion figure 470f is constituted with a first external arm-like portion figure 471*f*, an internal arm-like portion figure 472*f* and a second external arm-like portion figure 473*f*, thus making it possible to perform a function to adjust the balance of detection sensitivity between moment and force. The vicinity of the second relay point m2 at the elastically deformed portion 470 is supported from above by the second base portion 435. However, the vicinity of the second relay point m2 sways by force transmitted from the force receiving body 160, which remains unchanged. As with the basic structure body 1000 shown in FIG. 10, the basic structure body 2004 shown in FIG. 18 is able to perform a function to adjust the balance of detection sensitivity between moment and force.

That is, in the case of the basic structure body 2004 shown in FIG. 18, when the connection channel R8 is traced from the first relay point m1 to the second relay point m2, there is found a descending channel which moves downward along a longitudinal direction axis L6 intersecting with the XY plane. The internal arm-like portion figure 472*f* is provided with a descending arm-like portion along the descending channel. Therefore, upon exertion of moment My around the Y-axis, the descending arm-like portion balances forces reverse in direction which are transmitted from the left-hand side and the right-hand side, thereby functioning as a resistance element for preventing deformation. In order to exhibit the function as the resistance element to a maximum extent, as described above, it is preferable that the longitudinal direction axis L6 is designed so as to be parallel to the Z-axis.

The examples described before have adopted a structure in which both of the two relay points m1, m2 are supported from below by the base portions. The basic structure body 2004 shown in FIG. 18 is characterized in that, of the two relay points, m1, m2, one of them is supported from below by a base portion and the other is supported from above by a base portion. Therefore, even where a position supported by the base portion is changed from below to above, as described above, an essential function of the basic structure body remains unchanged.

Of course, it is possible to adopt a structure in which both of the two relay points m1, m2 are supported from above by base portions. In this case, as shown in the cross sectional view, the connection end of the first base portion figure is connected above in the vicinity of the first relay point m1 at the elastically deformed portion figure, and the connection end of the second base portion figure is connected above in the vicinity of the second relay point m2 at the elastically deformed portion figure. However, in the example shown in FIG. 18, the connection channel R8 is given as a channel which is vertically bent in a mode shown in the drawing. Therefore, as shown in the drawing, there is adopted a structure in which the vicinity of the first relay point m1 is supported from below and the vicinity of the second relay point m2 is supported from above, by which each of the portions can be efficiently arranged in a three-dimensional space.

4-9 Ninth Modification Example

Figure 19:
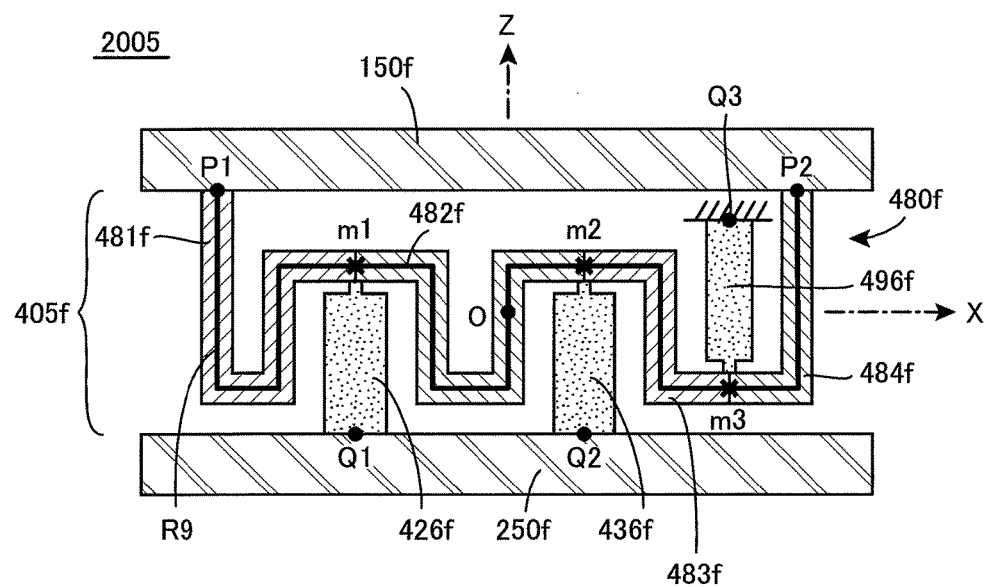
FIG. 19 is a front sectional view which describes a ninth modification example of the basic structure body shown in FIG. 10 (showing a cross section cut along the XZ plane).

FIG. 19 is a front sectional view which describes a ninth modification example of the basic structure body 1000 shown in FIG. 10. A basic structure body 2005 shown in FIG. 19 is also provided with a structure which has a deformation body 405 between a force receiving body 150 and a supporting body 250. Then, a plate member having an upper face and a lower face, each of which is parallel to the XY plane, is used as the force receiving body 150 and the supporting body 250, which is similar to the examples described above.

Therefore, a cross section obtained by cutting the basic structure body 2005 along the XZ plane is, as shown in FIG. 19, constituted with a rectangular force receiving body figure 150*f*, a rectangular supporting body figure 250*f*, and a deformation body figure 405*f* which connects them. Then, the deformation body figure 405*f* includes an elastically deformed portion figure 480*f*, a first base portion figure 426*f* and a second base portion figure 436*f*. The elastically deformed portion figure 480*f* is constituted with an elongated arm-like figure along a connection channel R9 on the XZ plane which connects a first force receiving point P1 with a second force receiving point P2. The example shown in FIG. 19 is characterized in that a third base portion 496 is also added, in addition to a first base portion 426 and a second base portion 436.

As shown in the drawing, in the example as well, the connection channel R9 is defined as a channel on the XZ plane which connects the first force receiving point P1 with the second force receiving point P2. However, not only are a first relay point m1 and a second relay point m2 defined on the connection channel R9 but also a third relay point m3 is defined between the second relay point m2 and the second force receiving point P2. The third base portion 496 is added in order to support the vicinity of the third relay point m3. Therefore, the deformation body 405 is provided with the third base portion 496, in addition to the elastically deformed portion 480, the first base portion 426 and the second base portion 436. The third base portion 496 is a member which couples the vicinity of the third relay point m3 at the elastically deformed portion 480 to a third supporting point Q3 defined on the supporting body 250.

Therefore, as shown in the cross sectional view of FIG. 19, the elastically deformed portion figure 480*f* is provided with a first external arm-like portion figure 481*f* which is arranged along a zone from the first force receiving point P1 to the first relay point m1 on the connection channel R9, a first internal arm-like portion figure 482*f* which is arranged along a zone from the first relay point m1 to the second relay point m2 on the connection channel R9, a second internal arm-like portion figure 483*f* which is arranged along a zone from the second relay point m2 to the third relay point m3 on the connection channel R9, and a second external arm-like portion figure 484*f* which is arranged along a zone from the third relay point m3 to the second force receiving point P2 on the connection channel R9.

In particular, in the case of the example shown in FIG. 19, a connection end of the first base portion figure 426*f* is connected below in the vicinity of the first relay point m1 at the elastically deformed portion figure 480*f*, and a connection end of the second base portion figure 436*f* is connected below in the vicinity of the second relay point m2 at the elastically deformed portion figure 480*f*, and a connection end of the third base portion figure 496*f* which is a cross section of the third base portion is connected above in the vicinity of the third relay point m3 at the elastically deformed portion figure 480*f*.

Therefore, in FIG. 19 as well, for convenience of description, there is shown a state in which the upper end of the third base portion figure 496*f* is fixed to the third supporting point Q3 depicted on a space. Actually, the third supporting point Q3 is a point given on an upper face of the supporting body 250 (for example, a point behind the XZ plane). The third base portion 496 is a member which connects the vicinity of the third relay point m3 at the elastically deformed portion 480 with the third supporting point Q3 given on the upper face of the supporting body 250.

For example, the third base portion 496 can be constituted with a member which is formed in a U-letter like curved shape. In this case, one end of the third base portion 496 is connected above in the vicinity of the third relay point m3 at the elastically deformed portion 480, and the other end thereof is connected to the third supporting point Q3 given on the upper face of the supporting body 250, as drawn in the cross sectional view of FIG. 19. The cross sectional view of FIG. 19 is unable to illustrate an actual state in which the other end of the third base portion 496 is connected to the third supporting point Q3 (because the third supporting point Q3 is not present on a cutting plane). Therefore, for convenience of description, the third supporting point Q3 is drawn on a space, thereby indicating that the other end of the third base portion 496 is connected to the third supporting point Q3.

As described above, the basic structure body 2005 is not changed in essential function depending on whether support by the base portion is given below or above. Therefore, whether the vicinity of each of the three relay points m1, m2, m3 is supported below or above may be determined arbitrarily depending on a case. However, in the case of the example shown in FIG. 19, the connection channel R9 is given as a channel which is vertically bent as shown in the drawing. Therefore, such a structure is adopted that the vicinity of the first relay point m1 and the vicinity of the second relay point m2 are supported from below and the vicinity of the third relay point m3 is supported from above, as shown in the drawing, by which each portion can be efficiently arranged in the three-dimensional space.

Here, a point to be noted is that, as described in the example of FIG. 19, where there is adopted the structure in which the vicinity of each of the three relay points m1, m2, m3 is supported individually, the adjustment function thereof becomes different in content from the adjustment function of the examples described above, although there is obtained a function to adjust the balance of detection sensitivity between moment and force, which remains unchanged.

Specifically, in the case of the examples described above (a mode in which the vicinity of each of two relay points m1, m2 is supported), the essential function of the basic structure body is a function as a larger resistance element for preventing deformation upon exertion of moment My which is a rotational force than upon exertion of force Fz which is a translational force. A principle of the above-described function has been described above by referring to FIG. 8 and FIG. 9 in Chapter 3.

That is, where force −Fz which is a translational force is exerted on the force receiving body 100, as shown in FIG. 8, force +fz in the same direction is applied to the internal arm-like portion 312 from the left-hand side or the right-hand side. In contrast, where moment +My which is a rotational force is exerted, as shown in FIG. 9, forces +fz/−fz which are mutually reverse in direction are applied to the internal arm-like portion 312 from the left-hand side and the right-hand side. Thereby, a stress develops for vertically expanding the vicinity of the origin O, and a drag force derived from an elastic member is given to the stress. Therefore, the elastically deformed portion 310 functions as a large resistance element for preventing deformation upon exertion of moment My.

However, in the case of the example shown in FIG. 19 (a mode in which the vicinity of each of three relay points m1, m2, m3 is supported), a situation is significantly changed.

Here, consideration is given to the basic structure body 2005 shown in FIG. 19 about what type of force is applied to the vicinity of the origin O of the first internal arm-like portion figure 482f from the left-hand side and the right-hand side, upon exertion of an external force on the force receiving body 150.

At first, consideration is given to a case where force −Fz which is a translational force is exerted on the force receiving body 150. In this case, downward force −fz is applied to the first force receiving point P1, by which the first external arm-like portion figure 481f is displaced downward. As a result, the left-hand side of the first relay point m1 is displaced downward, while the right-hand side thereof is in contrast displaced upward. Therefore, upward force +fz is exerted from the left-hand side in the vicinity of the origin O.

On the other hand, since downward force −fz is exerted also on the second force receiving point P2, the second external arm-like portion figure 484f is displaced downward. As a result, the right-hand side of the third relay point m3 is displaced downward, while the left-hand side thereof is in contrast displaced upward. Therefore, the second internal arm-like portion figure 483f is displaced upward. As a result, the right-hand side of the second relay point m2 is displaced upward, while the left-hand side thereof is in contrast displaced downward. Therefore, downward force −fz is exerted from the right-hand side in the vicinity of the origin O.

Resultantly, where force −Fz which is a translational force is exerted on the force receiving body 150, a stress for contracting the vicinity of the origin O in the vertical direction is exerted, thereby giving a drag force derived from an elastic material to the stress. Therefore, upon exertion of force −Fz which is a translational force, the elastically deformed portion 480 functions as a large resistance element for preventing deformation.

Next, consideration is given to a case where moment My which is a rotational force is exerted on the force receiving body 150. In this case, since upward force +fz is exerted on the first force receiving point P1, the first external arm-like portion figure 481f is displaced upward. As a result, the left-hand side of the first relay point m1 is displaced upward, while the right-hand side thereof is in contrast displaced downward. Therefore, downward force −fz is applied from the left-hand side to the vicinity of the origin O.

On the other hand, since downward force −fz is applied to the second force receiving point P2, the second external arm-like portion figure 484f is displaced downward. As a result, the right-hand side of the third relay point m3 is displaced downward, while the left-hand side thereof is in contrast displaced upward. Therefore, the second internal arm-like portion figure 483f is displaced upward. As a result, the right-hand side of the second relay point m2 is displaced upward, and the left-hand side thereof is in contrast displaced downward. Therefore, downward force −fz is applied from the right-hand side to the vicinity of the origin O.

As described above, where moment My which is a rotational force is exerted on the force receiving body 150, force −fz in the same direction is applied from the left-hand side and the right-hand side to the vicinity of the origin O. There is no chance of causing a stress for expanding or contracting the portion thereof in the vertical direction. Therefore, in the case of the example shown in FIG. 19, the elastically deformed portion 480 functions as a large resistance element for preventing deformation upon exertion of force Fz.

Resultantly, in the examples described before in which the vicinity of each of the two relay points m1, m2 is supported, there is performed an adjusting function to lower the detection sensitivity of moment My (rotational force) rather than the detection sensitivity of force Fz (translational force). On the contrary, in the example shown in FIG. 19 in which the vicinity of each of the three relay points m1, m2, m3 is supported, there is performed an adjusting function to lower the detection sensitivity of force Fz (translational force) rather than the detection sensitivity of moment My (rotational force).

As described above, in the case of the force sensors disclosed in Patent Documents 1 to 3, there is a tendency that moment My (rotational force) is higher in detection sensitivity than force Fz (translational force). Therefore, in order to correct the tendency, the example in which the vicinity of each of two relay points m1, m2 is supported may be adopted to suppress the detection sensitivity of moment My. On the contrary, where the detection sensitivity of force Fz is required for suppression, as shown in FIG. 19, there may be adopted the example in which the vicinity of each of three relay points m1, m2, m3 is supported.

Of course, it is possible to adopt a constitution in which the number of relay points defined on the connection channel is increased to four or more, thereby supporting each of the relay points individually by four or more base portions. However, in practice, it will be sufficient that two relay points are used to suppress the detection sensitivity of moment My and three relay points are used to suppress the detection sensitivity of force Fz.

4-10. Combination of Individual Modification Examples

A description has been given above of characteristics of the basic structure body 1000 shown in FIG. 4 in Chapter 4-0 and given of various modification examples of the basic structure body 1000 from Chapter 4-1 to Chapter 4-9. Of course, individual modification examples can be combined freely. For example, in Chapter 4-1 to Chapter 4-3, a description has been given of various modification examples with regard to a mode of the internal arm-like portion, and in Chapter 4-4, a description has been given of various modification examples with regard to a mode of the external arm-like portion. These modification examples can be combined with each other. Of course, the constricted portion described in Chapter 4-5 and Chapter 4-6 as well as the weight adjusting portion and the flange portion described in Chapter 4-7 can be used in the modification examples described in Chapter 4-8 and Chapter 4-9, for example. In short, a concept of each of the modification examples described above can be used in combination with each other within a scope free from technical contradiction.

4-11. Three Dimensional Structure of Basic Structure Body

As described in Chapter 2, in the basic structure body 1000 shown in FIG. 4, the elastically deformed portion 310 is constituted with a structure body in which an elongated arm-like member expanding along the connection channel R1 is bent. Here, the elongated arm-like member may be a member which is rectangular or circular in transverse cross section or may be formed in any given different shape. Also, the member may be constituted with a pipe which is hollow inside.

As described with reference to FIG. 8 and FIG. 9, the elastically deformed portion 310 of the basic structure body 1000 is to perform a function to adjust the balance of detection sensitivity between force Fz (translational force) and moment My (rotational force). As described above, in the case of the basic structure body 1000 shown in FIG. 4, there is performed an adjusting function to lower the detection sensitivity of moment My rather than the detection sensitivity of force Fz. In the case of the modification example of the basic structure body 2005 shown in FIG. 19, there is performed an adjusting function to lower the detection sensitivity of force Fz rather than the detection sensitivity of moment My.

As described above, a fundamental principle of performing the function to adjust the detection sensitivity of force Fz and that of moment My is realized by the fact that a structure appearing on a cross section when the basic structure body is cut along the XZ plane has unique characteristics described above. For example, in the case of the basic structure body 1000, each of the cross section figures appearing on a cross section cut along the XZ plane is provided with a cross section structure shown in the front sectional view of FIG. 5. Due to the above-described cross section structure, there are performed adjusting functions described by referring to FIG. 8 and FIG. 9. In FIG. 10 to FIG. 19, characteristics of the basic structure body involved in various modification examples have been described as characteristics of each cross section figure appearing on a cross section cut along the XZ plane. This is because the above-described adjusting functions are performed on the basis of unique characteristics of the cross section structure when the basic structure body is cut along the XZ plane.

Therefore, in designing the basic structure body of the present invention, as long as a cross section structure appearing when it is cut along the XZ plane (shape and arrangement of each cross section figure) has the characteristics described above, an actual three-dimensional structure may take any mode. In Chapter 2, as a typical example of the three-dimensional structure of the basic structure body 1000 shown in FIG. 4, there is given an example in which the elastically deformed portion 310 is constituted with an elongated arm-like member expanding along the connection channel R1. The three-dimensional structure of the elastically deformed portion 310 is not necessarily limited to a structure composed of an elongated arm-like member.

The elastically deformed portion 310 may be constituted with, for example, a three-dimensional solid (a solid formed in such a shape that a flat plate is folded) which is obtained by allowing the elastically deformed portion figure 310*f* shown in FIG. 5 to horizontally move in the direction of the Y-axis (in a depth direction in the drawing) only by a distance equal to the depth width of the force receiving body 100 and that of supporting body 200. In this case, it is preferable that each of the base portions 320, 330 is also constituted with a three-dimensional solid which is obtained by allowing each of the base portion FIGS. 320*f*, 330*f* shown in FIG. 5 to horizontally move in the direction of the Y-axis only by a distance equal to the depth width of the force receiving body 100 and that of the supporting body 200.

Alternatively, as shown in FIG. 11, where there is used the elastically deformed portion figure 340*f*, the shape of which is bilaterally symmetrical with the Z-axis, it is possible to constitute the elastically deformed portion 340 with a rotation body obtained by rotating this figure, with the Z-axis given as the central axis. In this case, it is preferable that the base portions 320 and 330 are also constituted with a rotation body, with the Z-axis given as the central axis.

Therefore, actually, the basic structure body 1001 may be constituted with a rotation body obtained by rotating all the cross section figures (100f, 200f 301f) shown in FIG. 11, with the Z-axis given as the central axis. In this case, the force receiving body 100 and the supporting body 200 are constituted with a disk-like member, the elastically deformed portion 340 is constituted with a circular dish-like member, and the base portions 320, 330 are constituted with a common doughnut-like member.

From the above-described perspective, the member which is called the "arm-like portion" in the present application is not necessarily a member in which a three-dimensional shape is formed so as to give an arm-like shape. For example, in the description of the example shown in FIG. 5, the cross section figures are individually referred by using names such as the first external arm-like portion figure 311f, the internal arm-like portion figure 312f and the second external arm-like portion figure 313f. A member, the cross section of which is the first external arm-like portion figure 311f, is called the first external arm-like portion 311, a member, the cross section of which is the internal arm-like portion figure 312f, is called the internal arm-like portion 312, and a member, the cross section of which is the second external arm-like portion figure 313f, is called the second external arm-like portion 313. Each of these arm-like portions 311, 312, 313 is not necessarily a member in which a three-dimensional shape is formed so as to give the arm-like shape. It is sufficient that a two-dimensional cross section figure is formed so as to give the arm-like shape.

A description has been given above of the characteristics of the shape and arrangement of a cross section figure obtained by cutting the basic structure body along the XZ plane. The elastically deformed portion used in the present invention is not necessarily arranged on the XZ plane. As long as the elastically deformed portion is arranged on any plane parallel to the XZ plane, it is possible to obtain the function to adjust the detection sensitivity. For example, FIG. 4 shows an example in which the connection channel R1 is defined on the XZ plane and the elastically deformed portion 310 is constituted with an elongated arm-like member expanding along the connection channel R1. The example is used to describe the function to adjust the detection sensitivity as shown in FIG. 8 and FIG. 9.

However, the connection channel R1 is not necessarily a channel defined on the XZ plane but may be a channel defined on any given plane parallel to the XZ plane. For example, in FIG. 8 and FIG. 9, even if the elastically deformed portion 310 is arranged not on the XZ plane but on a plane which is on the near side in the drawing (plane parallel to the XZ plane), it will be easily understood that the function to adjust the detection sensitivity is performed on the basis of the above-described principle. Therefore, in FIG. 10 to FIG. 19, a description has been given of characteristics of the basic structure body in various modification examples as characteristics of each cross section figure appearing on a cross section cut along the XZ plane. Actually, as long as the characteristics of each cross section figure appearing on a cross section cut along the XZ plane or a plane parallel to the XZ plane have the characteristics described above, the function to adjust the detection sensitivity can be obtained. Then, these modification examples can be used as the basic structure body according to the present invention.

For example, the example shown in FIG. 10 is designed so that the connection channel R1 passes through the origin O. This is because such a fact is noted that forces +fz/−fz which are reverse in direction are balanced at a perpendicular arm-like portion arranged in the vicinity of the origin O. That is, the above-described design is able to appropriately balance force transmitted from the left-hand side with force transmitted from the right-hand side near the center of the basic structure body 1000, thereby stabilizing a deformation mode of the basic structure body 1000. And, the design is, therefore, preferable.

However, as described above, the connection channel R1 is not necessarily defined as a channel on the XZ plane and may be sufficiently defined as a channel on the XZ plane or on any given plane which is parallel to the XZ plane. Therefore, in order to design the basic structure body so that force from the left-hand side is well-balanced with force from the right-hand side near the center of the basic structure body 1000, the longitudinal direction axis shown in FIG. 10 (axis shown as the Z-axis in the drawing) is not necessarily the Z-axis (axis on the XZ plane) but an axis which is included in the YZ plane may be sufficient.

In short, in order to realize such a constitution that a first longitudinal direction axis and a second longitudinal direction axis parallel to the Z-axis are given on the connection channel R1 to exhibit a resistance force for preventing deformation to a maximum extent and also to design so that forces from the left-hand side and from the right-hand side are well-balanced near the center, the first longitudinal direction axis or the second longitudinal direction axis may be given as an axis included in the YZ plane.

For the purpose of mass-production, it is preferable that the basic structure body is structured so as to be easily processed. From this perspective, it is preferable to provide a crank-type elastically deformed portion shown in FIG. 10 and FIG. 11, rather than, for example, the elastically deformed portion 350 shown in FIG. 12 which is inclined or the elastically deformed portion 360 shown in FIG. 13 which is curved. Therefore, in practice, it is preferable that, as a connection channel which connects the first force receiving point P1 with the second force receiving point P2, there is adopted a channel which has a lengthwise direction channel parallel to the Z-axis and a crosswise direction channel parallel to the X-axis, the lengthwise direction channel is expanded from the first force receiving point P1 and the second force receiving point P2, and the first relay point m1 and the second relay point m2 are defined on the crosswise-direction channel.

Of course, each portion of the basic structure body may be made with any given material and, in general, each portion may be constituted with metal or resin.

4-12. Adjustment of Detection Sensitivity of Moment Mx

A description has been given above of the basic structure body with a function to adjust the balance of detection sensitivity between force Fz and moment My on the basis of the principle shown in FIG. 8 and FIG. 9. It will be easily understood that a basic structure body with a function to adjust the balance of detection sensitivity between force Fz and moment Mx can be realized by the identical principle. That is, the horizontal axis X in FIG. 8 and FIG. 9 is replaced by the Y-axis, by which moment My around the Y-axis shown in FIG. 9 can be replaced by moment Mx around the X-axis. Therefore, the basic structure body 1000 is to perform a function to adjust the balance of detection sensitivity between force Fz and moment Mx.

Therefore, each of the basic structure bodies shown in FIG. 10 to FIG. 19 is structured so that the horizontal axis X is replaced by the Y-axis, thereby performing a function to adjust the balance of detection sensitivity between force Fz and moment Mx. This means that the three-dimensional structure of the basic structure body can be devised to perform a function to adjust the balance of detection sensitivity between force Fz, moment Mx and moment My which are three axis components.

For example, there is prepared a basic structure body that has a three-dimensional structure in which a cross section structure cut along the XZ plane or any given plane parallel to the XZ plane has the structure shown in FIG. 5 and a cross section structure cut along the YZ plane or any given plane parallel to the YZ plane also has the structure shown in FIG. 5. Thereby, this basic structure body is to have a function to adjust the balance of detection sensitivity between the three axis components.

For example, as shown in the example of FIG. 4, where the elastically deformed portion 310 is constituted with a structure body in which an elongated arm-like member is bent, two of the thus constituted elastically deformed portions 310 are provided and one of them is combined by being rotated at 90°, by which it is possible to realize a basic structure body which has a function to adjust the detection sensitivity of each of the three axis components. Alternatively, the basic structure body is constituted with a rotation body obtained by rotating the cross section figure shown in FIG. 11, with the Z-axis given as the central axis. Thereby, each of the cross section shape obtained by cutting the basic structure body along the XZ plane and the cross section shape obtained by cutting the basic structure body along the YZ plane shows the cross sectional view shown in FIG. 11. Thus, there is also obtained the basic structure body which has a function to adjust the detection sensitivity of each of the three axis components. The force sensor which uses the above-described basic structure body will be described in detail in Chapter 5.

<<<Chapter 5. Basic Embodiment of Force Sensor in the Present Invention>>>

A description has been given above of the basic structure body of the present invention by referring to various examples in Chapter 2 to Chapter 4. The basic structure body is primarily characterized by having a function to adjust the balance of detection sensitivity between force Fz and moment My, as described above. The actions and effects unique to the present invention will be attained by the basic structure body which performs a function to adjust the balance. Accordingly, here, a description will be given of basic embodiments of a force sensor which uses the basic structure body that has been described above.

<5-1. Basic Constituents of Force Sensor in the Present Invention>

As disclosed in Patent Documents 1 to 3 which have been described above, there are publicly known force sensor, each of which adopts a basic structure body which includes a force receiving body for receiving an external force to be detected, a supporting body for supporting the force receiving body, and a deformation body which is installed between the force receiving body and the supporting body to yield elastic deformation, as mechanical structure portions. The force sensor according to the present invention also adopts a basic structure body which is provided with a force receiving body, a supporting body and a deformation body, which remains unchanged. However, the present invention is characterized by having a function to adjust the balance of detection sensitivity between force Fz and moment My. Therefore, the force sensor according to the present invention is a sensor which is provided with a function to detect at least force Fz in the direction of the Z-axis and moment My around the Y-axis, of force in the direction of each coordinate axis and moment around each coordinate axis in an XYZ three-dimensional orthogonal coordinate system.

For example, as shown in the example of FIG. 4, the force sensor is provided with a basic structure body 1000 which includes a force receiving body 100 which is arranged on the Z-axis, a supporting body 200 on the Z-axis which is arranged below the force receiving body 100, and a deformation body 300 which connects the force receiving body 100 with the supporting body 200 to yield at least partially elastic deformation by exertion of force or moment, where the coordinate system is defined so as to give the Z-axis as a perpendicular axis. Then, the force sensor is constituted by further adding a detection element and a detection circuit to the basic structure body 1000.

Here, the detection element may be an element for detecting deformation of the deformation body 300 or may be an element for detecting displacement of the deformation body 300. Specifically, where detection is made for a deformed state of the deformation body 300, the elastically deformed portion 310 may be electrically detected in a state that a predetermined site is expanded or contracted. For example, a strain gauge which is attached at a specific site of the elastically deformed portion 310 can be used as a detection element. Consideration is given to the deformation modes shown in FIG. 8 and FIG. 9, thereby it was found that a unique strain depending on an exerted external force occurs at each site of the elastically deformed portion 310. Thus, a strain gauge is attached to a predetermined site of the elastically deformed portion 310 (a site having expansion or contraction on the surface thereof), by which a mechanical strain occurring at each site can be electrically detected as change in electrical resistance of the strain gauge, thereby detecting the magnitude of a specific axis component on which an external force has been exerted.

On the other hand, where detection is made in a state of displacement of the deformation body 300, a distance between a predetermined site of the elastically deformed portion 310 and a predetermined site of the supporting body 200 may be electrically detected. In this case, a plurality of capacitive elements, each having a displacement electrode formed at a predetermined site of the elastically deformed portion 310 and a fixed electrode formed at a site opposite to a displacement electrode of the supporting body 200, may be used as detection elements. When the displacement electrode undergoes displacement to result in change in distance between the both electrodes, the capacitive element is changed in capacitance value. It is, thereby, possible to electrically detect the displacement as change in capacitance value. The detection circuit is able to output electric signals which indicate at least force Fz in the direction of the Z-axis and moment My around the Y-axis by performing arithmetic processing on the basis of capacitance values of the plurality of capacitive elements.

<5-2. Cross-Section Structure of Force Sensor 3000>

Figure 20:
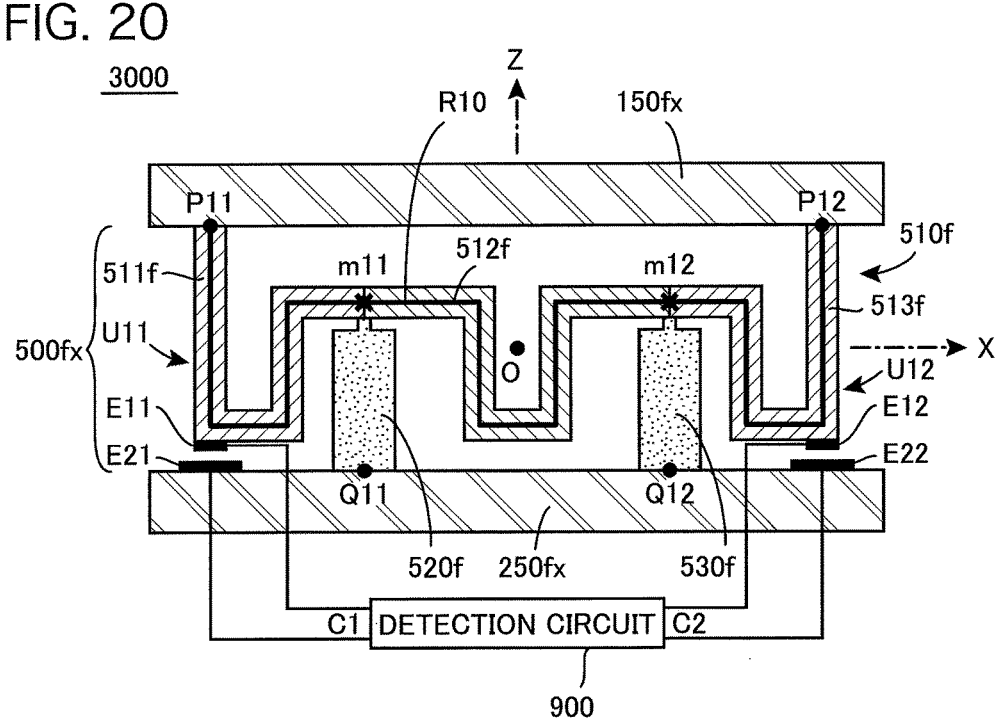
FIG. 20 is a cross sectional view and a block diagram which show a constitution of the force sensor according to the basic embodiment of the present invention (a part of the basic structure body is a front sectional view cut along the XZ plane).
Figure 21:
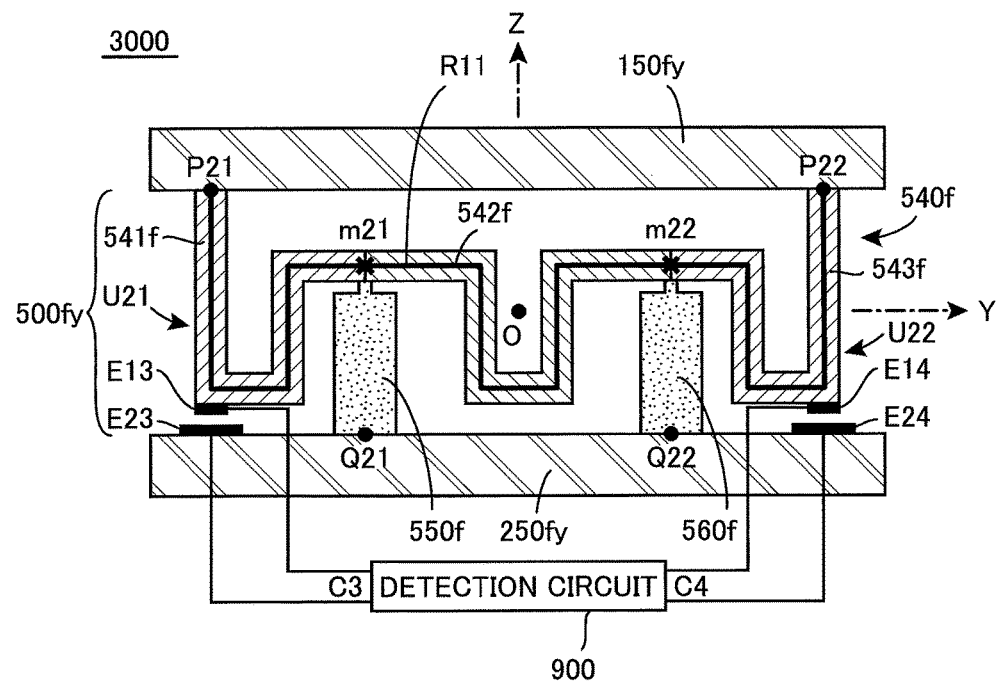
FIG. 21 is a cross sectional view and a block diagram which show a constitution of the force sensor according to the basic embodiment of the present invention (a part of the basic structure body is a side sectional view cut along the YZ plane).

Next, a description will be given of a cross section structure of a force sensor 3000 which is capable of detecting three axis components of force Fz, moment Mx, moment My, of six axis components in an XYZ three-dimensional orthogonal coordinate system. FIG. 20 and FIG. 21 are a cross sectional view and a block diagram, each of which shows a constitution of the force sensor 3000. The cross sectional view which is drawn at an upper part of FIG. 20 is a front sectional view obtained by cutting a part of a basic structure body of the force sensor 3000 along the XZ plane. The cross sectional view which is drawn at an upper part of FIG. 21 is a side sectional view obtained by cutting a part of the basic structure body along the YZ plane.

In FIG. 20, the origin O is placed at the center position of the basic structure body, the X-axis is placed on the right-hand side in the drawing, the Z-axis is placed in an upward direction in the drawing, and the Y-axis is placed in a depth direction which is perpendicular to the sheet surface of the drawing, thereby defining an XYZ three-dimensional orthogonal coordinate system. On the other hand, in FIG. 21, the Y-axis is placed on the right-hand side in the drawing, the Z-axis is placed in an upward direction in the drawing, and the X-axis is placed in a near direction which is perpendicular to the sheet surface of the drawing. Actually, the front sectional view at the upper part of FIG. 20 and the side sectional view at the upper part of FIG. 21 are geometrically identical with each other. In other words, the basic structure body shown here is provided with a three-dimensional structure which gives the same cross section irrespective of whether it is cut along the XZ plane or cut along the YZ plane.

The illustrated basic structure body is close to the basic structure body 2000 shown in FIG. 14 and provided with a force receiving body 150, a supporting body 250 and a deformation body 500. Each of the force receiving body 150 and the supporting body 250 is, as with those shown in FIG. 14, constituted with a plate member having an upper face and a lower face, each of which is parallel to the XY plane. In the case of the example shown here, each of the force receiving body 150 and the supporting body 250 is constituted with a plate member, the plane of which is square and equal in dimension.

On the other hand, the deformation body 500 is such a three-dimensional structure body that a cross section cut along the XZ plane has the structure shown in FIG. 20 and a cross section cut along the YZ plane has the structure shown in FIG. 21. Here, for convenience of description, a member appearing on the cross section cut along the XZ plane shown in FIG. 20 is referred to as a "member with regard to the X-axis" and a member appearing on the cross section cut along the YZ plane shown in FIG. 21 is referred to as a "member with regard to the Y-axis."

Therefore, of the deformation body 500, "the member with regard to the X-axis," the cross section figure of which is shown in FIG. 20, is constituted with an elastically deformed portion 510 with regard to the X-axis in which a predetermined site is connected to the force receiving body 150 to yield elastic deformation, a first base portion 520 with regard to the X-axis and a second base portion 530 with regard to the X-axis, each of which fixes the predetermined site of the elastically deformed portion 510 with regard to the X-axis to the supporting body 250. Similarly, of the deformation body 500, "the member with regard to the Y-axis," the cross section figure of which is shown in FIG. 21, is constituted with an elastically deformed portion 540 with regard to the Y-axis in which a predetermined site is connected to the force receiving body 150 to yield elastic deformation, a first base portion 550 with regard to the Y-axis and a second base portion 560 with regard to the Y-axis, each of which fixes the predetermined site of the elastically deformed portion 540 with regard to the Y-axis to the supporting body 250.

As described above, in the present application, each of geometric figures appearing on a cross section when each portion constituting the basic structure body is cut along a predetermined plane is given a name having a word of "figure" added to the end of a name of each portion and indicated by adding a symbol of "f" (meaning figure) to the end of a symbol of each original portion. Therefore, "f" is added to the end of a symbol of each cross section figure shown in FIG. 20 and FIG. 21.

Further, a member, the cross section of which appears both in FIG. 20 and FIG. 21, can be distinguished by adding "fx" or "fy" to the end of a symbol of the cross section figure of the member. For example, the cross section figure of each of the force receiving body 150, the supporting body 250 and the deformation body 500 appears both in FIG. 20 and FIG. 21. Therefore, in FIG. 20, they are respectively termed a force receiving body figure 150*fx* with regard to the X-axis, a supporting body figure 250*fx* with regard to the X-axis and a deformation body figure 500*fx* with regard to the X-axis. In FIG. 21, they are respectively termed a force receiving body figure 150*fy* with regard to the Y-axis, a supporting body figure 250*fy* with regard to the Y-axis and a deformation body figure 500*fy* with regard to the Y-axis.

First, a detailed description will be given of a cross section structure when the basic structure body is cut along the XZ plane by referring to the front sectional view shown at the upper part of FIG. 20. As described above, the front sectional view includes the force receiving body figure 150*fx* with regard to the X-axis, the supporting body figure 250*fx* with regard to the X-axis and the deformation body figure 500*fx* with regard to the X-axis. Then, the deformation body figure 500*fx* with regard to the X-axis includes the elastically deformed portion figure 510*f* with regard to the X-axis which is a cross section of the elastically deformed portion 510 with regard to the X-axis, the first base portion figure 520*f* with regard to the X-axis which is a cross section of the first base portion 520 with regard to the X-axis, and the second base portion figure 530*f* with regard to the X-axis which is a cross section of the second base portion 530 with regard to the X-axis.

Further, the elastically deformed portion figure 510*f* with regard to the X-axis is arranged along a predetermined connection channel R10 with regard to the X-axis which connects a first force receiving point P11 with regard to the X-axis which is defined on a contour of the force receiving body figure 150*fx* with regard to the X-axis with a second force receiving point P12 with regard to the X-axis. And, it is a figure which couples the first force receiving point P11 with regard to the X-axis to the second force receiving point P12 with regard to the X-axis.

Further, the first base portion figure 520*f* with regard to the X-axis is connected to the elastically deformed portion figure 510*f* with regard to the X-axis in the vicinity of a first relay point m11 with regard to the X-axis defined on the connection channel R10 with regard to the X-axis. The second base portion figure 530*f* with regard to the X-axis is connected to the elastically deformed portion figure 510*f* with regard to the X-axis in the vicinity of a second relay point m12 with regard to the X-axis defined on the connection channel R10 with regard to the X-axis.

Next, a detailed description will be given of a cross section structure when the basic structure body is cut along the YZ plane by referring to the side sectional view shown at the upper part of FIG. 21. As described above, the side sectional view includes a force receiving body figure 150*fy* with regard to the Y-axis, a supporting body figure 250*fy* with regard to the Y-axis and a deformation body figure 500*fy* with regard to the Y-axis. Then, the deformation body figure 500*fy* with regard to the Y-axis includes an elastically deformed portion figure 540*f* with regard to the Y-axis which is a cross section of the elastically deformed portion 540 with regard to the Y-axis, a first base portion figure 550*f* with regard to Y-axis which is a cross section of the first base portion 550 with regard to the Y-axis, and a second base portion figure 560*f* with regard to the Y-axis which is a cross section of the second base portion 560 with regard to the Y-axis.

Further, the elastically deformed portion figure 540*f* with regard to the Y-axis is arranged along a predetermined connection channel R11 with regard to the Y-axis which connects a first force receiving point P21 with regard to the Y-axis defined on a contour of the force receiving body figure 150*fy* with regard to the Y-axis with a second force receiving point P22 with regard to the Y-axis. And, it is a figure which couples the first force receiving point P21 with regard to the Y-axis to the second force receiving point P22 with regard to the Y-axis.

Still further, the first base portion figure 550*f* with regard to the Y-axis is connected to the elastically deformed portion figure 540*f* with regard to the Y-axis in the vicinity of a first relay point m21 with regard to the Y-axis defined on the connection channel R11 with regard to the Y-axis. The second base portion figure 560*f* with regard to the Y-axis is connected to the elastically deformed portion figure 540*f* with regard to the Y-axis in the vicinity of a second relay point m22 with regard to the Y-axis defined on the connection channel R11 with regard to the Y-axis.

Resultantly, the deformation body 500 shown here is a member which is constituted with the elastically deformed portion 510 with regard to the X-axis, the first base portion 520 with regard to the X-axis, the second base portion 530 with regard to the X-axis, the elastically deformed portion 540 with regard to the Y-axis, the first base portion 550 with regard to the Y-axis and the second base portion 560 with regard to the Y-axis.

Here, as shown in FIG. 20, the elastically deformed portion 510 with regard to the X-axis couples the first force receiving point P11 with regard to the X-axis to the second force receiving point P12 with regard to the X-axis. The first base portion 520 with regard to the X-axis couples the vicinity of the first relay point m11 with regard to the X-axis at the elastically deformed portion 510 with regard to the X-axis to a first supporting point Q11 with regard to the X-axis defined on the supporting body 250. The second base portion 530 with regard to the X-axis couples the vicinity of the second relay point m12 with regard to the X-axis at the elastically deformed portion 510 with regard to the X-axis to a second supporting point Q12 with regard to the X-axis defined on the supporting body 250.

On the other hand, as shown in FIG. 21, the elastically deformed portion 540 with regard to the Y-axis couples the first force receiving point P21 with regard to the Y-axis to the second force receiving point P22 with regard to the Y-axis. The first base portion 550 with regard to the Y-axis couples the vicinity of the first relay point m21 with regard to the Y-axis at the elastically deformed portion 540 with regard to the Y-axis to a first supporting point Q21 with regard to the Y-axis defined on the supporting body 250. The second base portion 560 with regard to the Y-axis couples the vicinity of the second relay point m22 with regard to the Y-axis at the elastically deformed portion 540 with regard to the Y-axis to a second supporting point Q22 with regard to the Y-axis defined on the supporting body 250.

In the example illustrated here as well, as with the examples described in Chapter 2 to Chapter 4, a connection end of each of the base portion FIGS. 520*f*, 530*f*, 550*f*, 560*f* with the elastically deformed portion FIGS. 510*f*, 540*f* constitutes a constricted figure which is narrower in width than the other portion. Therefore, the vicinity of a relay point of each of the elastically deformed portions is supported so as to sway in relation to the base portion. Specifically, the following sway phenomena will take place.

First, in FIG. 20, when force Fz is exerted on the force receiving body 150 in a state that the supporting body 250 is fixed and when moment My is exerted on the force receiving body 150 in a state that the supporting body 250 is fixed, the vicinity of the first relay point m11 with regard to the X-axis at the elastically deformed portion 510 with regard to the X-axis sways in the direction of the X-axis in relation to the first base portion 520 with regard to the X-axis, with a connection point with the first base portion 520 with regard to the X-axis given as a supporting point. The vicinity of the second relay point m12 with regard to the X-axis at the elastically deformed portion 510 with regard to the X-axis sways in the direction of the X-axis in relation to the second base portion 530 with regard to the X-axis, with a connection point with the second base portion 530 with regard to the X-axis given as a supporting point. Here, "sway in the direction of the X-axis" means rotational movement, with an axis passing through the supporting point and parallel to the Y-axis given as the central axis.

On the other hand, in FIG. 21, when force Fz is exerted on the force receiving body 150 in a state that the supporting body 250 is fixed and when moment Mx is exerted on the force receiving body 150 in a state that the supporting body 250 is fixed, the vicinity of the first relay point m21 with regard to the Y-axis at the elastically deformed portion 540 with regard to the Y-axis sways in the direction of the Y-axis in relation to the first base portion 550 with regard to the Y-axis, with a connection point with the first base portion 550 with regard to the Y-axis given as a supporting point. The vicinity of the second relay point m22 with regard to the Y-axis at the elastically deformed portion 540 with regard to the Y-axis sways in the direction of the Y-axis in relation to the second base portion 560 with regard to the Y-axis, with a connection point with the second base portion 560 with regard to the Y-axis given as a supporting point. Here, "sway in the direction of the Y-axis" means rotational movement, with an axis passing through the supporting point and parallel to the X-axis given as the central axis.

As shown in FIG. 20, the first force receiving point P11 with regard to the X-axis is arranged at a position having a negative coordinate value of the X-axis, and the second force receiving point P12 with regard to the X-axis is arranged at a position having a positive coordinate value of the X-axis. Further, as shown in FIG. 21, the first force receiving point P21 with regard to the Y-axis is arranged at a position having a negative coordinate value of the Y-axis, and the second force receiving point P22 with regard to the Y-axis is arranged at a position having a positive coordinate value of the Y-axis.

As described above, the basic structure body having the structural characteristics performs a function to adjust the balance of detection sensitivity between moment and force. Specifically, the basic structure body shown here has the structure given in FIG. 20 as a cross section cut along the XZ plane. Therefore, a larger resistance element which prevents deformation will be provided where moment My which is a rotational force is exerted than the case where force Fz which is a translational force is exerted. On the other hand, the basic structure body illustrated here is provided with the structure shown in FIG. 21 as a cross section cut along the YZ plane. Therefore, a larger resistance element for preventing deformation is provided also where moment Mx which is a rotational force is exerted than the case where force Fx which is a translational force is exerted.

As described above, the force sensor 3000 has a function to detect three axis components of force Fz, moment Mx and moment My. Since the detection sensitivity of moments Mx, My can be lowered as compared with the detection sensitivity of force Fz, it is possible to make uniform the detection sensitivity of three axis components of Fz, Mx, My to the extent possible. In the case of the conventional force sensors disclosed above in Patent Documents 1 to 3, there is a tendency that the detection sensitivity of moments Mx, My is excessively higher than the detection sensitivity of force Fz. However, the force sensor 3000 illustrated here corrects the above-described problem.

<5-3. Detection Motions by Force Sensor 3000>

Next, a description will be given of specific detection motions by the force sensor 3000 shown in FIG. 20 and FIG. 21. The force sensor 3000 is constituted by adding a detection element and a detection circuit to the basic structure body described in Chapter 5-2. The example illustrated here uses four sets of capacitive elements as the detection elements.

In the front sectional view at the upper part of FIG. 20 and the side sectional view at the upper part of FIG. 21, cross sections of displacement electrodes E11 to E14 and those of fixed electrodes E21 to E24 for constituting four sets of capacitive elements C1 to C4 are drawn with thick lines. The four sets of capacitive elements C1 to C4 perform a function as detection elements for detecting displacement at a specific site of the deformation body 500. On the other hand, at the lower part of each of FIG. 20 and FIG. 21, a block which indicates a detection circuit 900 is drawn. The detection circuit 900 outputs electric signals which indicate three axis components of an external force which has been exerted in a state that loads are applied to one of the force receiving body 150 and the supporting body 250 on the other, that is, force Fz in the direction of the Z-axis, moment My around the Y-axis and moment Mx around the X-axis, on the basis of detection results by the detection elements (four sets of capacitive elements C1 to C4).

The illustrated capacitive elements C1 to C4 are detection elements for detecting displacement in relation to the supporting body 250 at a specific site of the deformation body 500. They may be used as detection elements for detecting displacement in relation to the force receiving body 150 of the deformation body 500 (in this case, a fixed electrode is formed on the side of the force receiving body 150). Alternatively, it is possible to install a detection element which detects displacement of the force receiving body 150 in relation to the supporting body 250 or displacement of the supporting body 250 in relation to the force receiving body 150 (for example, a capacitive element may be constituted by placing a fixed electrode fixed to the supporting body 250 opposite to a displacement electrode fixed to the force receiving body 150).

Further, here, a description will be given of motions for detecting each of the axis components of an external force which has been exerted on the force receiving body 150 in a state that loads are applied to the supporting body 250 (for example, in a state that the supporting body 250 is fixed). Conversely, motions for detecting each of the axis components of an external force which has been exerted on the supporting body 250 in a state that loads are applied to the force receiving body 150 (for example, in a state that the force receiving body 150 is fixed) are practically equivalent in accordance with the law of action and reaction of force.

Here, in FIG. 20, a pair of counter electrodes constituted with the displacement electrode E11 and the fixed electrode E21 is referred to as the capacitive element C1, and a capacitance value thereof is also indicated by the same symbol of C1. A pair of counter electrodes constituted with the displacement electrode E12 and the fixed electrode E22 is referred to as the capacitive element C2, and a capacitance value thereof is also indicated by the same symbol of C2. As shown in the drawing, the detection circuit 900 obtains electric signals which indicate the capacitance values of C1, C2.

Similarly, in FIG. 21, a pair of counter electrodes constituted with the displacement electrode E13 and the fixed electrode E23 is referred to as the capacitive element C3, and a capacitance value thereof is also indicated by the same symbol of C3. A pair of counter electrodes constituted with the displacement electrode E14 and the fixed electrode E24 is referred to as the capacitive element C4, and a capacitance value thereof is also indicated by the same symbol of C4. As shown in the drawing, the detection circuit 900 obtains electric signals which indicate the capacitance values of C3, C4. Resultantly, electric signals indicating four sets of capacitance values C1, C2, C3, C4 are given to the detection circuit 900.

As shown in FIG. 20, a first U-letter shaped by-pass U11 with regard to the X-axis which is formed in the U-letter shape is installed at a zone between the first force receiving point P11 with regard to the X-axis and the first relay point m11 with regard to the X-axis at the connection channel R10 with regard to the X-axis. A second U-letter shaped by-pass U12 with regard to X-axis which is formed in the U-letter shape is installed at a zone between the second relay point m12 with regard to the X-axis and the second force receiving point P12 with regard to the X-axis at the connection channel R10 with regard to the X-axis. Therefore, the first external arm-like portion 511 with regard to the X-axis is provided with a by-pass portion along the first U-letter shaped by-pass U11, and the second external arm-like portion 513 with regard to the X-axis is provided with a by-pass portion along the second U-letter shaped by-pass U12.

Similarly, as shown in FIG. 21, a first U-letter shaped by-pass U21 with regard to the Y-axis which is formed in the U-letter shape is installed at a zone between the first force receiving point P21 with regard to the Y-axis and the first relay point m21 with regard to the Y-axis at the connection channel R11 with regard to the Y-axis. A second U-letter shaped by-pass U22 with regard to the Y-axis which is formed in the U-letter shape is installed at a zone between the second relay point m22 with regard to the Y-axis and the second force receiving point P22 with regard to the Y-axis at the connection channel R11 with regard to the Y-axis. Therefore, the first external arm-like portion 541 with regard to the Y-axis is provided with a by-pass portion along the first U-letter shaped by-pass U21, and the second external arm-like portion 543 with regard to the Y-axis is provided with a by-pass portion along the second U-letter shaped by-pass U22.

Here, a position at which each of the displacement electrodes E11 to E14 is formed is noted, thereby it is found that each of them is formed on a lower face of the U-letter shaped by-pass portion at the external arm-like portion. That is, as shown in FIG. 20, the displacement electrode E11 is formed at a bottom of the by-pass portion along the U-letter shaped by-pass U11 at the first external arm-like portion 511 with regard to the X-axis, and the displacement electrode E12 is formed at a bottom of the by-pass portion along the U-letter shaped by-pass U12 at the second external arm-like portion 513. Further, as shown in FIG. 21, the displacement electrode E13 is formed at a bottom of the by-pass portion along the U-letter shaped by-pass U21 at the first external arm-like portion 541 with regard to the Y-axis, and the displacement electrode E14 is formed at a bottom of the by-pass portion along the U-letter shaped by-pass U22 at the second external arm-like portion 543 with regard to the Y-axis.

In general, where a U-letter shaped by-pass portion is provided at an external arm-like portion, the deformation body 500 is made available in a wider variation of deformation modes, thereby offering such an advantage that the deformation body 500 can be changed into various shapes. This has been described above in Chapter 4-4. In addition, in an example in which a capacitive element is used as a detection element such as the force sensor 3000 described here, the U-letter shaped by-pass portion installed on an external arm-like portion is also able to perform a function to provide a place for forming a displacement electrode. As shown in the drawing, a bottom of the U-letter shaped by-pass portion is positioned in the vicinity of an upper face of the supporting body 250. Therefore, a displacement electrode is formed at the bottom and a fixed electrode is formed at a position opposite to the upper face of the supporting body 250, thus making it possible to obtain the capacitive elements C1 to C4 which perform an optimal function of a detection element.

That is, as shown in FIG. 20, the first capacitive element C1 is constituted with the first displacement electrode E11 which is fixed to the bottom of a portion arranged along the first U-letter shaped by-pass U11 with regard to the X-axis of the elastically deformed portion 510 with regard to the X-axis, and the first fixed electrode E21 which is fixed to a portion opposite to the first displacement electrode E11 on an upper face of the supporting body 250. Further, the second capacitive element C2 is constituted with the second displacement electrode E12 which is fixed to the bottom of a portion arranged along the second U-letter shaped by-pass U12 with regard to the X-axis of the elastically deformed portion 510 with regard to the X-axis, and the second fixed electrode E22 which is fixed to a portion opposite to the second displacement electrode E12 on the upper face of the supporting body 250.

Similarly, as shown in FIG. 21, the third capacitive element C3 is constituted with the third displacement electrode E13 which is fixed to a bottom of a portion arranged along the first U-letter shaped by-pass U21 with regard to the Y-axis of the elastically deformed portion 540 with regard to the Y-axis, and the third fixed electrode E23 which is fixed to a portion opposite to the third displacement electrode E13 on the upper face of the supporting body 250. Further, the fourth capacitive element C4 is constituted with the fourth displacement electrode E14 which is fixed to a bottom of a portion arranged along the second U-letter shaped by-pass U22 with regard to the Y-axis of the elastically deformed portion 540 with regard to the Y-axis, and the fourth fixed electrode E24 which is fixed to a portion opposite to the fourth displacement electrode E14 on the upper face of the supporting body 250.

Here, consideration will be given of behavior of each of the capacitive elements C1 to C4 where an external force is exerted on the force receiving body 150 in a state that the supporting body 250 is fixed. First, where downward force −Fz is exerted on the force receiving body 150, the external arm-like portions 511, 513, 541, 543 are all displaced downward. Therefore, the electrode intervals of the four sets of capacitive elements C1 to C4 are all made narrow, thereby increasing all the capacitance values C1 to C4. In contrast, where upward force +Fz is exerted on the force receiving body 150, the external arm-like portions 511, 513, 541, 543 are all displaced upward. Therefore, the electrode intervals of the four sets of capacitive elements C1 to C4 are all made wide, thereby decreasing all the capacitance values C1 to C4.

Therefore, the detection circuit 900 is subjected to arithmetic processing of −Fz=C1+C2+C3+C4, thereby giving a function to determine a value of exerted force Fz, by which it is possible to output an electric signal which indicates force Fz. In this case, actually, there is needed such handling that sets a computation value of Fz upon exertion of no force on the force receiving body 150 to a zero point as a reference.

On the other hand, in FIG. 20, where clockwise moment +My is exerted on the force receiving body 150 in a state that the supporting body 250 is fixed, the external arm-like portion 511 is displaced upward, and the external arm-like portion 513 is displaced downward. Therefore, the capacitive element C1 is increased in electrode interval to decrease the capacitance value C1. The capacitive element C2 is narrowed in electrode interval to increase the capacitance value C2. In contrast, where counter-clockwise moment −My is exerted on the force receiving body 150, the external arm-like portion 511 is displaced downward and the external arm-like portion 513 is displaced upward. Therefore, the capacitive element C1 is narrowed in electrode interval to increase the capacitance value C1. The capacitive element C2 is increased in electrode interval to decrease the capacitance value C2.

As described above, upon exertion of moments +My, −My, the external arm-like portions 541, 543 shown in FIG. 21 are slightly inclined in the direction of the X-axis and the displacement electrodes E13, E14 are slightly inclined. Therefore, the electrode interval between the capacitive elements C3, C4 is narrowed at certain parts but increased at other parts, thereby keeping an average electrode interval unchanged. Thus, there is found no change in capacitance values C3, C4.

Accordingly, the detection circuit 900 is subjected to arithmetic processing of My=C2−C1 so as to have a function to determine a value of exerted moment My, thus making it possible to output an electric signal which indicates the moment My. In this case, the basic structure body is designed so as to be symmetrical with the YZ plane, by which when no force is exerted on the force receiving body 150, the capacitance value is expressed by C1 =C2. Thus, the value of moment My determined by the arithmetic processing of My=C2−C1 is provided as a detection value which indicates a correct zero point as it is.

Similarly, in FIG. 21, where clockwise moment −Mx is exerted on the force receiving body 150 in a state that the supporting body 250 is fixed, the external arm-like portion 541 is displaced upward and the external arm-like portion 543 is displaced downward. Therefore, the capacitive element C3 is increased in electrode interval to decrease a capacitance value C3. The capacitive element C4 is narrowed in electrode interval to increase a capacitance value C4. In contrast, where counter-clockwise moment +Mx is exerted on the force receiving body 150, the external arm-like portion 541 is displaced downward and the external arm-like portion 543 is displaced upward. Therefore, the capacitive element C3 is narrowed in electrode interval to increase a capacitance value C3, and the capacitive element C4 is increased in electrode interval to decrease a capacitance value C4.

As described above, upon exertion of moments +Mx, −Mx, the external arm-like portions 511, 513 shown in FIG. 20 are slightly inclined in the direction of the Y-axis, and the displacement electrodes E11, E12 are slightly inclined.

Therefore, the electrode interval between the capacitive elements C1, C2 is narrowed at certain parts but increased at other parts, thereby keeping an average electrode interval unchanged. Therefore, there is found no change in capacitance values C1, C2.

Therefore, the detection circuit 900 is subjected to arithmetic processing of Mx=C3−C4 so as to have a function to determine a value of exerted moment Mx, thus making it possible to output an electric signal which indicates the moment Mx. In this case, the basic structure body is designed so as to be symmetrical with the XZ plane, by which the capacitance value is given as C3=C4 when no force is exerted on the force receiving body 150, and the value of moment Mx determined by arithmetic processing of Mx=C3−C4 is given as a detection value which indicates a correct zero point as it is.

Resultantly, the detection circuit 900 included in the force sensor 3000 performs processing in which a difference in capacitance value between the first capacitive element C1 and the second capacitive element C2 is output as an electric signal indicating moment My around the Y-axis, a difference in capacitance value between the third capacitive element C3 and the fourth capacitive element C4 is output as an electric signal indicating moment Mx around the X-axis, and a sum of the capacitance value of the first capacitive element C1, the capacitance value of the second capacitive element C2, the capacitance value of the third capacitive element C3 and the capacitance value of the fourth capacitive element C4 is output as an electric signal indicating force Fz in the direction of the Z-axis.

According to the above-described principle of detection, the force sensor 3000 shown in FIG. 20 and FIG. 21 is able to output detection values of three axis components, Fz, Mx, My. In addition, a detection value of each of the axis components, Fz, Mx, My determined by the arithmetic processing is a value free of other axis components. It is, therefore, possible to obtain detection values of the three axis components independently without mutual interference. Further, as described above, the basic structure body shown in FIG. 20 and FIG. 21 is used, thus making it possible to adjust the balance of detection sensitivity between moment and force. That is, moments Mx, My can be narrowed in detection sensitivity more than force Fz, by which the three axis components, Fz, Mx, My, can be made uniform in detection sensitivity to the extent possible.

In the example shown in the drawing, the fixed electrodes E21 to E24 opposite to the displacement electrodes E11 to E14 are made larger in size than the displacement electrodes E11 to E14. This is because care is taken so that an actual facing area is always kept constant (the area of the displacement electrode is continuously given as an actual facing area) even if deviation takes place at a position at which both the electrodes are opposite to each other.

That is, since the deformation body 500 is provided in a wider variation of deformation modes, there is a possibility that a position at which a displacement electrode is opposite to a fixed electrode may deviate. However, as shown in the example, the displacement electrode is made slightly smaller in size than the fixed electrode. Thereby, even if deviation takes place at an opposite position, an actual facing area which performs a function as a capacitive element is always kept constant. Therefore, variation in capacitance value will take place exclusively due to change in distance between electrodes which are opposite to each other. Of course, the fixed electrode may be made slightly smaller in size than the displacement electrode.

<5-4. First Example of Three-Dimensional Structure of Force Sensor 3000>

A description has been given of the cross section structure of the force sensor 3000 in Chapter 5-2 and detection motions of the force sensor 3000 in Chapter 5-3. Then, a description has been also given of an advantage that three axis components, Fz, Mx, My can be made uniform in detection sensitivity according to the force sensor 3000. Here, the effects of making force Fz and moment My uniform in detection sensitivity are effects derived from the fact that a cross section structure when the basic structure body is cut along the XZ plane has unique characteristics shown in FIG. 20. The effects of making force Fz and moment Mx uniform in detection sensitivity are effects derived from the fact that a cross section structure when the basic structure body is cut along the YZ plane has unique characteristics shown in FIG. 21.

Therefore, any basic structure body in which each cross section structure has unique characteristics shown in FIG. 20 and FIG. 21 is able to obtain the effects of making three axis components, Fz, Mx, My uniform in detection sensitivity, irrespective of a specific three-dimensional structure. In other words, in designing the specific force sensor 3000, if such conditions are met that a cross section structure appearing on the XZ cutting plane has the characteristics shown in FIG. 20 and a cross section structure appearing on the YZ cutting plane has the characteristics shown in FIG. 21, a specific three-dimensional structure of the basic structure body may be any given three-dimensional structure. However, here, a description will be given of a specific example of the basic structure body having a three-dimensional structure suitable for commercial use.

Figure 22:
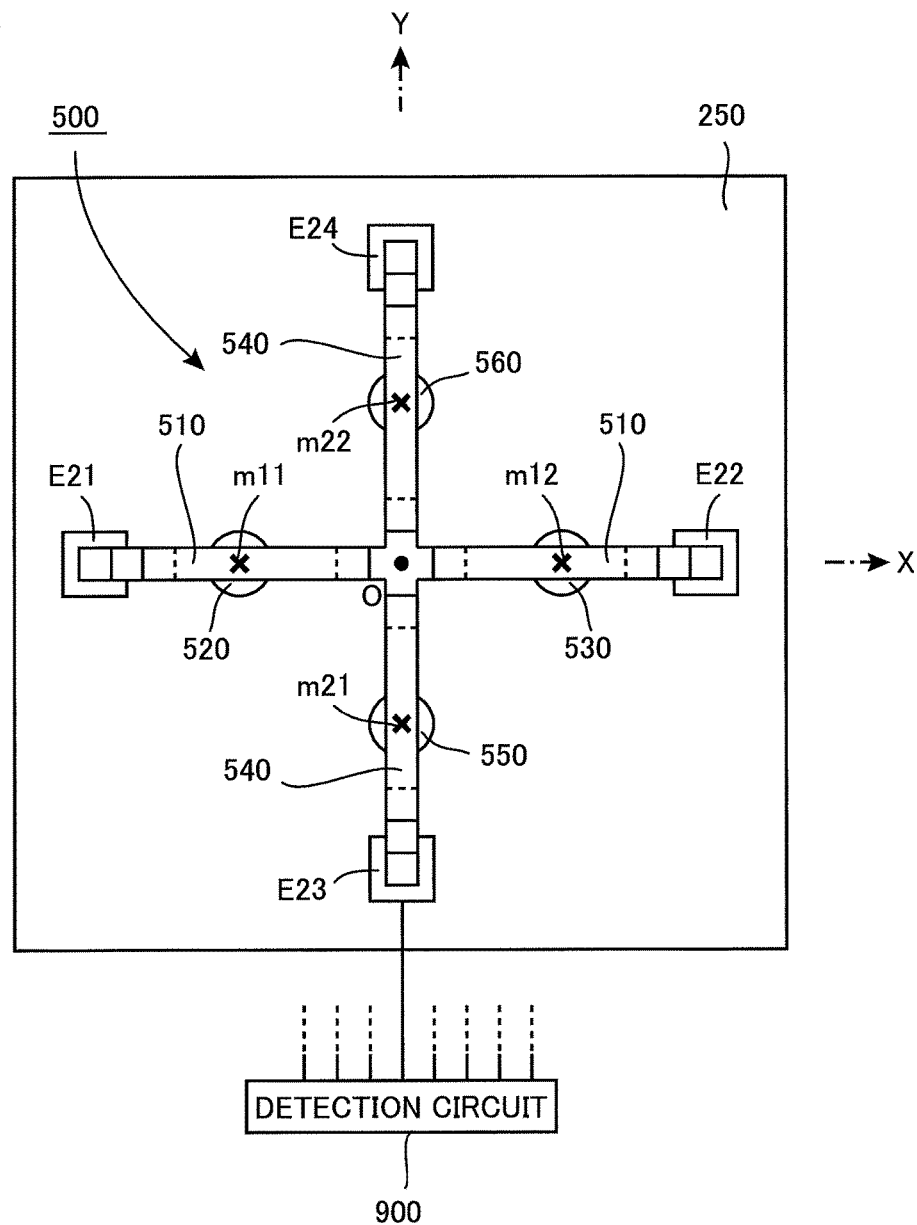
FIG. 22 is a top view and a block diagram which show a first example of the three-dimensional structure of the force sensor according to the basic embodiment of the present invention (the top view shows a state in which a force receiving body 150 is removed).

FIG. 22 is a top view and a block diagram which show a force sensor 3001 of the first example in which the force sensor 3000 shown in FIG. 20 and FIG. 21 is materialized as a three-dimensional structure body. The top view at the upper part shows a basic structure body and a detection element (an electrode which constitutes a capacitive element) in a state that a force receiving body 150 is removed. And, the block diagram at the lower part shows a detection circuit 900.

In the top view at the upper part, the X-axis is placed on the right-hand side in the drawing, the Y-axis is placed in an upward direction in the drawing, and the Z-axis is placed in a direction perpendicular to the sheet surface. As shown in the drawing, a supporting body 250 is a square-shaped substrate, on which a deformation body 500 is arranged. The Z-axis penetrates through the center of the square-shaped supporting body 250, and the origin O is drawn at the center point of the supporting body 250. In the actual force sensor 3001, the force receiving body 150 composed of the square-shaped substrate is arranged above the deformation body 500 (in the near direction on the drawing). However, FIG. 22 shows a state that the force receiving body 150 has been removed. Of course, when the force receiving body 150 is added to the structure body shown in FIG. 22 and cut along the XZ plane, the cross sectional view shown in FIG. 20 is obtained, and when cut along the YZ plane, the cross sectional view shown in FIG. 21 is obtained.

The force sensor 3001 is an example where an elastically deformed portion 510 with regard to the X-axis (a cross section FIG. 510f is drawn in FIG. 20) is constituted with a structure body formed by bending an elongated arm-like member arranged on the XZ plane and an elastically deformed portion 540 with regard to the Y-axis (a cross section figure 540f is drawn in FIG. 21) is constituted with a structure body formed by bending an elongated arm-like member arranged on the YZ plane. Nevertheless, the elastically deformed portion 510 with regard to the X-axis is integrated with the elastically deformed portion 540 with regard to the Y-axis at a position intersecting with the Z-axis, and actually, given as an integrated structure body. The top view of FIG. 22 shows the integrated structure body as a cross-shaped member.

In the example shown in the drawing, a square rod member, the transverse cross section of which is rectangular, is used as an elongated arm-like member which constitutes each of the elastically deformed portions 510, 540. However, there may be used a cylindrical member, the transverse cross section of which is circular, or there may be used a pipe, the interior of which is hollow. Of course, the constricted portion, the weight adjusting portion, the flange portion, etc., which are described in the modification examples of Chapter 4-5, Chapter 4-6 and Chapter 4-7 may be used appropriately whenever necessary.

In FIG. 22, a first relay point m11 with regard to the X-axis and a second relay point m12 with regard to the X-axis which are defined on a connection channel R10 with regard to the X-axis (a channel along which the elastically deformed portion 510 runs) are drawn by the cross mark. And, a first relay point m21 with regard to the Y-axis and a second relay point m22 with regard to the Y-axis which are defined on the connection channel R11 with regard to the Y-axis (a channel along which the elastically deformed portion 540 runs) are also drawn with the cross mark. Then, there is shown a state that positions below the relay points m11, m12, m21, m22 are respectively supported by base portions 520, 530, 550, 560. In the example, each of the base portions 520, 530, 550, 560 is constituted with a cylindrical structure body. Of course, an upper end of each of the base portions 520, 530, 550, 560 is constricted and, therefore, the lower face of each of the elastically deformed portions 510, 540 is supported in a state close to point contact.

In FIG. 22, there are drawn four sets of fixed electrodes E21 to E24 which are fixed on an upper face of a supporting body 250. In the example shown in the drawing, each of the fixed electrodes E21 to E24 is formed in the square shape. Bottoms of U-letter shaped by-pass portions of the elastically deformed portions 510, 540 are positioned above these fixed electrodes E21 to E24, and displacement electrodes E11 to E14 (not shown in the drawing) are formed on the bottoms.

Wiring (illustration is omitted) is given to the four sets of fixed electrodes E21 to E24 and the four sets of displacement electrodes E11 to E14 (not illustrated) to connect a detection circuit. The detection circuit 900 detects capacitance values of the four sets of capacitive elements C1 to C4 via the wiring to perform the above-described arithmetic processing, thereby outputting detection values of three axis components Fz, Mx, My.

<5-5. Second Example of Three-Dimensional Structure of Force Sensor 3000>

Figure 23:
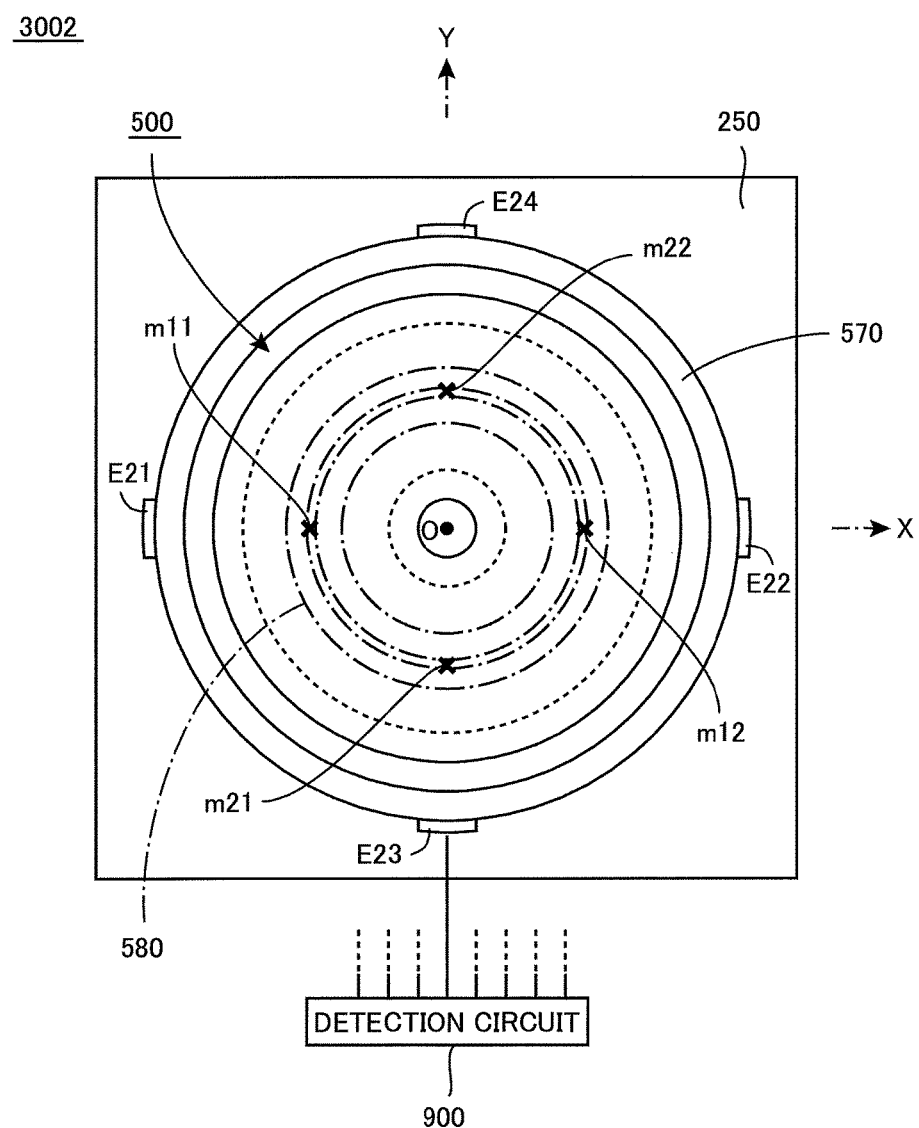
FIG. 23 is a top view and a block diagram which show a second example of three-dimensional structure of the force sensor according to the basic embodiment of the present invention (the top view shows a state in which the force receiving body 150 has been removed).

FIG. 23 is a top view and a block diagram which show a force sensor 3002 of the second example in which the force sensor 3000 shown in FIG. 20 and FIG. 21 is materialized as a three-dimensional structure body. The top view at the upper part also shows a basic structure body and a detection element (an electrode which constitutes a capacitive element) in a state that a force receiving body 150 has been removed, and the block diagram at the lower part shows a detection circuit 900.

In the top view at the upper part, the X-axis is placed on the right-hand side in the drawing, the Y-axis is placed in an upward direction in the drawing, and the Z-axis is placed in a direction perpendicular to the sheet surface. As shown in the drawing, a supporting body 250 is a square-shaped substrate, on which a deformation body 500 is arranged. The Z-axis penetrates through the center of the square-shaped supporting body 250, and the origin O is drawn at the center point of the supporting body 250. In the actual force sensor 3002, the force receiving body 150 composed of the square-shaped substrate is arranged above the deformation body 500 (in the near direction on the drawing). However, FIG. 23 shows a state that the force receiving body 150 has been removed.

Of course, when the force receiving body 150 is added to the structure body shown in FIG. 23 and cut along the XZ plane, the cross sectional view shown in FIG. 20 is obtained, and when cut along the YZ plane, the cross sectional view shown in FIG. 21 is obtained. That is, the deformation body figure 500fx with regard to the X-axis shown in FIG. 20 is a cross section figure obtained when the deformation body 500 shown in FIG. 23 is cut along the XZ plane. And, the deformation body figure 500fy with regard to the Y-axis shown in FIG. 21 is a cross section figure obtained when the deformation body 500 shown in FIG. 23 is cut along the YZ plane. Resultantly, the force sensor 3001 shown in FIG. 22 and the force sensor 3002 shown in FIG. 23 are also such that the XZ cutting plane of the basic structure body is as shown in FIG. 20 and the YZ cutting plane is as shown in FIG. 21. Therefore, the effect of making the three axis components Fz, Mx, My uniform in detection sensitivity is obtained, which remains unchanged. They are only different in a method for being materialized as a three-dimensional structure body.

In the case of the force sensor 3002 shown in FIG. 23, an elastically deformed portion 510 with regard to the X-axis (the cross section figure 510f is shown in FIG. 20) and an elastically deformed portion 540 with regard to the Y-axis (the cross section figure 540f is shown in FIG. 21) are materialized by a common rotation body. As shown in FIG. 20 and FIG. 21, each of the elastically deformed portion figure 510f with regard to the X-axis and the elastically deformed portion figure 540f with regard to the Y-axis is formed so as to be symmetrical with the Z-axis. Further, the elastically deformed portion figure 510f with regard to the X-axis and the elastically deformed portion figure 540f with regard to the Y-axis are geometrically congruent figures.

Therefore, a rotation body obtained by rotating the congruent figure, with the Z-axis given as the central axis, is used to form an elastically deformed integrated portion 570 (refer to FIG. 23). Thereby, a part of the elastically deformed integrated portion 570 functions as the elastically deformed portion 510 with regard to the X-axis, and the other part thereof functions as the elastically deformed portion 540 with regard to the Y-axis.

Similarly, in the case of the force sensor 3002 shown in FIG. 23, each of base portions 520, 530, 550, 560 is materialized by a common rotation body. When consideration is given to a group of base portion figures with regard to the X-axis constituted with a first base portion figure 520f with regard to the X-axis and a second base portion figure 530f with regard to the X-axis, as shown in FIG. 20, the group of base portion figures with regard to the X-axis is formed so as to be symmetrical with the Z-axis. Further, when consideration is given to a group of base portion figures with regard to the Y-axis constituted with a first base portion figure 550f with regard to the Y-axis and a second base portion figure 560f with regard to the Y-axis, as shown in FIG. 21, the group of base portion figures with regard to the Y-axis is also formed so as to be symmetrical with the Z-axis. Further, the group of base portion figures with regard to the X-axis and the group of base portion figures with regard to the Y-axis are geometrically congruent figures.

Therefore, a rotation body obtained by rotating the congruent figure, with the Z-axis given as the central axis, is used to form an integrated base portion 580 (refer to FIG. 23). Thereby, each of the first base portion 520 with regard to the X-axis, the second base portion 530 with regard to the X-axis, the first base portion 550 with regard to the Y-axis and the second base portion 560 with regard to the Y-axis can be constituted with a part of the integrated base portion 580.

The deformation body 500 shown in the top view at the upper part of FIG. 23 is a three-dimensional structure body which has the above-described elastically deformed integrated portion 570 and the integrated base portion 580. Concentric circles drawn by the solid line and the dashed line in the drawing indicate a contour and a step portion of the elastically deformed integrated portion 570, and concentric circles drawn by the single dot & dash line in the drawing indicate a contour and a step portion of the integrated base portion 580. Only lines drawn by the solid line in the drawing can be confirmed when the deformation body 500 is observed from above, and lines drawn by the dashed line and the single dot & dash line are those appearing below the elastically deformed integrated portion 570. Of course, the constricted portion, the weight adjusting portion, the flange portion, etc., described in the modification examples of Chapter 4-5, Chapter 4-6 and Chapter 4-7 can be installed, whenever necessary.

In FIG. 23, the first relay point m11 with regard to the X-axis and the second relay point m12 with regard to the X-axis which are defined on the connection channel R10 with regard to the X-axis are drawn by the cross mark. And, a first relay point m21 with regard to the Y-axis and a second relay point m22 with regard to the Y-axis which are defined on the connection channel R11 with regard to the Y-axis are also drawn by the cross mark. A position below each of the relay points, m11, m12, m21, m22, of the elastically deformed integrated portion 570 is supported by an upper end of the integrated base portion 580. Here, the upper end of the integrated base portion 580 is formed in a ring structure, as drawn by the single dot & dash line in the drawing.

As shown in the front sectional view of FIG. 20 and the side sectional view of FIG. 21, the upper end of the integrated base portion 580 is constricted. In the cross sectional view, the upper end of the integrated base portion 580 supports the elastically deformed integrated portion 570 from below in a state close to point contact. Actually, as shown in the top view of FIG. 23, the elastically deformed integrated portion 570 is supported by the upper end of the integrated base portion 580 which is formed in an elongated ring structure.

As described above, the force sensor 3002 adopts a structure in which the elastically deformed integrated portion 570 is supported in an annular form by the integrated base portion 580. However, the sensor is able to perform sway motions described above, which remains unchanged. That is, when an intersecting portion of the elastically deformed integrated portion 570 and the XZ plane (a portion which functions as the elastically deformed portion 510 with regard to the X-axis) is noted, the vicinity of the first relay point m11 and that of the second relay point m12 sway in the direction of the X-axis in relation to the integrated base portion 580, which remains unchanged. Similarly, when an intersecting portion of the elastically deformed integrated portion 570 and the YZ plane (a portion which functions as the elastically deformed portion 540 with regard to the Y-axis) is noted, the vicinity of the first relay point m21 and that of the second relay point m22 sway in the direction of the Y-axis in relation to the integrated base portion 580, which remains unchanged.

In FIG. 23, there are drawn four sets of fixed electrodes E21 to E24 which are fixed on the upper face of the supporting body 250. In the example shown in the drawing, each of the fixed electrodes E21 to E24 is formed in the square shape. A bottom of the U-letter shaped by-pass portion of the elastically deformed integrated portion 570 is positioned above these fixed electrode E21 to E24, and displacement electrodes E11 to E14 (not appearing in the drawing) are formed at the bottom.

Wiring (illustration is omitted) is given to four sets of fixed electrodes E21 to E24 and four sets of displacement electrodes E11 to E14 (not illustrated), thereby connecting a detection circuit 900. The detection circuit 900 detects capacitance values of four sets of capacitive elements C1 to C4 via the wiring to perform the arithmetic processing, thereby outputting detection values of three axis components Fz, Mx, My.

<5-6. Other Examples of Force Sensor 3000>

In Chapter 5-4 and Chapter 5-5, a description has been given of the examples of a specific three-dimensional structure of the force sensor 3000 having the cross section structure shown in each of FIG. 20 and FIG. 21. Of course, the three-dimensional structure of the force sensor according to the present invention shall not be limited to these examples. The cross section structure of the force sensor according to the present invention shall not be limited to the examples shown in FIG. 20 and FIG. 21. The force sensor may have the cross section structures used in various modification examples described in Chapter 4, for example.

Further, the characteristics of the cross section structure unique to the basic structure body of the force sensor according to the present invention described above are not necessarily characteristics that appear on a cross section cut along the XZ plane or a cross section cut along the YZ plane as described in Chapter 4-11. The above-described characteristics may be those appearing on a cross section cut along any given plane parallel to the XZ plane or cut along any given plane parallel to the YZ plane.

With the above description taken into account, the specific three-dimensional structure of the force sensor 3000 may include any structure body in which, when the basic structure body is cut along the XZ plane or a predetermined plane parallel to the XZ plane, a cross section structure having the characteristics shown in FIG. 20 is obtained, and when the basic structure body is cut along the YZ plane or a predetermined plane parallel to the YZ plane, a cross section structure having the characteristics shown in FIG. 21 is obtained.

Further, in Chapter 5-3, Chapter 5-4 and Chapter 5-5, there have been shown examples in which a capacitive element is used as a detection element. Of course, the detection element used in the force sensor of the present invention shall not be limited to the capacitive element. For example, in the case of the force sensor 3001 shown in FIG. 22, a strain gauge attached at a predetermined site of the elastically deformed portion 510 with regard to the X-axis and at a predetermined site of the elastically deformed portion 540 with regard to the Y-axis can be used to constitute the detection element. In the case of the force sensor 3001 shown in FIG. 23, a strain gauge attached at a predetermined site of the elastically deformed integrated portion 570 can be used to constitute the detection element.

<<<Chapter 6. Auxiliary structure body of the present invention and force Sensor into which the Auxiliary Structure Body is Incorporated>>>

<6-1. Concept of Auxiliary Structure Body>

A description has been given above of the structure of the basic structure body and the essential function (the function to adjust the balance of detection sensitivity between moment and force) in the present invention in Chapter 2 and Chapter 3. And, a description has been also given of the modification examples of the basic structure body in Chapter 4 and an overall structure of the force sensor using the basic structure body in Chapter 5.

The important characteristics of the force sensor 3000 described in Chapter 5 are such that a three-dimensional structure body having a unique cross section structure is used as the deformation body 500, thereby detecting displacement or deformation of the deformation body 500 by using a detection element. The actions and effects that three axis components, Fz, Mx, My, are made uniform in detection sensitivity are obtained in the force sensor 3000, which is exclusively due to the unique structure of the deformation body 500.

Resultantly, the deformation body 300 shown in FIG. 4, the deformation body 301 shown in FIG. 11, the deformation body 302 shown in FIG. 12, the deformation body 303 shown in FIG. 13, the deformation body 400 shown in FIG. 14, the deformation body 401 shown in FIG. 15, the deformation body 402 shown in FIG. 16, the deformation body 403 shown in FIG. 17, the deformation body 404 shown in FIG. 18, the deformation body 405 shown in FIG. 19 and the deformation body 500 shown in FIG. 20 to FIG. 23 are all used by being held between a force receiving body and a supporting body which constitute the force sensor. Thereby, they have a function to adjust the balance of detection sensitivity between moment and force.

With the above description taken into account, it is found that a member which constitutes a variation of deformation bodies described above can be used as an auxiliary structure body which can be added to the force sensor for the purpose of performing a function to adjust the balance of detection sensitivity between moment and force. In other words, a member similar in structure to the deformation body 300, etc., shown in FIG. 4 is incorporated as an auxiliary structure body into a conventional general-type force sensor (the force sensor having a force receiving body, a supporting body and a deformation body which is held between them to yield elastic deformation), by which it is possible to adjust the balance of detection sensitivity between moment and force in the force sensor.

<6-2. Force Sensor into which the Auxiliary Structure Body is Incorporated>

Here, a specific description will be given of an example in which the auxiliary structure body of the present invention (the structure body as described above as a deformation body for the force sensor of the present invention) is incorporated into the conventional force sensor disclosed in Patent Document 3, thereby successfully adjusting the balance of detection sensitivity between moment and force in the conventional force sensor.

Figure 24:
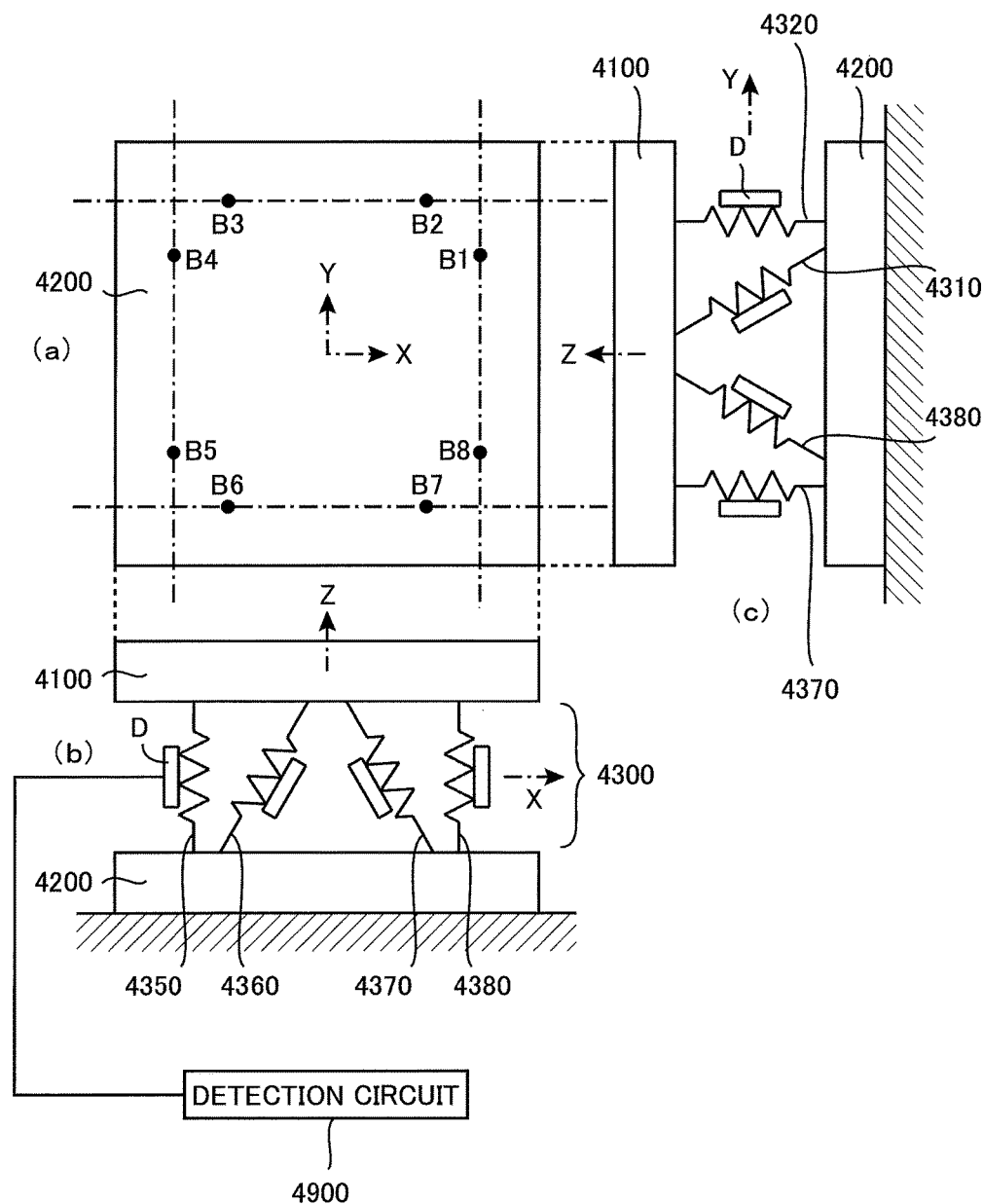
FIG. 24 is a pattern diagram which shows a constitution of a conventional general-type force sensor (FIG. (a) is a top view of a supporting body, FIG. (b) is a front view and FIG. (c) is a side view).

FIG. 24 is a drawing which shows a constitution of a force sensor 4000 which is the conventional sensor disclosed in Patent Document 3. The force sensor 4000 is provided with a force receiving body 4100, a supporting body 4200, a detection-use deformation body 4300 held between them, a detection element D for detecting displacement or deformation of the detection-use deformation body 4300, and a detection circuit 4900 which outputs an electric signal indicating an external force exerted on the force receiving body 4100 on the basis of detection results of the detection element D. Here, in the drawing, FIG. (a) is the top view of the supporting body 4200, FIG. (b) is the front view of a basic structure body which constitutes the force sensor 4000 and FIG. (c) is the side view thereof. Parts corresponding to the detection-use deformation body 4300 and the detection element D are not drawn so as to show an actual structure but drawn as a simple pattern diagram. Since the detailed structure is disclosed in Patent Document 3 described above, the description thereof is omitted here.

The detection-use deformation body 4300 is a constituent which corresponds to the deformation body 500 of the force sensor 3000 according to the present invention described in Chapter 5. In order to distinguish the above-described deformation body from the "deformation body" of the present invention, here, it is called "detection-use deformation body." The conventional force sensor 4000 is characterized in that, as shown in FIG. 3, a pair of columnar members 35, 36 is arranged in an inclined manner between a force receiving body 15 and a supporting body 25 so as to give the reverse V-letter shape. Actually, the detection-use deformation body 4300 is constituted with eight columnar members and, a total of four sets are provided, each set of which has two columnar members arranged so as to give the reverse V-letter shape.

As shown in FIG. 24(a), the supporting body 4200 is constituted with a square-shaped plate member, and the force receiving body 4100 is also constituted with a plate member equal in shape and dimension. Further, in the pattern diagrams of FIG. 24(b) and FIG. 24(c), the parts indicated by the zigzag lines are eight columnar members 4310 to 4380 which constitute the detection-use deformation body 4300. These eight columnar members are actually cylindrical structure bodies made of an elastic member. However, in FIG. 24, they are drawn by the zigzag lines in a schematic manner. Further, for convenience of illustration, in each of FIG. (b) and FIG. (c), only four columnar members on the near side are illustrated.

Points B1 to B8 on the supporting body 4200 shown in FIG. 24(a) are base points which indicate positions of the lower ends of the eight columnar members 4310 to 4380. The lines indicated by the single dot & dash line in the drawing show lines on which the base points B1 to B8 are arranged. Each of the columnar members 4310 to 4380 is arranged so as to incline along the line indicated by the single dot & dash line in the drawing.

Therefore, the lower ends of the four columnar members 4350, 4360, 4370, 4380 drawn in FIG. 24 (b) are respectively arranged at the base points B5, B6, B7, B8 shown in FIG. 24(a). The lower ends of the four columnar members, 4370, 4380, 4310, 4320 drawn in FIG. 24(c) are respectively arranged at the base points B7, B8, B1, B2 shown in FIG. 24(a).

Here, the pair of columnar members 4360, 4370 is arranged in an inclined manner so as to give the reverse V-letter shape on an arranged line passing through the base points B6, B7. The pair of columnar members 4310, 4380 is arranged in an inclined manner so as to give the reverse V-letter shape on an arranged line passing through the base points B1, B8. The pair of columnar members 4320, 4330 is arranged in an inclined manner so as to give the reverse V-letter shape on an arranged line passing through the base points B2, B3. And, the pair of columnar members 4340, 4350 is arranged in an inclined manner so as to give the reverse V-letter shape on an arranged line passing through the base points B4, B5.

On the other hand, in FIG. 24(*b*) and FIG. 24(*c*), a tetragonal block drawn beside the zigzag line indicating each of the columnar members is the detection element D for detecting displacement or deformation of each of the columnar members. Actually, the detection element is constituted with a strain gauge or a capacitive element, for example. The detection circuit 4900 electrically detects displacement or deformation of the eight columnar members detected by the strain gauge or the capacitive element, thereby outputting an electric signal indicating an external force exerted on the force receiving body 4100 in a state that the supporting body 4200 is fixed.

In FIG. 24(*a*), the X-axis is defined on the right-hand side in the drawing, the Y-axis is defined upward in the drawing, and the Z-axis is given in a direction perpendicular to the sheet surface. Since FIG. 24(*b*) is the front view, the right-hand side in the drawing is the X-axis and the upward direction in the drawing is the Z-axis. Since FIG. 24(*c*) is the side view, the upward direction in the drawing is the Y-axis and the left-hand side in the drawing is the Z-axis. The detection circuit 4900 outputs, as an electric signal, a detection value of each force Fx, Fy, Fz in the direction of each coordinate axis and each moment Mx, My, Mz around each coordinate axis in the XYZ three-dimensional orthogonal coordinate system.

As described in Chapter 1, the above-described conventional force sensor 4000 has a problem that there is a large difference in detection sensitivity between force and moment. Specifically, where the sensor is used in a general joystick-type input device, there is a tendency that the detection sensitivity of moment Mx or My is excessively higher than the detection sensitivity of force Fz. Therefore, here, a description will be given of a method for adding the auxiliary structure body of the present invention to the conventional force sensor 4000, thereby adjusting the balance of detection sensitivity between moment and force.

Figure 25:
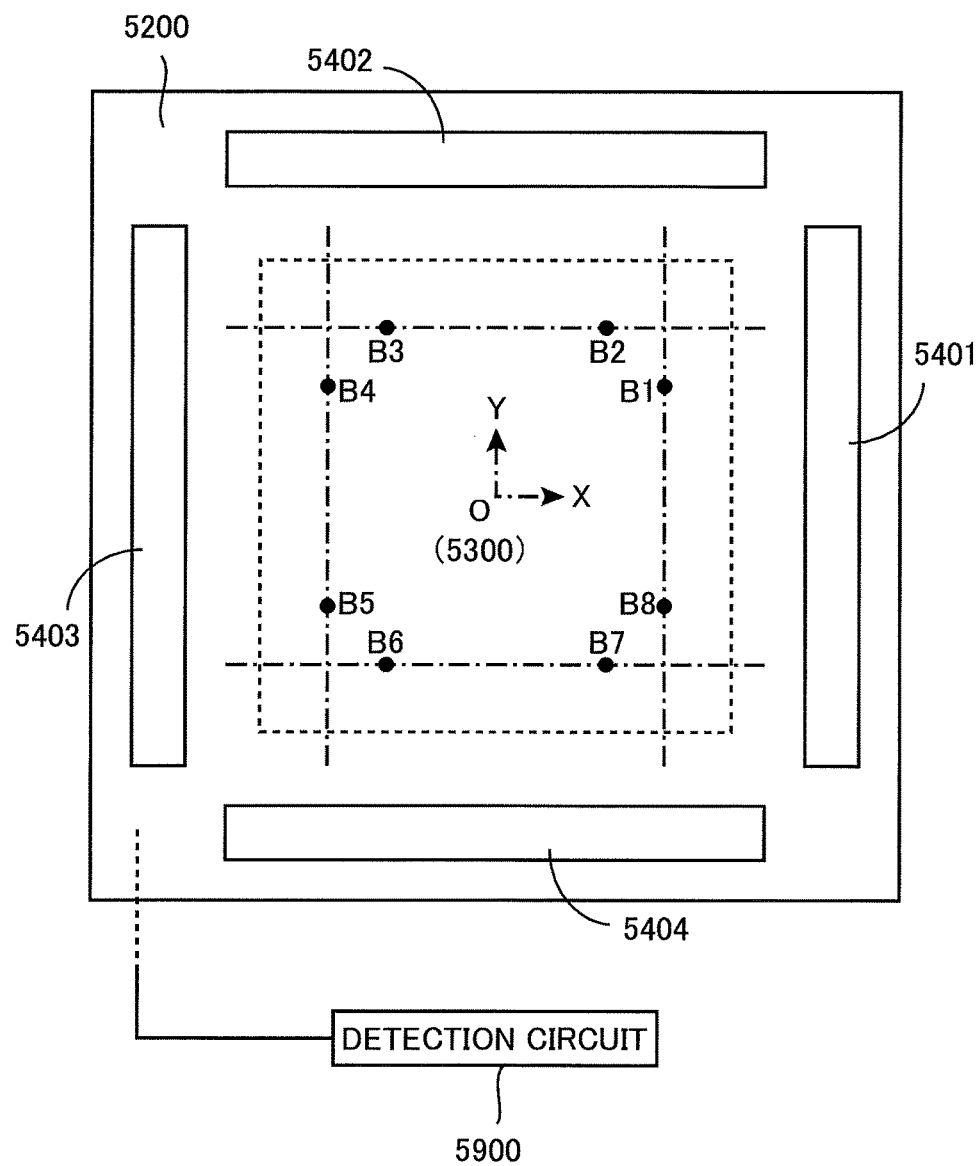
FIG. 25 is a top view and a block diagram which show a constitution of the force sensor into which the auxiliary structure body of the present invention is incorporated.

FIG. 25 is a top view and a block diagram which show a constitution of a force sensor 5000 into which the auxiliary structure body of the present invention is incorporated. The force sensor 5000 has a function to detect at least force Fz in the direction of the Z-axis and moment My around the Y-axis, of force in the direction of each coordinate axis and moment around each coordinate axis in an XYZ three-dimensional orthogonal coordinate system.

The force sensor 5000 is constituted with a force receiving body 5100 which is arranged on the Z-axis when the coordinate system is defined so that the Z-axis is given as a perpendicular axis, a supporting body 5200 which is arranged below the force receiving body 5100 on the Z-axis, a detection-use deformation body 5300 which connects the force receiving body 5100 with the supporting body 5200 to yield elastic deformation at least partially by exertion of force or moment, four sets of auxiliary structure bodies 5401 to 5404 which are connected between the force receiving body 5100 and the supporting body 5200, a detection element D which detects deformation or displacement of the detection-use deformation body 5300 or displacement of the force receiving body 5100 or the supporting body 5200, and a detection circuit 5900 which outputs an electric signal which indicates at least force Fz in the direction of the Z-axis and moment My around the Y-axis which have been exerted on the other in a state that loads are applied to one of the force receiving body 5100 and the supporting body 5200 on the basis of detection results of the detection element D.

In the top view at the upper part of FIG. 25, of these constituents, the supporting body 5200 and the four sets of auxiliary structure bodies 5401 to 5404 are drawn, while the force receiving body 5100, the detection-use deformation body 5300 and the detection element D are not illustrated. Further, regarding the four sets of auxiliary structure bodies 5401 to 5404, they are illustrated only for an arrangement thereof and not illustrated for a detailed structure thereof. The detection circuit 5900 is drawn as a block at the lower part.

In the case of FIG. 25 as well, the X-axis is placed on the right-hand side in the drawing, the Y-axis is placed in an upward direction in the drawing and the Z-axis is placed in a direction perpendicular to the sheet surface direction, thereby defining the XYZ three-dimensional orthogonal coordinate system. The supporting body 5200 is constituted with a square-shaped plate member, and the force receiving body 5100 is also constituted with a plate member equal in shape and dimension. Here, a domain indicated by the dashed line drawn on an upper face of the supporting body 5200 corresponds to an upper face of the supporting body 4200 drawn in FIG. 24(*a*). The detection-use deformation body 5300 which is arranged inside the domain is a structure body identical with the detection-use deformation body 4300 shown in FIG. 24. That is, the eight columnar members described in FIG. 24 are arranged as the detection-use deformation body 5300 at the positions of the eight base points B1 to B8. Further, the detection element D composed of a strain gauge or a capacitive element is attached to the detection-use deformation body 5300, thereby giving an electric signal which indicates a detection value of displacement or deformation to the detection circuit 5900.

Resultantly, the force sensor 5000 shown in FIG. 25 is such that the force receiving body 4100 and the supporting body 4200 (each of which is a square-shaped plate member) in the conventional force sensor 4000 shown in FIG. 24 are replaced by the force receiving body 5100 and the supporting body 5200, each of which is made of a substantially larger plate member, and the four sets of auxiliary structure bodies 5401 to 5404 are inserted between the force receiving body 5100 and the supporting body 5200.

Here, the four sets of auxiliary structure bodies 5401 to 5404 are not constituents for performing an original detection function as the force sensor. Therefore, the detection element D is not attached to the four sets of auxiliary structure bodies 5401 to 5404. That is, detection of an external force by the force sensor 5000 is consistently performed by detecting displacement or deformation of the detection-use deformation body 5300, displacement of the force receiving body 5100 in relation to the supporting body 5200 or displacement of the supporting body 5200 in relation to the force receiving body 5100 by using the detection element D.

The four sets of auxiliary structure bodies 5401 to 5404 perform a function to adjust the balance of detection sensitivity between moment and force which are exerted on the force receiving body 5100. For example, four sets of structure bodies shown as the deformed portion 300 in FIG. 4 are provided, and they are inserted between the force receiving body 5100 and the supporting body 5200 respectively as the auxiliary structure bodies 5401 to 5404. Thereby, upon exertion of moments Mx, My on the force receiving body 5100, the auxiliary structure bodies 5401 to 5404 act as a resistance element for suppressing displacement of the force receiving body 5100. It is, therefore, possible to lower the detection sensitivity of moments Mx, My and, as a result, to make Fz, Mx, My uniform in detection sensitivity.

The example shown in FIG. 25 is such that the four sets of auxiliary structure bodies 5401 to 5404 are arranged so as to surround the detection-use deformation body 5300 arranged at the center from the periphery along four sides of the supporting body 5200. However, the four sets of auxiliary structure bodies are not necessarily arranged at the above-described positions. The auxiliary structure bodies 5402, 5404 which are arranged in a direction parallel to the X-axis perform a function to adjust the detection sensitivity of moment My, and the auxiliary structure bodies 5401, 5403 which are arranged in a direction parallel to the Y-axis perform a function to adjust the detection sensitivity of moment Mx. Therefore, where adjustment is made only for the detection sensitivity of moment My, arrangement of at least one of the auxiliary structure bodies 5402 and 5404 will be sufficient. Where adjustment is made only for the detection sensitivity of moment Mx, arrangement of at least one of the auxiliary structure bodies 5401 and 5403 will suffice.

<6-3. Embodiments of Practical Auxiliary Structure Body>

Here, a description will be given of more practical embodiments of the auxiliary structure bodies 5401 to 5404 described in Chapter 6-2. In FIG. 25, positions at which the auxiliary structure bodies 5401 to 5404 have been arranged are indicated by the rectangles but the specific structures thereof are not illustrated. Nevertheless, the auxiliary structure bodies 5401 to 5404 perform a function to adjust the balance of detection sensitivity between moment and force. Therefore, as described above, each of the deformation bodies which have been described above, 300, 301, 302, 303, 400, 401, 402, 403, 404, 405 and 500, can be used as an auxiliary structure body.

However, when consideration is given to usage of an auxiliary structure body which is added to a force sensor having a function to detect six axis components, for example, the conventional-type force sensor 4000 described in Chapter 6-2, preferable is an auxiliary structure body with a structure that allows a variation of deformation modes in response to actions of the six axis components. Further, with commercial use taken into account, it is preferable that the auxiliary structure body is structured so as to be easily processed and low in production cost. Here, from the above-described perspective, a description will be given of a more preferable example of the auxiliary structure body.

Figure 26:
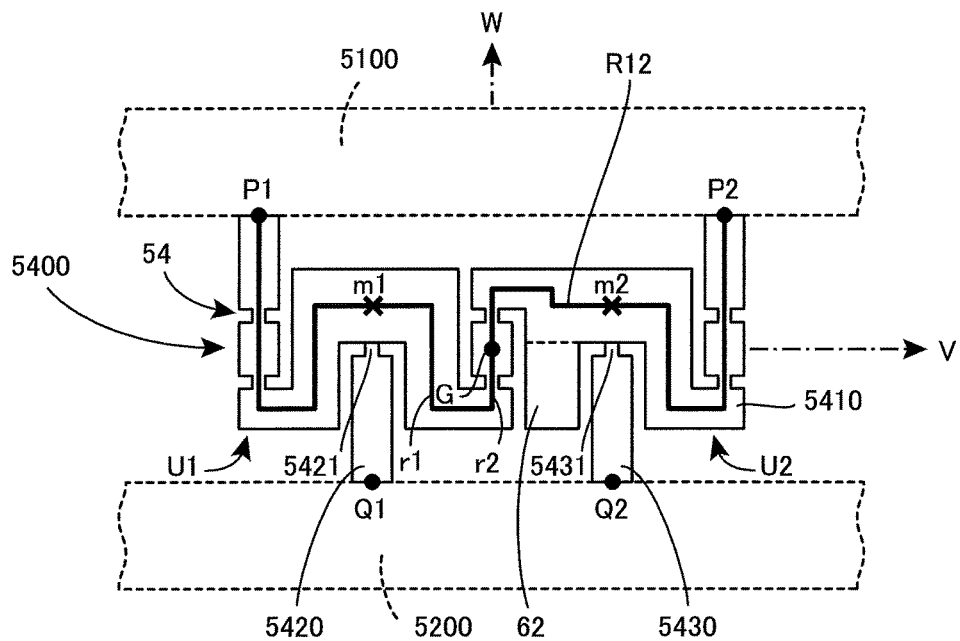
FIG. 26 is a front view which shows a more practical example of the auxiliary structure body according to the present invention.

FIG. 26 is a front view which shows the more practical example of the auxiliary structure body according to the present invention. An auxiliary structure body 5400 of the example is a part drawn by the solid line in the drawing. In order to clearly show a use mode thereof, a force receiving body 5100 and a supporting body 5200 are indicated by the dashed line. As shown in the drawing, the auxiliary structure body 5400 is used by being inserted between the force receiving body 5100 and the supporting body 5200 of a force sensor, thereby connecting a first force receiving point P1 and a second force receiving point P2 at the upper end thereof with a lower face of the force receiving body 5100 and connecting a first supporting point Q1 and a second supporting point Q2 at the lower end thereof with an upper face of the supporting body 5200.

Here, the force sensor 5000 into which the auxiliary structure body 5400 shown in the drawing is to be incorporated as one component is provided with the force receiving body 5100, the supporting body 5200 and the detection-use deformation body 5300 which connects the force receiving body 5100 with the supporting body 5200, as described in Chapter 6-2 by referring to FIG. 25. The sensor is, therefore, a force sensor which detects elastic deformation of the detection-use deformation body 5300 yielded by exertion of force or moment, thereby detecting the exerted force or the moment. Of course, a method for detecting elastic deformation of the detection-use deformation body 5300 may include a method for detecting displacement or deformation of the detection-use deformation body 5300 in itself by using various detection elements or a method for detecting displacement of the force receiving body 5100 in relation to the supporting body 5200 or displacement of the supporting body 5200 in relation to the force receiving body 5100 by using various detection elements.

Here, for convenience of description, as shown in the drawing, an origin G is placed at a position of the center of gravity of the auxiliary structure body 5400, a V-axis is placed on the right-hand side in the drawing, and a W-axis is placed in an upward direction in the drawing, thereby defining a VW two-dimensional orthogonal coordinate system. Here, the V-axis and the W-axis correspond to the X-axis and the Z-axis which have been described above in each of the deformation bodies.

The auxiliary structure body 5400 shown in FIG. 26 is practically similar in structure to the deformation body 402 shown in FIG. 16 (the deformation body included in the basic structure body 2002 described as the sixth modification example in Chapter 4-6). It has an integrated structure body which has an elastically deformed portion 5410, a first base portion 5420 and a second base portion 5430.

Here, the elastically deformed portion 5410 is a structure body which yields elastic deformation at least partially, and a first force receiving point P1 for fixing the elastically deformed portion 5410 to a first site of the force receiving body 5100 is installed at one end thereof and a second force receiving point P2 for fixing it to a second site of the force receiving body 5100 is installed at the other end thereof. And, the elastically deformed portion 5410 is an arm-like structure body along a predetermined connection channel R12 which connects the first force receiving point P1 with the second force receiving point P2.

On the other hand, one end of the first base portion 5420 is connected to the elastically deformed portion 5410 in the vicinity of a first relay point m1 defined on the connection channel R12. At the other end thereof, there is installed a first supporting point Q1 for fixing the first base portion 5420 to a first site of the supporting body 5200. Further, one end of the second base portion 5430 is connected to the elastically deformed portion 5410 in the vicinity of a second relay point m2 defined on the connection channel R12. At the other end thereof, there is installed a second supporting point Q2 for fixing the second base portion 5430 to a second site of the supporting body 5200.

Then, the auxiliary structure body 5400 is characterized in that when force is exerted on the first force receiving point P1 and the second force receiving point P2 at the elastically deformed portion 5410 in a state that the first supporting point Q1 of the first base portion 5420 and the second supporting point Q2 of the second base portion 5430 are fixed, the vicinity of the first relay point m1 at the elastically deformed portion 5410 sways in relation to the first base portion 5420, with a connection point with the first base portion 5420 given as a supporting point, and the vicinity of the second relay point m2 at the elastically deformed portion 5410 sways in relation to the second base portion 5430, with a connection point with the second base portion 5430 given as a supporting point.

In order to realize a structure which allows the above-described sway, the connection end of the first base portion 5420 with the elastically deformed portion 5410 constitutes a constricted leading end 5421 which is narrower in width than the other portion, and the connection end of the second base portion 5430 with the elastically deformed portion 5410 constitutes a constricted leading end 5431 which is narrower in width than the other portion.

The connection channel R12 is installed on the VW plane of the VW two-dimensional orthogonal coordinate system. And, a basic portion of the elastically deformed portion 5410 is constituted with an arm-like structure body expanding along the VW plane. In addition, in the case of the example shown in the drawing, when the origin G of the VW two-dimensional orthogonal coordinate system is defined at a position of the center of gravity of the auxiliary structure body 5400, the first force receiving point P1 is positioned at a second quadrant of the VW two-dimensional orthogonal coordinate system, the second force receiving point P2 is positioned at a first quadrant of the VW two-dimensional orthogonal coordinate system, the first supporting point Q1 is positioned at a third quadrant of the VW two-dimensional orthogonal coordinate system, and the second supporting point Q2 is positioned at a fourth quadrant of the VW two-dimensional orthogonal coordinate system. The positions of four points of P1, P2, Q1, Q2 are arranged as described above, by which when rotational moment at the center of the center of gravity G is exerted on the force receiving body 5100, stress reverse in direction is consequently exerted in the vicinity of the center of gravity G, thus making it possible to exert a resistance force for restricting displacement, as described above.

In practice, the auxiliary structure body 5400 is preferably constituted with a plate member which has an upper face composed of a plane parallel to the VW plane and a lower face composed of a plane parallel to the VW plane. Thereby, the auxiliary structure body 5400 is given as a plate member expanding along the VW plane and can be easily prepared by giving predetermined processing steps to a single sheet of metal plate or resin plate.

In the case of the example shown in the drawing, when the connection channel R12 is traced from the first relay point m1 to the second relay point m2, the connection channel R12 is provided with a first advancing channel r1 which runs in the negative direction of the W-axis and a second advancing channel r2 which runs in the positive direction of the W-axis. The above-described structure can be adopted to form a descending arm-like portion along the first advancing channel r1 and an ascending arm-like portion along the second advancing channel r2, as described in Chapter 4-0. Thereby, it is possible to exhibit a resistance force for preventing deformation to a maximum extent, upon exertion of moment.

Further, as shown in the example, the second advancing channel r2 (or the first advancing channel r1 may be used) is given so as to be a channel which passes through the origin G of the VW two-dimensional orthogonal coordinate system, force transmitted from the left-hand side can be well-balanced with force transmitted from the right-hand side near the center of the auxiliary structure body 5400, as described in Chapter 4-0. This is favorable in stabilizing a deformation mode of the auxiliary structure body 5400.

As shown in the drawing, in this example, the connection channel R12 is provided with a lengthwise direction channel which is parallel to the W-axis and a crosswise direction channel which is parallel to the V-axis. The lengthwise direction channel is expanded from each of the first force receiving point P1 and the second force receiving point P2, and the first relay point m1 and the second relay point m2 are defined on the crosswise-direction channel. As described in Chapter 4-11, the above-described constitution is adopted, by which the auxiliary structure body 5400 can be easily processed to realize a structure body suitable for mass production.

Further, in the case of the example shown in the drawing, a first U-letter shaped by-pass U1 which is formed in the U-letter shape is installed at a zone between the first force receiving point P1 and the first relay point m1 on the connection channel R12, and a second U-letter shaped by-pass U2 which is formed in the U-letter shape is installed at a zone between the second relay point m2 and the second force receiving point P2 on the connection channel R12. As described above, a redundant structure of the U-letter-shaped by-pass portion is installed at the external arm-like portion, as described in Chapter 4-4, the auxiliary structure body 5400 is made available in a wider variation of deformation modes. Therefore, such a structure can be provided that is suitable for being incorporated into the six-axis detection type force sensor described in Chapter 6-2.

In order to easily process the auxiliary structure body 5400, the U-letter shaped by-pass is preferably not given as a curved channel but given as a channel which is bent at a right angle. In the case of the example shown in FIG. 26, each of the first U-letter shaped by-pass U1 and the second U-letter shaped by-pass U2 is constituted with a pair of lengthwise direction by-passes parallel to the W-axis and a crosswise direction by-pass parallel to the V-axis which connects the pair of lengthwise direction by-passes. Therefore, the contour of each U-letter shaped by-pass portion is constituted with a portion parallel to the W-axis and a portion parallel to the V-axis. Thus, formation of a curved structure is not needed on production, and processing can be performed relatively easily.

In the case of the example shown in the drawing, a constricted portion 54 which is narrow in width in a direction orthogonal to the connection channel R12 is installed at a part of the arm-like structure body which constitutes the elastically deformed portion 5410. The constricted portion 54 allows the elastically deformed portion 5410 to undergo deformation easily and exhibits the effect of diversifying a deformation mode of the auxiliary structure body 5400, as described above in Chapter 4-5.

Further, in the case of the example shown in the drawing, a weight adjusting portion 62 which projects in a direction orthogonal to the connection channel R12 is installed at a specific site of the arm-like structure body which constitutes the elastically deformed portion 5410. The weight adjusting portion 62 corrects biasing of weight distribution in the auxiliary structure body 5400, thereby exhibiting the effect of stabilizing deformation motions, which has been described in Chapter 4-7.

Figure 27:
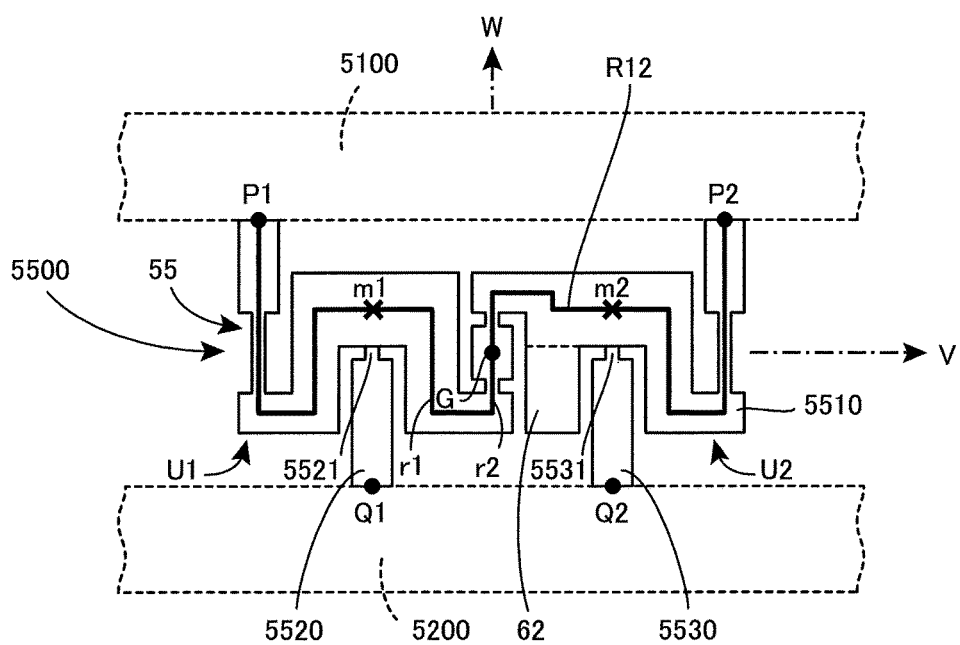
FIG. 27 is a front view which shows a modification example of the auxiliary structure body shown in FIG. 26.

FIG. 27 is a front view which shows a modification example of the auxiliary structure body 5400 shown in FIG. 26. An auxiliary structure body 5500 shown in FIG. 27 is substantially similar in structure to the auxiliary structure body 5400 shown in FIG. 26. The auxiliary structure body 5500 is provided with an elastically deformed portion 5510 which is installed along a connection channel R12 that connects a first force receiving point P1 with a second force receiving point P2, a first base portion 5520 and a second base portion 5530 which connect predetermined sites of the elastically deformed portion 5510 with a first supporting point Q1 and a second supporting point Q2. Then, a constricted leading end 5521 installed at an upper end of the first base portion 5520 supports the vicinity of a first relay point m1 at the elastically deformed portion 5510, and a constricted leading end 5531 installed at an upper end of the second base portion 5530 supports the vicinity of a second relay point m2 at the elastically deformed portion 5510, which is also similar to the auxiliary structure body 5400 shown in FIG. 26.

The auxiliary structure body 5400 shown in FIG. 26 is different from the auxiliary structure body 5500 in FIG. 27 only in the number of constricted portions and the shape thereof. The auxiliary structure body 5400 shown in FIG. 26 is provided at a total of six sites with a relatively short constricted portion 54, while the auxiliary structure body 5500 shown in FIG. 27 is provided at one site of each of the left and right external arm-like portions with a relatively long constricted portion 55 and provided at two sites of the internal arm-like portion at the center with a relatively short constricted portion.

Whether the auxiliary structure body 5400 shown in FIG. 26 is superior in performance to the auxiliary structure body 5500 shown in FIG. 27 or not is not easily determined. However, they are slightly different in deformation mode and, in practice, may be used differently depending on an intended use.

<6-4. Specific Deformation Mode of Auxiliary Structure Body>

Figure 28:
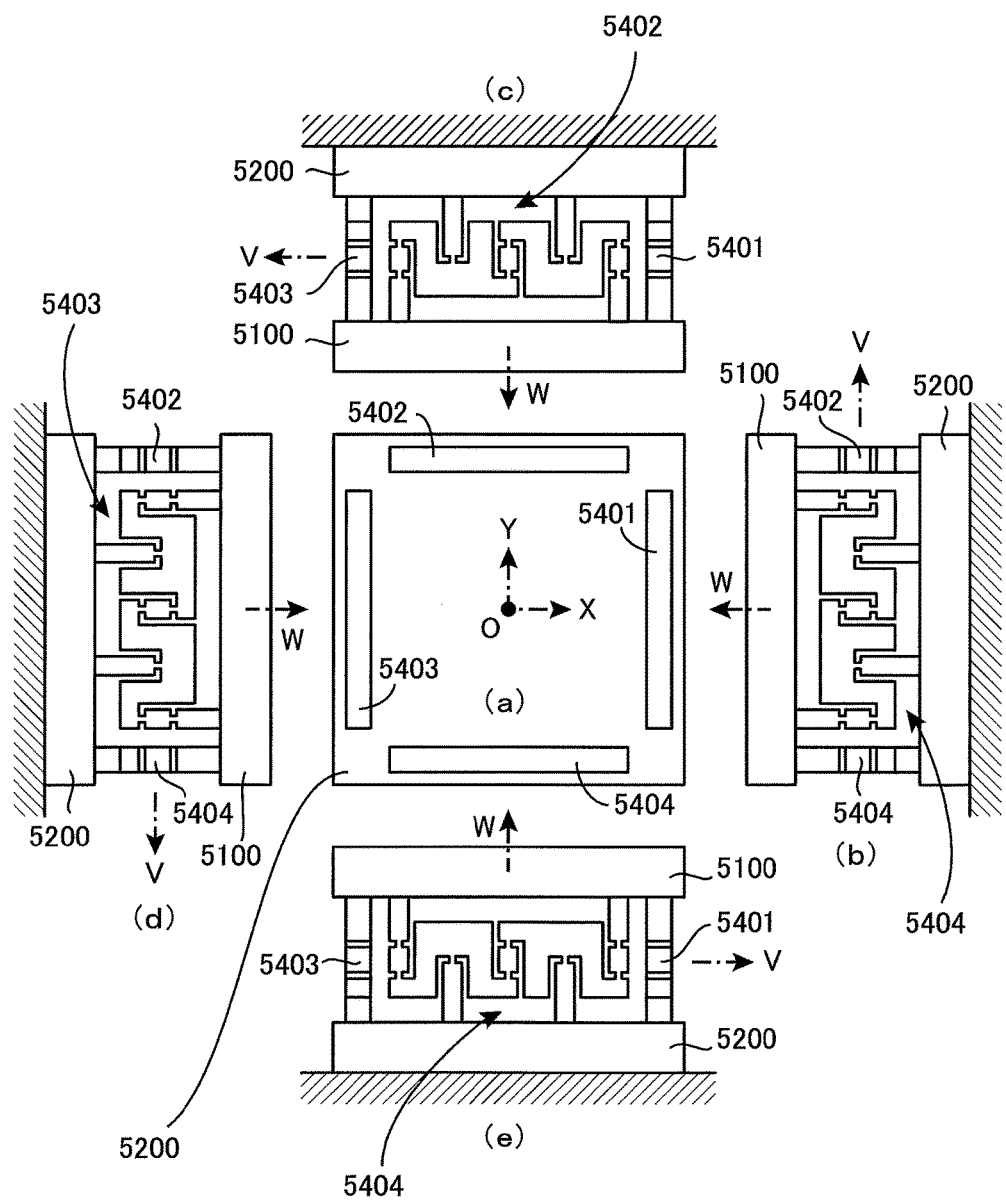
FIG. 28 is a drawing which shows a specific arrangement of four sets of auxiliary structural bodies in the force sensor shown in FIG. 25 (FIG. (a) is a top view, FIG. (b) is a right side view, FIG. (c) is a rear view, FIG. (d) is a left side view, and FIG. (e) is a front view).

Next, a brief description will be given of deformation of the auxiliary structure body 5400 which is incorporated into the force sensor 5000. FIG. 28 is a drawing which shows a specific arrangement of the four sets of auxiliary structure bodies in the force sensor shown in FIG. 25. Here, FIG. (a) is the top view, FIG. (b) is the right side view, FIG. (c) is the rear view, FIG. (d) is the left side view, and FIG. (e) is the front view.

The top view of FIG. (a) shows a state that the four sets of auxiliary structure bodies 5401 to 5404 are arranged on an upper face of the supporting body 5200 composed of a square-shaped plate member, exhibiting a state that the force receiving body 5100 has been removed. Here, each of the four sets of auxiliary structure bodies 5401 to 5404 is a structure body which is identical with the auxiliary structure body 5400 shown in FIG. 26. As with FIG. 25, as to the four sets of auxiliary structure bodies 5401 to 5404, only an arrangement thereof is shown and a detailed structure is omitted. In contrast, in FIG. (b) to FIG. (e), each of the auxiliary structure bodies 5401 to 5404 is illustrated for its detailed structure, together with the force receiving body 5100 and the supporting body 5200.

FIG. (a) shows an XYZ three-dimensional orthogonal coordinate system which is defined for the force sensor. FIG. (b) to FIG. (e) individually show the VW two-dimensional orthogonal coordinate system defined in FIG. 26. Therefore, a direction of each of the auxiliary structure bodies 5401 to 5404 on a three-dimensional space can be easily understood. FIG. 28 is a drawing for showing an arrangement of each of the auxiliary structure bodies 5401 to 5404 on the supporting body 5200 and, therefore, other constituents are omitted. Actually, however, in order to constitute the force sensor, a detection-use deformation body 5300 is arranged in the interior surrounded by four sets of auxiliary structure bodies 5401 to 5404 and a detection element is arranged at a necessary site.

That is, the actual force sensor 5000 is provided with a force receiving body 5100, a supporting body 5200, a detection-use deformation body 5300 which connects the force receiving body 5100 with the supporting body 5200, a detection element D which detects elastic deformation of the detection-use deformation body 5300, a detection circuit 5900 which outputs a detection signal of force or moment exerted on the basis of detection results of the detection element D and four sets of auxiliary structure bodies 5401 to 5404. Here, where one of the four sets of auxiliary structure bodies 5401 to 5404 is representatively referred to as an auxiliary structure body 5400, as shown in FIG. 26, a first force receiving point P1 and a second force receiving point P2 at the auxiliary structure body 5400 are joined on a lower face of the force receiving body 5100 and a first supporting point Q1 and a second supporting point Q2 at the auxiliary structure body 5400 are joined on an upper face of the supporting body 5200.

Further, each of the force receiving body 5100 and the supporting body 5200 is constituted with a plate member having an upper face and a lower face, each of which is parallel to the XY plane, and the Z-axis penetrates through the force receiving body 5100 and the supporting body 5200. Then, the four sets of auxiliary structure bodies 5401 to 5404 are arranged so as to surround a periphery of the detection-use deformation body 5300.

According to a more detailed description, as shown in FIG. 28, the first auxiliary structure body 5401 is arranged so that the V-axis is parallel to the Y-axis and the W-axis is parallel to the Z-axis at a position at which the VW plane intersects with the positive X-axis. The second auxiliary structure body 5402 is arranged so that the V-axis is parallel to the X-axis and the W-axis is parallel to the Z-axis at a position at which the VW plane intersects with the positive Y-axis. The third auxiliary structure body 5403 is arranged so that the V-axis is parallel to the Y-axis and the W-axis is parallel to the Z-axis at a position at which the VW plane intersects with the negative X-axis. The fourth auxiliary structure body 5404 is arranged so that the V-axis is parallel to the X-axis and the W-axis is parallel to the Z-axis at a position at which the VW plane intersects with the negative Y-axis.

Then, the first force receiving point P1 and the second force receiving point P2 of each of the auxiliary structure bodies 5401 to 5404 are joined on a lower face of the force receiving body 5100, and the first supporting point Q1 and the second supporting point Q2 of each of the auxiliary structure bodies 5401 to 5404 are joined on an upper face of the supporting body 5200.

FIG. 28 shows a state that no external force is exerted on the force receiving body 5100. The force receiving body 5100 and the supporting body 5200 are kept parallel, and each of the auxiliary structure bodies 5401 to 5404 is kept unchanged in shape. Thus, on the basis of the state shown in FIG. 28, consideration is given to a deformation mode when an external force is exerted on the force receiving body 5100 in a variety of ways in a state that the supporting body 5200 is fixed.

Figure 29:
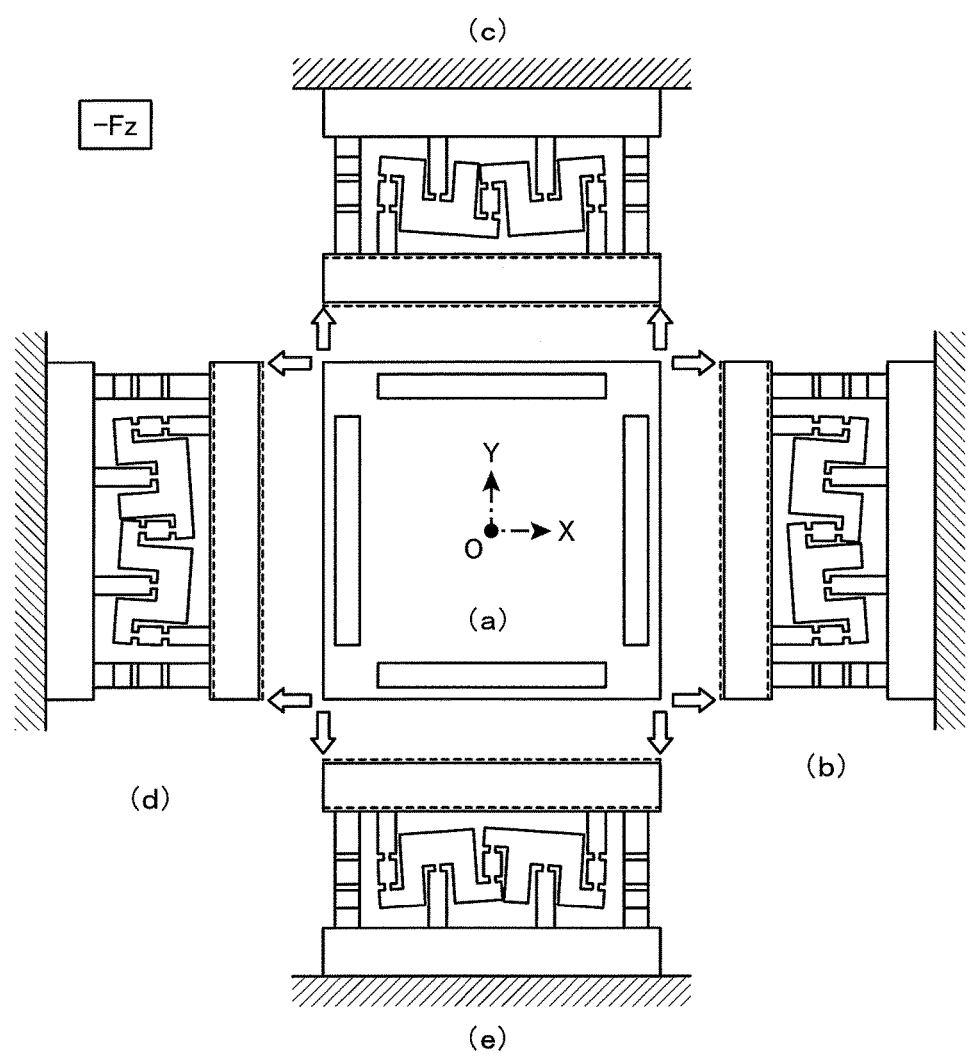
FIG. 29 is a drawing which shows a deformation mode of four sets of auxiliary structural bodies when force −Fz in the negative direction of the Z-axis is exerted on the force receiving body in the force sensor shown in FIG. 25 (FIG. (a) is a top view, FIG. (b) is a right side view, FIG. (c) is a rear view, FIG. (d) is a left side view and FIG. (e) is a front view).

FIG. 29 is a drawing which shows a deformation mode of the four sets of auxiliary structure bodies when force −Fz in the negative direction of the Z-axis is exerted on the force receiving body 5100 in the force sensor shown in FIG. 25. As with the case of FIG. 28, FIG. (a) is the top view, FIG. (b) is the right side view, FIG. (c) is the rear view, FIG. (d) is the left side view, and FIG. (e) is the front view. In order to avoid that the drawing becomes complicated, a symbol of each portion is omitted. The white arrow shown in the drawing indicates a direction of component force exerted on each portion on the basis of the exerted force −Fz. Further, the dashed line in the drawing indicates a position of the force receiving body 5100 before deformation. It will be understood that each portion of the auxiliary structure body 5400 connected via the constricted portion 54 yields various types of displacement, depending on a position of each portion.

Figure 30:
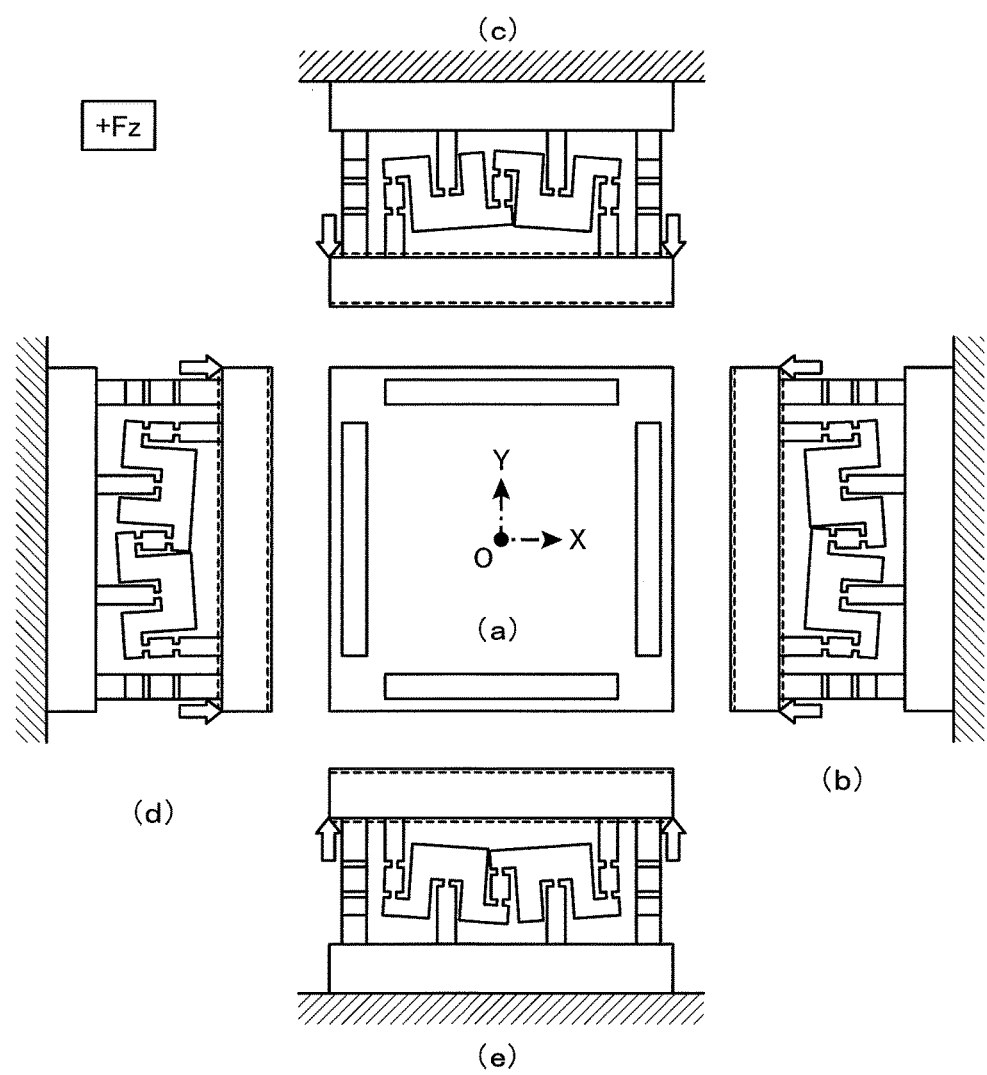
FIG. 30 is a drawing which shows a deformation mode of four sets of auxiliary structural bodies when force +Fz in the positive direction of the Z-axis is exerted on the force receiving body in the force sensor shown in FIG. 25 (FIG. (a) is a top view, FIG. (b) is a right side view, FIG. (c) is a rear view, FIG. (d) is a left side view and FIG. (e) is a front view).
Figure 31:
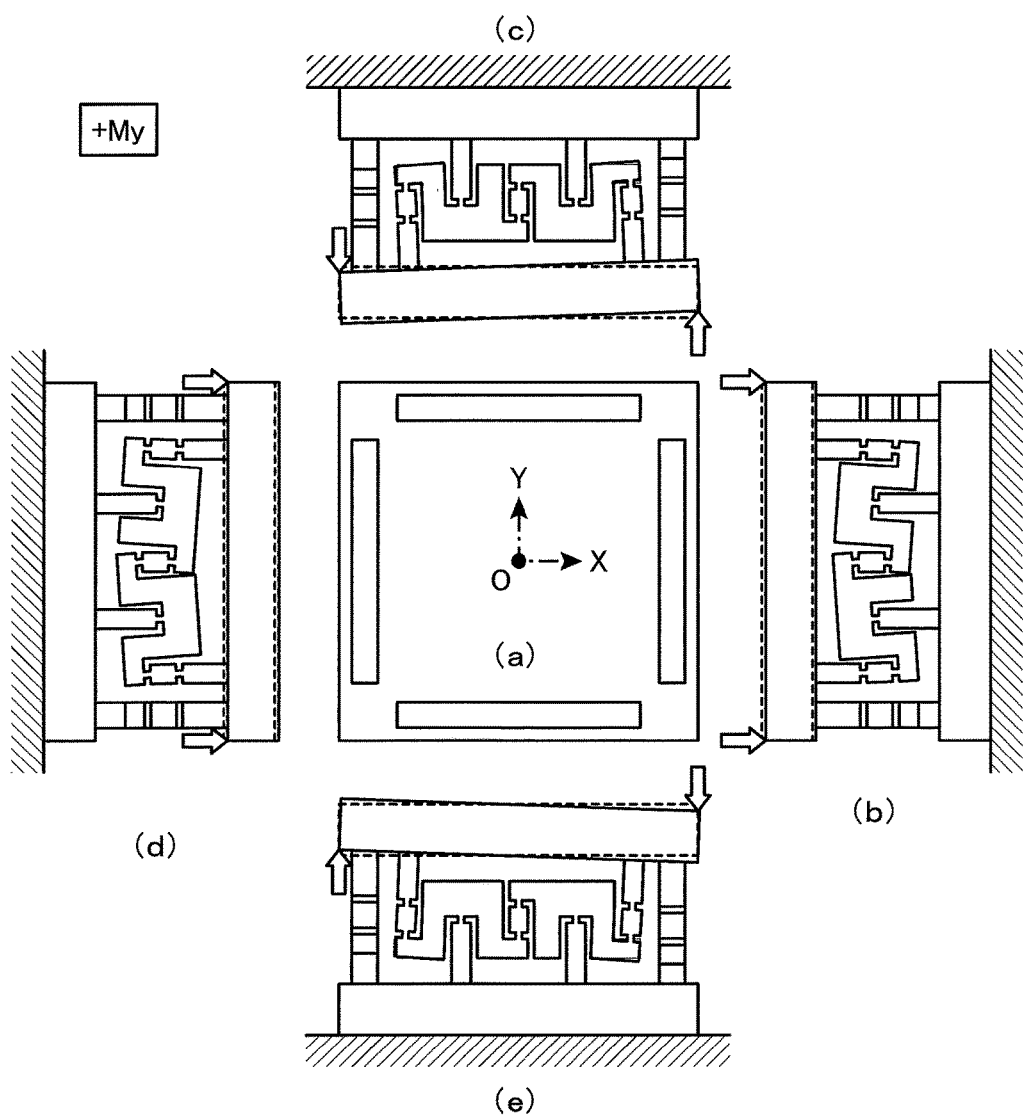
FIG. 31 is a drawing which shows a deformation mode of four sets of auxiliary structural bodies when moment +My positively around the Y-axis is exerted on the force receiving body in the force sensor shown in FIG. 25 (FIG. (a) is a top view, FIG. (b) is a right side view, FIG. (c) is a rear view, FIG. (d) is a left side view and FIG. (e) is a front view).
Figure 32:
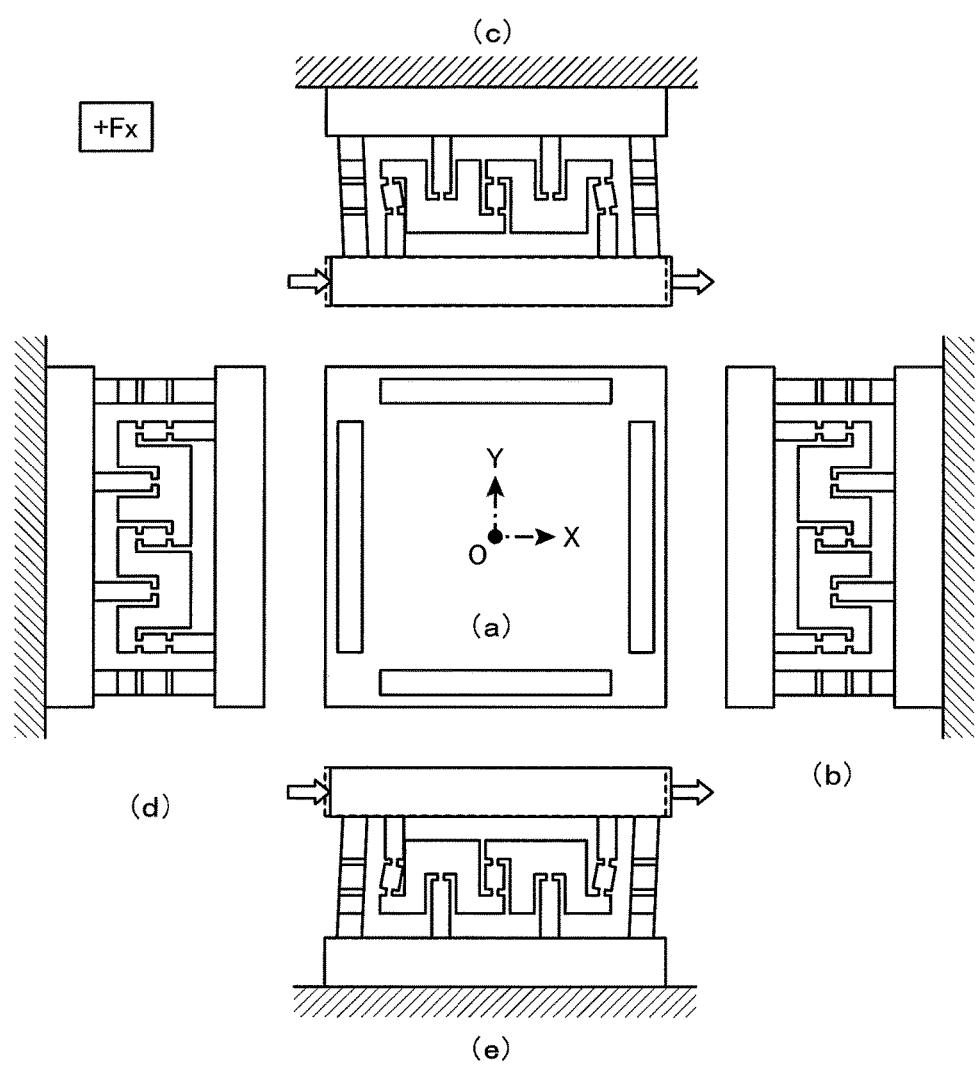
FIG. 32 is a drawing which shows a deformation mode of four sets of auxiliary structural bodies when force +Fx in the positive direction of the X-axis is exerted on the force receiving body in the force sensor shown in FIG. 25 (FIG. (a) is a top view, FIG. (b) is a right side view, FIG. (c) is a rear view, FIG. (d) is a left side view and FIG. (e) is a front view).
Figure 33:
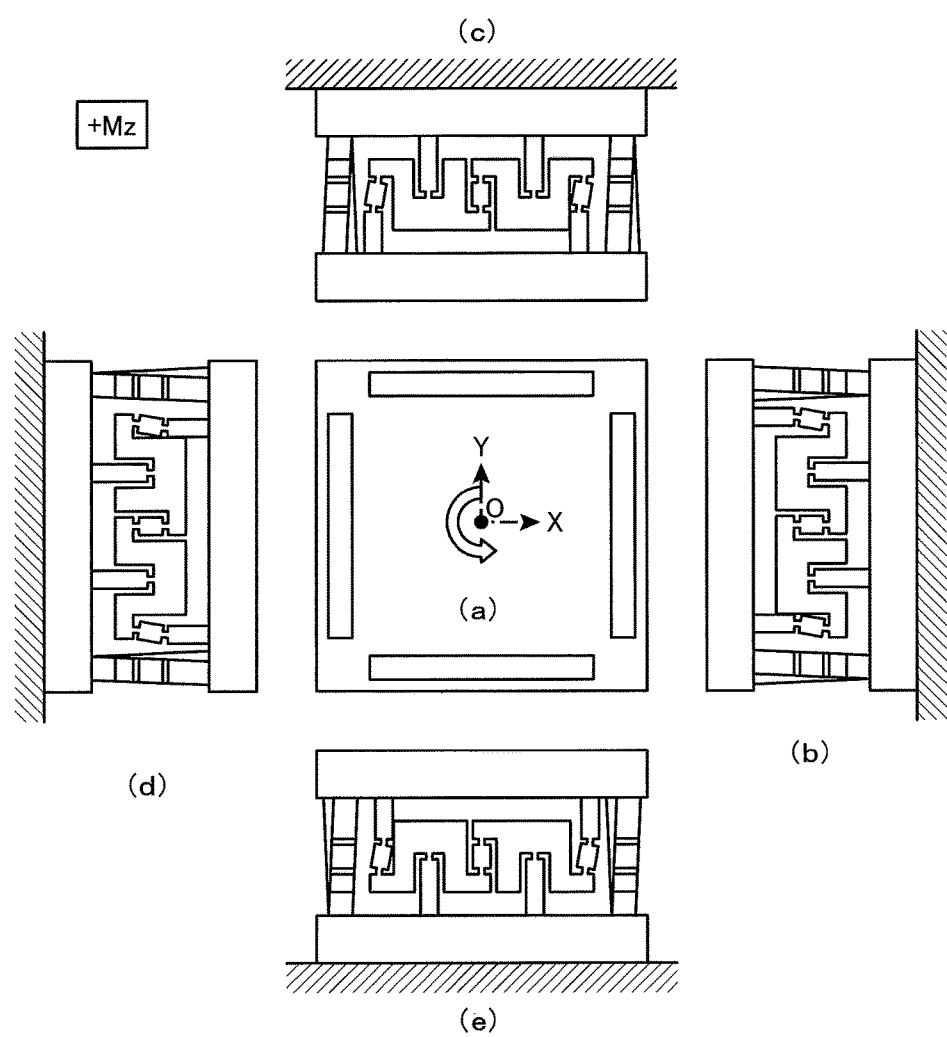
FIG. 33 is a drawing which shows a deformation mode of four sets of auxiliary structural bodies when moment +Mz positively around the Z-axis is exerted on the force receiving body in the force sensor shown in FIG. 25 (FIG. (a) is a top view, FIG. (b) is a right side view, FIG. (c) is a rear view, FIG. (d) is a left side view and FIG. (e) is a front view).

FIG. 30 is a drawing which shows a deformation mode of the four sets of auxiliary structure bodies when force +Fz in the positive direction of the Z-axis is exerted on the force receiving body 5100 in the force sensor shown in FIG. 25. Similarly, FIG. 31 shows a state when moment +My is exerted (when moment +Mx is exerted, there is developed such a state that this is rotated by 90 degrees). FIG. 32 shows a state when force +Fx is exerted (when force +Fy is exerted, there is developed such a state that this is rotated by 90 degrees). Further, FIG. 33 shows a state when moment +Mz is exerted. In each of the drawings, the white arrow indicates a direction of component force exerted on each portion on the basis of the exerted external force, and the dashed line indicates a position of the force receiving body 5100 before deformation.

As described above, upon exertion of force Fz, the direction of force transmitted from the left-hand side to an upper part of the internal arm is the same as that of force transmitted from the right-hand side thereto. Therefore, in the deformed states shown in FIG. 29 and FIG. 30, there is exerted no resistance force for restricting displacement which is unique to the present invention (a resistance force which occurs for expanding or contracting the arm-like portion). In contrast, as shown in FIG. 31, upon exertion of moment My or upon exertion of moment Mx, the direction of force transmitted from the left-hand side to the upper part of the internal arm is reverse to that of force transmitted from the right-hand side. Therefore, a resistance force for restricting displacement which is unique to the present invention (a resistance force which occurs for expanding or contracting the arm-like portion) is exerted to prevent deformation. It is noted that upon exertion of forces Fz, Fy or moment Mz, there is exerted no resistance force for restricting displacement which is unique to the present invention.

Figures 34, 35:
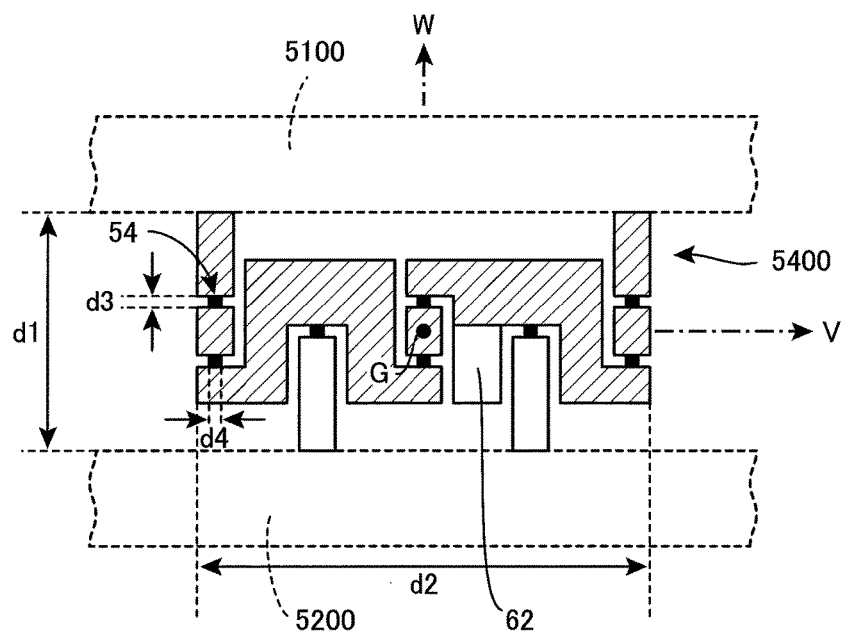
FIG. 34 is a front view which shows a constitution of each portion of the auxiliary structure body shown in FIG. 26 (hatching indicates a domain of each portion and does not indicate a cross section).
FIG. 35 is a table which shows deformation modes occurring at individual portions when force in the direction of each axis and moment around each axis are exerted on the auxiliary structure body shown in FIG. 34.

FIG. 34 is a front view which shows a constitution of each portion of the auxiliary structure body 5400 shown in FIG. 26 (hatching indicates a domain of each portion and does not indicate a cross section thereof). In the drawing, a portion which has been marked out in black is the constricted portion 54 (including a base-narrowed portion), a portion to which oblique hatching is given is the arm-like portion along the connection channel R12. Further, a rectangular white-spaced portion is the weight adjusting portion 62. In the case of the example shown here, the dimension of each portion illustrated, d1 to d4, is d1=14 mm, d2=40 mm, d3=1 mm, and d4=0.5 mm. The thickness of the auxiliary structure body 5400, d5, is d5=4 mm. Of course, these dimensional values show dimensions set in one example. Each portion of the auxiliary structure body in the present invention can be set in any given dimension depending on a use mode thereof.

FIG. 35 is a table which shows a deformation mode developed at each portion when forces Fx, Fy, Fz in the direction of each axis and moments Mx, My, Mz around each axis are exerted on the auxiliary structure body 5400 shown in FIG. 34 (a specimen having the above-described dimensional values). Here, "bending of constricted portion" means deformation in a direction along the VW plane, "collapse of constricted portion" means deformation in a direction orthogonal to the VW plane, and "distortion of constricted portion" means distortion when a direction of the connection channel R12 (the supporting channels R2, R3 in the case of the base-narrowed portion) is given as a rotational axis. Further, in the table, the white-spaced circle indicates that the deformation mode of each corresponding portion makes a significant contribution to deformation of the auxiliary structure body 5400 and the cross mark indicates that the deformation mode makes a small contribution.

According to the table, upon exertion of forces Fx, Fy, bending and collapse of the constricted portion make a significant contribution to deformation of the auxiliary structure body 5400. Upon exertion of force +Fx, as shown in FIG. 32, the force receiving body is pressed out in the positive direction of the X-axis. Therefore, each of the auxiliary structure body 5404 at the front side and the auxiliary structure body 5402 at the back side causes bending at the constricted portion. The auxiliary structure bodies 5401, 5403 on the lateral sides cause collapse at the constricted portion. As a result, the auxiliary structure bodies 5401, 5403 on the lateral sides incline in the positive direction of the X-axis. At this time, supporting rigidity in relation to the force receiving body 5100 by the auxiliary structure body 5400 is a sum of rigidity to bending of the constricted portion and rigidity to collapse of the constricted portion. In general, the latter is greater and becomes predominant. Therefore, adjustment is made for the thickness dimension d5 of the constricted portion and the height dimension d3 of the constricted portion, thereby making it possible to adjust the detection sensitivity of force Fx. This is also applicable to force Fy.

In contrast, upon exertion of force Fz, bending of the constricted portion makes a significant contribution to deformation of the auxiliary structure body 5400. For example, upon exertion of force −Fz, as shown in FIG. 29, the force receiving body is pressed downward as a whole. Thereby, downward forces in the same direction are exerted at the same time on the force receiving points P1, P2 each in the four sets of auxiliary structure bodies 5400. Upon exertion of force +Fz reverse in direction, as shown in FIG. 30, the force receiving body is pushed upward as a whole. Thereby, upward forces in the same direction are exerted at the same time on the force receiving points P1, P2 each in the four sets of auxiliary structure bodies 5400. Therefore, in both of the cases, bending is to occur mainly at each constricted portion. At this time, the supporting rigidity to the force receiving body 5100 by the auxiliary structure body 5400 is mainly rigidity to bending of the constricted portion. Thereby, adjustment is made mainly for the width dimension d4 of the constricted portion, thus making it possible to adjust the detection sensitivity of force Fz.

On the assumption that the supporting rigidity to the force receiving body 5100 by the detection-use deformation body 5300 is sufficiently greater than the supporting rigidity to the force receiving body 5100 by the four sets of auxiliary structure bodies 5400, even addition of the four sets of auxiliary structure bodies 5400 would hardly influence the detection sensitivity of force Fz.

On the other hand, upon exertion of moments Mx, My, expansion and contraction of the arm-like portion make a significant contribution to the deformation of the auxiliary structure body 5400, in addition to bending of the constricted portion. For example, upon exertion of moment +My, as shown in FIG. 31, in the auxiliary structure body 5404 at the front side and in the auxiliary structure body 5402 at the back side, expansion and contraction of the arm-like portion will take place, together with bending of the constricted portion. Here, the arm-like portion undergoes expansion and contraction, because force transmitted from the left-hand side to the internal arm-like portion is reverse in direction to force from the right-hand side thereto. Upon expansion and contraction of the arm-like portion, there is exerted a resistance force for restricting displacement unique to the present invention. On the other hand, in the auxiliary structure bodies 5401, 5403 on the lateral sides, the constricted portion undergoes bending. This is also found in a case where moment Mx is exerted.

As described above, upon exertion of moments Mx, My, not only deformation of the constricted portion but also expansion and contraction of the arm-like portion will take place, and a large resistance force for restricting deformation is exerted. Therefore, addition of the auxiliary structure body 5400 is able to lower the detection sensitivity of moments Mx, My, as described above. These are important actions and effects of the present invention. In other words, addition of the auxiliary structure body 5400 is able to selectively intensify only rigidity upon exertion of moments Mx, My. The rigidity can be adjusted for an extent thereof by dimensions of the arm-like portion.

At the end, upon exertion of moment Mz, as shown in FIG. 33, distortion-causing deformation takes place, with the Z-axis given as the central axis, thus resulting in bending and distortion occurring at the constricted portion. At this time, the supporting rigidity to the force receiving body 5100 by the auxiliary structure body 5400 is a sum of rigidity to bending of the constricted portion and rigidity to distortion of the constricted portion. Therefore, an adjustment is made for the width dimension d2 of the auxiliary structure body 5400 in its entirety, in addition to the width dimension d4 of the constricted portion and the height dimension d3 of the constricted portion, thus making it possible to adjust the detection sensitivity of moment Mz.

Resultantly, there are shown results that the four sets of auxiliary structure bodies 5401 to 5404 are added, by which moment and force are successfully balanced in detection sensitivity. FIG. 36 is a table which compares detection values obtained upon exertion of force in the direction of each axis and moment around each axis in the conventional-type force sensor 4000 shown in FIG. 24 (the sensor disclosed in Patent Document 3) and the force sensor 5000 shown in FIG. 25 according to the present invention (the sensor to which the four sets of auxiliary structure bodies 5401 to 5404 are added).

In order to compare the detection sensitivity of force with the detection sensitivity of moment by referring to the same scale, here, direct values of electric signals which are output from a detection circuit are to be determined in such a case that a distance from the center point of rotation to an exertion point is set to be 0.1 m (in general, joysticks, etc., are in most cases set substantially to this level), as force F, 200N of translational force is added and, as moment M, 20N·m of rotational force which is equivalent to the same 200N added to the exertion point is added.

As shown in the table, in the conventional force sensor 4000, moments Mx, My are more than 20 times greater in detection value than forces Fx, Fy, and when they are used in a joystick, etc., some correction is needed. A difference in detection value between force Fz and moment My is about 2 times. In contrast, in the force sensor 5000 of the present invention, moments Mx, My are decreased in detection value to about 2 times greater than forces Fx, Fy. With regard to force Fz and moment My in particular, they are substantially equal in detection value and a difference is hardly found between them.

The identical detection-use deformation body 4300 is used in the conventional force sensor 4000 and the force sensor 5000 of the present invention. The detection element and the detection circuit are also exactly the same. They are essentially different only in that the four sets of auxiliary structure bodies 5401 to 5404 are added to the latter. As described above, the auxiliary structure body of the present invention is only added to any given conventional-type force sensor, thus making it possible to adjust the detection sensitivity and also to realize a force sensor equipped with desired detection sensitivity.

INDUSTRIAL APPLICABILITY

The force sensor according to the present invention is widely applicable to a device for controlling motions of robots and industrial machines or a man-machine interface of an input device for electronics. The auxiliary structure body for the force sensor of the present invention can be used in an application for adjusting detection sensitivity by being incorporated into a force sensor for detecting a deformation mode of a deformation body inserted between a force receiving body and a supporting body.

The invention claimed is:

1. A force sensor which detects at least force Fz in a direction of a Z-axis and moment My around a Y-axis, of force in respective directions of each coordinate axis and moment around each coordinate axis in an XYZ three-dimensional orthogonal coordinate system, the force sensor comprising: a basic structure body (1000) which includes a force receiving body (100) arranged on the Z-axis when the coordinate system is defined so that the Z-axis is a perpendicular axis, a supporting body (200) which is arranged below the force receiving body, and a deformation body (300) which connects the force receiving body with the supporting body to yield at least partially elastic deformation by exertion of force or moment; detection elements (C1 to C4) which detect deformation or displacement of the deformation body or displacement of the force receiving body or the supporting body; and a detection circuit (900) which outputs electric signals indicating force Fz in the direction of the Z-axis and moment My around the Y-axis which have been exerted on one of the force receiving body and the supporting body in a state that loads are applied to the other on the basis of detection results of the detection elements; wherein the deformation body (300) includes an elastically deformed portion (310) which is connected at a predetermined site to the force receiving body (100) to yield elastic deformation, a first base portion (320) and a second base portion (330) fixing a predetermined site of the elastically deformed portion to the supporting body (200), wherein the first base portion and second base portion are rigid, when the basic structure body (1000) is cut along an XZ plane or a plane parallel to the XZ plane and when a geometric figure appearing on a cross section of the force receiving body is referred to as a force receiving body figure (100*f*), a geometric figure appearing on a cross section of the supporting body is referred to as a supporting body figure (200*f*) and a geometric figure appearing on a cross section of the deformation body is referred to as a deformation body figure (300*f*), the deformation body figure includes an elastically deformed portion figure (310*f*) which is a cross section of the elastically deformed portion (310), a first base portion figure (320*f*) which is a cross section of the first base portion (320) and a second base portion figure (330*f*) which is a cross section of the second base portion (330), the elastically deformed portion figure (310*f*) is arranged along a predetermined connection channel (R1) which connects a first force receiving point (P1) with a second force receiving point (P2) which are defined at discrete locations on a contour of the force receiving body figure (100*f*), the elastically deformed portion figure couples the first force receiving point (P1) to the second force receiving point (P2), wherein the elastically deformed portion figure forms a continuous structure along the predetermined connection channel (R1) between the first force receiving point (P1) to the second force receiving point (P2), the first base portion figure (320f) is connected to the elastically deformed portion figure (310f) in a vicinity of a first relay point (m1) defined on the connection channel (R1), and the second base portion figure (330f) is connected to the elastically deformed portion figure (310f) in a vicinity of a second relay point (m2) defined on the connection channel (R1), the elastically deformed portion (310) couples the first force receiving point (P1) to the second force receiving point (P2), the first base portion (320) couples the vicinity of the first relay point (m1) at the elastically deformed portion (310) to a first supporting point (Q1) defined on the supporting body (200), and the second base portion (330) couples the vicinity of the second relay point (m2) at the elastically deformed portion (310) to a second supporting point (Q2) defined on the supporting body (200), the first force receiving point (P1) is arranged at a position having a negative coordinate value of an X-axis and the second force receiving point (P2) is arranged at a positive coordinate value of the X-axis, and when force Fz is exerted on the force receiving body (100) in a state that the supporting body (200) is fixed and when moment My is exerted on the force receiving body (100) in a state that the supporting body (200) is fixed, the vicinity of the first relay point (m1) at the elastically deformed portion (310) sways in the direction of the X-axis in relation to the first base portion (320), with a connection point (m1') with the first base portion (320) given as a supporting point, and the vicinity of the second relay point (m2) at the elastically deformed portion (310) sways in the direction of the X-axis in relation to the second base portion (330), with a connection point with the second base portion (330) given as a supporting point.

2. The force sensor according to claim 1, wherein
the elastically deformed portion figure (310f) includes a first external arm-like portion FIG. 3110 which is arranged along a zone from the first force receiving point (P1) to the first relay point (m1) on the connection channel (R1), an internal arm-like portion figure (312f) which is arranged along a zone from the first relay point (m1) to the second relay point (m2) on the connection channel (R1) and a second external arm-like portion figure (313f) which is arranged along a zone from the second relay point (m2) to the second force receiving point (P2) on the connection channel (R1).

3. The force sensor according to claim 2, wherein
a connection end of the first base portion figure (320f) is connected below in the vicinity of the first relay point (m1) at the elastically deformed portion figure (310f) and a connection end of the second base portion figure (330f) is connected below in the vicinity of the second relay point (m2) at the elastically deformed portion figure (310f).

4. The force sensor according to claim 3, wherein
the first base portion figure (320f) is arranged along a first supporting channel (R2) which connects the first relay point (m1) defined on the connection channel (R1) with the first supporting point (Q1) defined on a contour of the supporting body figure (200f) so that the first base portion figure couples the elastically deformed portion figure (310f) to the supporting body FIG. (200f), and
the second base portion figure (330f) is arranged along a second supporting channel (R3) which connects the second relay point (m2) defined on the connection channel (R1) with the second supporting point (Q2) defined on a contour of the supporting body figure (200f) so that the second base portion figure couples the elastically deformed portion figure (310f) to the supporting body figure (200f).

5. The force sensor according to claim 4, wherein
when force Fz is exerted on the force receiving body (100) in a state that the supporting body (200) is fixed and when moment My is exerted on the force receiving body (100) in a state that the supporting body (200) is fixed, the vicinity of the first relay point (m1) at the elastically deformed portion figure (310f) sways in relation to the first base portion figure (320f), with an intersection point (m1') of the first supporting channel (R2) and the contour of the elastically deformed portion figure (310f) given as a supporting point, and the vicinity of the second relay point (m2) at the elastically deformed portion figure (310f) sways in relation to the second base portion figure (330f), with an intersection point (m2') of the second supporting channel (R3) and the contour of the elastically deformed portion figure (310f) given as a supporting point.

6. The force sensor according to claim 3, wherein
a connection channel (R1, R4, R5, R7) which is traced from the first relay point (m1) to the second relay point (m2) includes a descending channel running downward along a first longitudinal direction axis (L1, L2, L4) intersecting with an XY plane and an ascending channel running upward along a second longitudinal direction axis (Z, L3, L5) intersecting with the XY plane, and
the internal arm-like portion figure (312f, 342f, 352f) includes a descending arm-like portion along the descending channel and an ascending arm-like portion along the ascending channel.

7. The force sensor according to claim 6, wherein
the first longitudinal direction axis (L1, L2) and the second longitudinal direction axis (Z, L3) are parallel to the Z-axis.

8. The force sensor according to claim 7, wherein
the first longitudinal direction axis or the second longitudinal direction axis (Z) is an axis included in the YZ plane.

9. The force sensor according to claim 7, wherein
the connection channel (R1, R4, R5, R7) includes a lengthwise direction channel which is parallel to the Z-axis and a crosswise direction channel which is parallel to the X-axis, and
the lengthwise-direction channel expands from the first force receiving point (P1) or the second force receiving point (P2), and the first relay point (m1) and the second relay point (m2) are defined on the crosswise direction channel.

10. The force sensor according to claim 3, wherein
a curved channel which is curved below and then curved above is installed at a zone between the first relay point (m1) and the second relay point (m2) on the connection channel (R6), and
the internal arm-like portion figure (362f) includes a curved portion along the curved channel.

11. The force sensor according to claim 2, wherein
a connection end of the first base portion figure (425f) is connected below in the vicinity of the first relay point (m1) at the elastically deformed portion figure (470f) and a connection end of the second base portion figure (435f) is connected above in the vicinity of the second relay point (m2) at the elastically deformed portion figure (470f).

12. The force sensor according to claim 11, wherein
the connection channel (R8) which is traced from the first relay point (m1) to the second relay point (m2) includes a descending channel which runs downward along a longitudinal direction axis (L6) intersecting with the XY plane, and
the internal arm-like portion figure (472f) includes a descending arm-like portion along the descending channel.

13. The force sensor according to claim 12, wherein
the longitudinal direction axis (L6) is parallel to the Z-axis.

14. The force sensor according to claim 2, wherein
a connection end of the first base portion figure is connected above in the vicinity of the first relay point (m1) at the elastically deformed portion figure, and a connection end of the second base portion figure is connected above in the vicinity of the second relay point (m2) at the elastically deformed portion figure.

15. The force sensor according to claim 1, wherein
a third relay point (m3) is further defined between the second relay point (m2) and the second force receiving point (P2) on the connection channel (R9),
the deformation body includes a third base portion, in addition to the elastically deformed portion, the first base portion and the second base portion,
the third base portion couples a vicinity of the third relay point (m3) at the elastically deformed portion to a third supporting point (Q3) defined on the supporting body (250), and
the elastically deformed portion figure (480f) includes a first external arm-like portion figure (481f) which is arranged along a zone from the first force receiving point (P1) to the first relay point (m1) on the connection channel (R9), a first internal arm-like portion figure (482f) which is arranged along a zone from the first relay point (m1) to the second relay point (m2) on the connection channel (R9), a second internal arm-like portion figure (483f) which is arranged along a zone from the second relay point (m2) to the third relay point (m3) on the connection channel (R9) and a second external arm-like portion figure (484f) which is arranged along a zone from the third relay point (m3) to the second force receiving point (P2) on the connection channel (R9).

16. The force sensor according to claim 15, wherein
a connection end of the first base portion figure (426f) is connected below in the vicinity of the first relay point (m1) at the elastically deformed portion figure (480f), a connection end of the second base portion figure (436f) is connected below in the vicinity of the second relay point (m2) at the elastically deformed portion figure (480f), and a connection end of a third base portion figure (496f) which is a cross section of the third base portion is connected above in the vicinity of the third relay point (m3) at the elastically deformed portion figure (480f).

17. The force sensor according to claim 2, wherein
a first U-letter shaped by-pass (U1) having a U-letter shape is formed at a zone between the first force receiving point (P1) and the first relay point (m1) on the connection channel (R7), and the first external arm-like portion figure (411f) includes a first U-letter shaped by-pass portion along the first U-letter shaped by-pass, and
a second U-letter shaped by-pass (U2) having a U-letter shape is formed at a zone between the second relay point (m2) and the second force receiving point (P2) on the connection channel (R7), and the second external arm-like portion figure (413f) includes a second U-letter shaped by-pass portion along the second U-letter shaped by-pass.

18. The force sensor according to claim 17, wherein
the first U-letter shaped by-pass (U1) and the second U-letter shaped by-pass (U2) are constituted in combination with a pair of lengthwise direction by-passes parallel to the Z-axis and a crosswise direction by-pass parallel to the X-axis which connects the pair of lengthwise direction by-passes.

19. The force sensor according to claim 2, wherein
a constricted portion (41-43; 51a, 51b, 52a, 52b, 53a, 53b) which is narrow in width in a direction orthogonal to the connection channel, is installed at all or some of the first external arm-like portion figure (441f; 451f), the internal arm-like portion figure (442f; 452f) and the second external arm-like portion figure (443f; 453f).

20. The force sensor according to claim 2, wherein
a weight adjusting portion figure (62f) which projects in a direction orthogonal to the connection channel is installed at all or some of the first external arm-like portion figure (461f), the internal arm-like portion figure (462f) and the second external arm-like portion figure 463f).

21. The force sensor according to claim 2, wherein
a flange portion figure (61f, 63f) which projects in a direction orthogonal to the connection channel is installed at a connection portion of the first external arm-like portion figure (461f) with the force receiving body figure (150f) and a connection portion of the second external arm-like portion figure (463f) with the force receiving body figure (150f).

22. The force sensor according to claim 1, wherein
a connection end of the first base portion figure (320f) with the elastically deformed portion figure (310f) and a connection end of the second base portion figure (330f) therewith each constitute a constricted figure which is narrower in width than the other portion.

23. The force sensor according to claim 1, wherein
the force receiving body (100) and the supporting body (200) are constituted with a plate member which has an upper face and a lower face, each of which is parallel to the XY plane.

24. The force sensor according to claim 1, wherein
the elastically deformed portion (310) is constituted with a structure body formed by bending an elongated arm-like member.

25. The force sensor according to claim 1, wherein
the detection element electrically detects an expansion/contraction state at a predetermined site of the elastically deformed portion, thereby detecting a deformed state of the deformation body.

26. The force sensor according to claim 1, wherein
the detection element electrically detects a distance between a predetermined site of the elastically deformed portion and a predetermined site of the supporting body, thereby detecting a displaced state of the deformation body.

27. The force sensor according to claim 26, wherein
the detection element is constituted with a plurality of capacitive elements, each of which has a displacement electrode formed at a predetermined site of the elastically deformed portion and a fixed electrode formed at a position of the supporting body opposite to the displacement electrode, and the detection circuit performs arithmetic processing on the basis of capacitance values of the plurality of capacitive elements, thereby outputting electric signals indicating force Fz in the direction of the Z-axis and moment My around the Y-axis.

28. The force sensor according to claim 1, wherein
the deformation body (500) includes an elastically deformed portion (510) with regard to the X-axis which is connected at a predetermined site thereof to the force receiving body (150) to yield elastic deformation, a first base portion (520) with regard to the X-axis and a second base portion (530) with regard to the X-axis, each of which fixes the predetermined site of the elastically deformed portion with regard to the X-axis to the supporting body (250), an elastically deformed portion (540) with regard to the Y-axis which is connected at a predetermined site thereof to the force receiving body (150) to yield elastic deformation, and a first base portion (550) with regard to the Y-axis and a second base portion (560) with regard to the Y-axis, each of which fixes the predetermined site of the elastically deformed portion with regard to the Y-axis to the supporting body (250),
when the basic structure body is cut along an XZ plane or a plane parallel to the XZ plane and when a geometric figure appearing on a cross section of the force receiving body is referred to as a force receiving body figure (150*fx*) with regard to the X-axis, a geometric figure appearing on a cross section of the supporting body is referred to as a supporting body figure (250*fx*) with regard to the X-axis, and a geometric figure appearing on a cross section of the deformation body is referred to as a deformation body figure (500*fx*) with regard to the X-axis, and at this time,
the deformation body figure with regard to the X-axis includes an elastically deformed portion figure (510*f*) with regard to the X-axis which is a cross section of the elastically deformed portion (510) with regard to the X-axis, a first base portion figure (520*f*) with regard to the X-axis which is a cross section of the first base portion (520) with regard to the X-axis, and a second base portion figure (530*f*) with regard to the X-axis which is a cross section of the second base portion (530) with regard to the X-axis,
when the basic structure body is cut along a YZ plane or a plane parallel to the YZ plane and when a geometric figure appearing on a cross section of the force receiving body is referred to as a force receiving body figure (150*fy*) with regard to the Y-axis, a geometric figure appearing on a cross section of the supporting body is referred to as a supporting body figure (250*fy*) with regard to the Y-axis, and a geometric figure appearing on a cross section of the deformation body is referred to as a deformation body figure (500*fy*) with regard to the Y-axis, and at this time,
the deformation body figure with regard to the Y-axis includes an elastically deformed portion figure (540*f*) with regard to the Y-axis which is a cross section of the elastically deformed portion (540) with regard to the Y-axis, a first base portion figure (550*f*) with regard to the Y-axis which is a cross section of the first base portion (550) with regard to the Y-axis, and a second base portion figure (560*f*) with regard to the Y-axis which is a cross section of the second base portion (560) with regard to the Y-axis,
the elastically deformed portion figure (510*f*) with regard to the X-axis is arranged along a predetermined connection channel (R10) with regard to the X-axis which connects a first force receiving point (P11) with regard to the X-axis with a second force receiving point (P12) with regard to the X-axis defined on a contour of the force receiving body figure (150*fx*) with regard to the X-axis, and is a figure which couples the first force receiving point (P11) with regard to the X-axis to the second force receiving point (P12) with regard to the X-axis,
the first base portion figure (520*f*) with regard to the X-axis is connected to the elastically deformed portion figure (510*f*) with regard to the X-axis in a vicinity of a first relay point (m11) with regard to the X-axis defined on the connection channel (R10) with regard to the X-axis, and the second base portion figure (530*f*) with regard to the X-axis is connected to the elastically deformed portion figure (510*f*) with regard to the X-axis in a vicinity of a second relay point (m12) with regard to the X-axis defined on the connection channel (R10) with regard to the X-axis,
the elastically deformed portion figure (540*f*) with regard to the Y-axis is arranged along a predetermined connection channel (R11) with regard to the Y-axis which connects a first force receiving point (P21) with regard to the Y-axis with a second force receiving point (P22) with regard to the Y-axis defined on a contour of the force receiving body figure (150*fy*) with regard to the Y-axis, and is a figure which couples the first force receiving point (P21) with regard to the Y-axis to the second force receiving point (P22) with regard to the Y-axis,
the first base portion figure (550*f*) with regard to the Y-axis is connected to the elastically deformed portion figure (540*f*) with regard to the Y-axis in a vicinity of a first relay point (m21) with regard to the Y-axis defined on the connection channel (R11) with regard to the Y-axis, and the second base portion figure (560*f*) with regard to the Y-axis is connected to the elastically deformed portion figure (540*f*) with regard to the Y-axis in a vicinity of a second relay point (m22) with regard to the Y-axis defined on the connection channel (R11) with regard to the Y-axis,
the elastically deformed portion (510) with regard to the X-axis couples the first force receiving point (P11) with regard to the X-axis to the second force receiving point (P12) with regard to the X-axis, the first base portion (520) with regard to the X-axis couples the vicinity of the first relay point (m11) with regard to the X-axis at the elastically deformed portion (510) with regard to the X-axis to the first supporting point (Q11) with regard to the X-axis defined on the supporting body (250), and the second base portion (530) with regard to the X-axis couples the vicinity of the second relay point (m12) with regard to the X-axis at the elastically deformed portion (510) with regard to the X-axis to the second supporting point (Q12) with regard to the X-axis defined on the supporting body (250),
the elastically deformed portion (540) with regard to the Y-axis couples the first force receiving point (P21) with regard to the Y-axis to the second force receiving point (P22) with regard to the Y-axis, the first base portion (550) with regard to the Y-axis couples the vicinity of the first relay point (m21) with regard to the Y-axis at the elastically deformed portion (540) with regard to the Y-axis to a first supporting point (Q21) with regard to the Y-axis defined on the supporting body (250), and the second base portion (560) with regard to the Y-axis couples the vicinity of the second relay point (m22) with regard to the Y-axis at the elastically deformed portion (540) with regard to the Y-axis to a second supporting point (Q22) with regard to the Y-axis defined on the supporting body (250), the first force receiving point (P11) with regard to the X-axis is arranged at a position having a negative coordinate value of the X-axis, the second force receiving point (P12) with regard to the X-axis is arranged at a position having a positive coordinate value of the X-axis, the first force receiving point (P21) with regard to the Y-axis is arranged at a position having a negative coordinate value of the Y-axis, and the second force receiving point (P22) with regard to the Y-axis is arranged at a position having a positive coordinate value of the Y-axis, when force Fz is exerted on the force receiving body (150) in a state that the supporting body (250) is fixed and when moment My is exerted on the force receiving body (150) in a state that the supporting body (250) is fixed, the vicinity of the first relay point (m11) with regard to the X-axis at the elastically deformed portion (510) with regard to the X-axis sways in the direction of the X-axis in relation to the first base portion (520) with regard to the X-axis, with a connection point with the first base portion (520) with regard to the X-axis given as a supporting point, and the vicinity of the second relay point (m12) with regard to the X-axis at the elastically deformed portion (510) with regard to the X-axis sways in the direction of the X-axis in relation to the second base portion (530) with regard to the X-axis, with a connection point with the second base portion (530) with regard to the X-axis given as a supporting point, when force Fz is exerted on the force receiving body (150) in a state that the supporting body (250) is fixed and when moment Mx is exerted on the force receiving body (150) in a state that the supporting body (250) is fixed, the vicinity of the first relay point (m21) with regard to the Y-axis at the elastically deformed portion (540) with regard to the Y-axis sways in the direction of the Y-axis in relation to the first base portion (550) with regard to the Y-axis, with a connection point with the first base portion (550) with regard to the Y-axis given as a supporting point, and the vicinity of the second relay point (m22) with regard to the Y-axis at the elastically deformed portion (540) with regard to the Y-axis sways in the direction of the Y-axis in relation to the second base portion (560) with regard to the Y-axis, with a connection point with the second base portion (560) with regard to the Y-axis given as a supporting point, and the detection circuit (900) outputs not only electric signals indicating force Fz in the direction of the Z-axis and moment My around the Y-axis, but also an electric signal indicating moment Mx around the X-axis which have been exerted on one of the force receiving body and the supporting body in a state that loads are applied to the other, on the basis of detection results of the detection element.

29. The force sensor according to claim 28, wherein
the elastically deformed portion (510) with regard to the X-axis is constituted with a structure body formed by bending an elongated arm-like member arranged on the XZ plane, the elastically deformed portion (540) with regard to the Y-axis is constituted with a structure body formed by bending an elongated arm-like member arranged on the YZ plane, and the elastically deformed portion (510) with regard to the X-axis is integrated with the elastically deformed portion (540) with regard to the Y-axis at a position intersecting with the Z-axis.

30. The force sensor according to claim 28, wherein
the deformation body figure (500*fx*) with regard to the X-axis is a cross section figure obtained when the deformation body (500) is cut along the XZ plane, and the deformation body figure (500*fy*) with regard to the Y-axis is a cross section figure obtained when the deformation body (500) is cut along the YZ plane, each of the elastically deformed portion figure (510*f*) with regard to the X-axis and the elastically deformed portion figure (540*f*) with regard to the Y-axis is formed to be symmetrical with the Z-axis, the elastically deformed portion figure (510*f*) with regard to the X-axis and the elastically deformed portion figure (540*f*) with regard to the Y-axis are geometrically congruent figures, and the elastically deformed portion (510) with regard to the X-axis and the elastically deformed portion (540) with regard to the Y-axis are constituted with a part of an elastically deformed integrated portion (570) composed of a rotation body obtained by rotating the congruent figure, with the Z-axis given as the central axis.

31. The force sensor according to claim 30, wherein
each of a base portion figure group with regard to the X-axis constituted with the first base portion figure (520*f*) with regard to the X-axis and the second base portion figure (530*f*) with regard to the X-axis and a base portion figure group with regard to the Y-axis constituted with the first base portion figure (550*f*) with regard to the Y-axis and the second base portion figure (560*f*) with regard to the Y-axis is formed to be symmetrical with the Z-axis, the base portion figure group with regard to the X-axis and the base portion figure group with regard to the Y-axis are geometrically congruent figures, and the first base portion (520) with regard to the X-axis, the second base portion (530) with regard to the X-axis, the first base portion (550) with regard to the Y-axis, and the second base portion (560) with regard to the Y-axis are constituted with a part of an integrated base portion (580) composed of a rotation body obtained by rotating the congruent figure, with the Z-axis given as the central axis.

32. The force sensor according to claim 28, wherein
a first U-letter shaped by-pass (U11) with regard to the X-axis having a U-letter shape is installed at a zone between the first force receiving point (P11) with regard to the X-axis and the first relay point (m11) with regard to the X-axis on the connection channel (R10) with regard to the X-axis, and a second U-letter shaped by-pass (U12) with regard to the X-axis having a U-letter shape is installed at a zone between the second relay point (m12) with regard to the X-axis and the second force receiving point (P12) with regard to the X-axis on the connection channel (R10) with regard to the X-axis, a first U-letter shaped by-pass (U21) with regard to the Y-axis having a U-letter shape is installed at a zone between the first force receiving point (P21) with regard to the Y-axis and the first relay point (m21) with regard to the Y-axis on the connection channel (R11) on the Y-axis, and a second U-letter shaped by-pass (U22) with regard to the Y-axis having a U-letter shape is installed at a zone between the second relay point (m22) with regard to the Y-axis and the second force receiving point (P22) with regard to the Y-axis on the connection channel (R11) with regard to the Y-axis, the detection element comprises;

a first capacitive element (C1) which is constituted with a first displacement electrode (E11) fixed on a bottom of a part of the elastically deformed portion (510) with regard to the X-axis which is arranged along the first U-letter shaped by-pass (U11) with regard to the X-axis and a first fixed electrode (E21) fixed at a part opposite to the first displacement electrode on an upper face of the supporting body (250), a second capacitive element (C2) which is constituted with a second displacement electrode (E12) fixed on a bottom of a part of the elastically deformed portion (510) with regard to the X-axis which is arranged along the second U-letter shaped by-pass (U12) with regard to the X-axis and a second fixed electrode (E22) fixed at a part opposite to the second displacement electrode on the upper face of the supporting body (250), a third capacitive element (C3) which is constituted with a third displacement electrode (E13) fixed on a bottom of a part of the elastically deformed portion (540) with regard to the Y-axis which is arranged along the first U-letter shaped by-pass (U21) with regard to the Y-axis and a third fixed electrode (E23) fixed at a part opposite to the third displacement electrode on the upper face of the supporting body (250), and a fourth capacitive element (C4) which is constituted with a fourth displacement electrode (E14) fixed on a bottom of a part of the elastically deformed portion (540) with regard to the Y-axis which is arranged along the second U-letter shaped by-pass (U22) with regard to the Y-axis and a fourth fixed electrode (E24) fixed at a part opposite to the fourth displacement electrode on the upper face of the supporting body (250), the detection circuit (900) outputs a difference in capacitance value between the first capacitive element (C1) and the second capacitive element (C2) as an electric signal indicating moment My around the Y-axis, a difference in capacitance value between the third capacitive element (C3) and the fourth capacitive element (C4) as an electric signal indicating moment Mx around the X-axis, and a sum of capacitance values of the first capacitive element (C1), the second capacitive element (C2), the third capacitive element (C3) and the fourth capacitive element (C4) as an electric signal indicating force Fz in a direction of the Z-axis.

33. An auxiliary structure body for a force sensor which is identical in structure with the deformation body of the force sensor according to claim 1.

34. A force sensor (5000) into which the auxiliary structure body according to claim 33 is incorporated, the force sensor which has a function to detect at least force Fz in a direction of the Z-axis and moment My around the Y-axis, of force in respective directions of each coordinate axis and moment around each coordinate axis in an XYZ three-dimensional orthogonal coordinate system, and when the coordinate system is defined so that the Z-axis is given as a perpendicular axis, the force sensor includes a force receiving body (5100) arranged on the Z-axis, a supporting body (5200) arranged below the force receiving body, a detection-use deformation body (5300) which connects the force receiving body with the supporting body to yield at least partially elastic deformation upon exertion of force or moment, the auxiliary structure body (5401 to 5404) connected between the force receiving body and the supporting body, a detection element which detects deformation or displacement of the detection-use deformation body or displacement of the force receiving body or the supporting body, and a detection circuit which outputs electric signals indicating force Fz in the direction of the Z-axis and moment My around the Y-axis which have been exerted on the other in a state that loads are applied to one of the force receiving body and the supporting body on the basis of detection results of the detection element.

35. An auxiliary structure body (5400) which is used as a part of components by being incorporated into a force sensor which includes a force receiving body (5100), a supporting body (5200) and a detection-use deformation body (5300) connecting the force receiving body with the supporting body, said force censor detects elastic deformation of the detection-use deformation body occurring upon exertion of force or moment, thereby detecting the force or moment which has been exerted, the auxiliary structure body for a force sensor providing an elastically deformed portion (5410), a first base portion (5420) and a second base portion (5430), wherein the first base portion and second base portion are rigid, wherein the elastically deformed portion (5410) is a structure body which yields at least partially elastic deformation and provided at one end thereof with a first force receiving point (P1) for fixing it to a first site of the force receiving body (5100) and at the other end thereof with a second force receiving point (P2) for fixing it to a second site of the force receiving body (5100), wherein the first and second force receiving points are defined at discrete locations on the force receiving body, thereby forming an arm-like structure body along a predetermined connection channel (R12) which connects the first force receiving point with the second force receiving point, wherein the elastically deformed portion forms a continuous structure along the predetermined connection channel (R12) between the first force receiving point (P1) to the second force receiving point (P2), the first base portion (5420) is connected at one end thereof to the elastically deformed portion (5410) in a vicinity of a first relay point (m1) defined on the connection channel (R12) and provided at the other end thereof with a first supporting point (Q1) for fixing it to a first site of the supporting body (5200), the second base portion (5430) is connected at one end thereof to the elastically deformed portion (5410) in a vicinity of a second relay point (m2) defined on the connection channel (R12) and provided at the other end thereof with a second supporting point (Q2) for fixing it to a second site of the supporting body (5200), and when force is exerted on the first force receiving point (P1) and the second force receiving point (P2) at the elastically deformed portion (5410) in a state that the first supporting point (Q1) of the first base portion (5420) and the second supporting point (Q2) of the second base portion (5430) are fixed, the vicinity of the first relay point (m1) at the elastically deformed portion (5410) sways in relation to the first base portion (5420), with a connection point with the first base portion (5420) given as a supporting point, and the vicinity of the second relay point (m2) at the elastically deformed portion (5410) sways in relation to the second base portion (5430), with a connection point with the second base portion (5430) given as a supporting point.

36. The auxiliary structure body for a force sensor according to claim 35, wherein the connection channel (R12) is installed on a VW plane of a VW two-dimensional orthogonal coordinate system and the elastically deformed portion (5410) is formed in an arm-like structure body expanding along the VW plane, and when an origin (G) of the VW two-dimensional orthogonal coordinate system is defined at a position of the center of gravity, the first force receiving point (P1) is positioned at a second quadrant of the VW two-dimensional orthogonal coordinate system, the second force receiving point (P2) is positioned at a first quadrant of the VW two-dimensional orthogonal coordinate system, the first supporting point (Q1) is positioned at a third quadrant of the VW two-dimensional orthogonal coordinate system, and the second supporting point (Q2) is positioned at a fourth quadrant of the VW two-dimensional orthogonal coordinate system.

37. The auxiliary structure body for a force sensor according to claim 36 which is constituted with a plate member having an upper face composed of a plane parallel to the VW plane and a lower face composed of a plane parallel to the VW plane.

38. The auxiliary structure body for a force sensor according to claim 36, wherein when the connection channel (R12) is traced so as to move from the first relay point (m1) to the second relay point (m2), the connection channel (R12) is provided with a first advancing channel (r1) which advances in the negative direction of the W-axis and a second advancing channel (r2) which advances in the positive direction of the W-axis.

39. The auxiliary structure body for a force sensor according to claim 38, wherein the first advancing channel (r1) or the second advancing channel (r2) is a channel which passes through the origin (G) of the VW two-dimensional orthogonal coordinate system.

40. The auxiliary structure body for a force sensor according to claim 36, wherein the connection channel (R12) is provided with a lengthwise direction channel which is parallel to the W-axis and a crosswise direction channel which is parallel to the V-axis, and the lengthwise direction channel expands from the first force receiving point (P1) or the second force receiving point (P2), and the first relay point (m1) and the second relay point (m2) are defined on the crosswise direction channel.

41. The auxiliary structure body for a force sensor according claim 36, wherein a first U-letter shaped by-pass (U1) which is formed in a U-letter shape is installed at a zone between the first force receiving point (P1) and the first relay point (m1) on the connection channel (R12), and a second U-letter shaped by-pass (U2) which is formed in a U-letter shape is installed at a zone between the second relay point (m2) and the second force receiving point (P2) on the connection channel (R12).

42. The auxiliary structure body for a force sensor according to claim 41, wherein each of the first U-letter shaped by-pass (U1) and the second U-letter shaped by-pass (U2) is constituted in combination with a pair of lengthwise direction by-passes parallel to the W-axis and a crosswise direction by-pass parallel to the V-axis which connects the pair of lengthwise direction by-passes.

43. The auxiliary structure body for a force sensor according to claim 36, wherein a constricted portion (54; 55) narrow in width in a direction orthogonal to the connection channel (R12) is installed at a part of the arm-like structure body which constitutes the elastically deformed portion (5410; 5510).

44. The auxiliary structure body for a force sensor according of claim 36, wherein a weight adjusting portion (62) which projects in a direction orthogonal to the connection channel (R12) is installed at a specific site of the arm-like structure body which constitutes the elastically deformed portion (5410; 5510).

45. The auxiliary structure body for a force sensor according claim 36, wherein a connection end of the first base portion (5420; 5520) and the second base portion (5430; 5530) with the elastically deformed portion (5410; 5510) constitutes a constricted leading end (5421, 5431; 5521, 5531) narrower in width than the other part.

46. The force sensor (5000) into which the auxiliary structure body according to claim 36 is incorporated as a part of components, the force sensor providing a force receiving body (5100), a supporting body (5200), a detection-use deformation body (5300) connecting the force receiving body with the supporting body, a detection element (D) which detects elastic deformation of the detection-use deformation body, a detection circuit (5900) which outputs a detection signal of force or moment which has been exerted on the basis of detection results of the detection element, and the auxiliary structure body (5400; 5500), wherein the first force receiving point (P1) and the second force receiving point (P2) at the auxiliary structure body are joined to a lower face of the force receiving body (5100), and the first supporting point (Q1) and the second supporting point (Q2) at the auxiliary structure body are joined to an upper face of the supporting body (5200).

47. The force sensor according to claim 46, wherein the force receiving body (5100) and the supporting body (5200) are constituted with a plate member which has an upper face and a lower face, each of which is parallel to the XY plane, and the Z-axis penetrates through the force receiving body (5100) and the supporting body (5200), four sets of auxiliary structure bodies are incorporated so as to surround a periphery of the detection-use deformation body (5300) which connects the force receiving body (5100) with the supporting body (5200), a first auxiliary structure body (5401) is arranged so that the V-axis is parallel to the Y-axis and the W-axis is parallel to the Z-axis at a position at which the VW plane intersects with the positive X-axis, a second auxiliary structure body (5402) is arranged so that the V-axis is parallel to the X-axis and the W-axis is parallel to the Z-axis at a position at which the VW plane intersects with the positive Y-axis, a third auxiliary structure body (5403) is arranged so that the V-axis is parallel to the Y-axis and the W-axis is parallel to the Z-axis at a position at which the VW plane intersects with the negative X-axis, a fourth auxiliary structure body (5404) is arranged so that the V-axis is parallel to the X-axis and the W-axis is parallel to the Z-axis at a position at which the VW plane intersects with the negative Y-axis, and the first force receiving point (P1) and the second force receiving point (P2) at each of the auxiliary structure bodies are joined on a lower face of the force receiving body (5100), and the first supporting point (Q1) and the second supporting point (Q2) at each of the auxiliary structure bodies are joined on an upper face of the supporting body (5200).

* * * * *